US012736368B2

(12) United States Patent
Chreptyk et al.

(10) Patent No.: US 12,736,368 B2
(45) Date of Patent: Sep. 15, 2026

(54) HIGH DEFINITION MAPPING

(71) Applicant: NVIDIA Corporation, Santa Clara, CA (US)

(72) Inventors: Russell Chreptyk, Seattle, WA (US); Vaibhav Thukral, Kirkland, WA (US); David Nister, Bellevue, WA (US)

(73) Assignee: NVIDIA Corporation, Santa Clara, CA (US)

( * ) Notice: Subject to any disclaimer, the term of this patent is extended or adjusted under 35 U.S.C. 154(b) by 499 days.

(21) Appl. No.: 17/726,429

(22) Filed: Apr. 21, 2022

(65) Prior Publication Data

US 2022/0349725 A1 Nov. 3, 2022

Related U.S. Application Data

(60) Provisional application No. 63/177,814, filed on Apr. 21, 2021.

(51) Int. Cl.
*G01C 21/00* (2006.01)
*B60W 60/00* (2020.01)

(52) U.S. Cl.
CPC ....... *G01C 21/3878* (2020.08); *B60W 60/001* (2020.02); *G01C 21/3881* (2020.08); (Continued)

(58) Field of Classification Search
None
See application file for complete search history.

(56) References Cited

U.S. PATENT DOCUMENTS

| | | | | |
|---|---|---|---|---|
| 11,814,059 | B1 * | 11/2023 | Reschka | B60W 40/09 |
| 2016/0275131 | A1 * | 9/2016 | Lublinsky | G06F 16/29 |

(Continued)

FOREIGN PATENT DOCUMENTS

| | | | |
|---|---|---|---|
| CN | 104535070 | A1 | 4/2015 |
| WO | 2020060308 | A1 | 3/2020 |
| WO | 2022226240 | A1 | 10/2022 |

OTHER PUBLICATIONS

Machine translation of CN 104535070 A (Year: 2015).*

(Continued)

*Primary Examiner* — Anne Marie Antonucci
*Assistant Examiner* — Kyle S Park
(74) *Attorney, Agent, or Firm* — IRON SUMMIT IP LLP

(57) ABSTRACT

In various examples, a high definition (HD) map is provided that includes a segmented data structure that allows for selective access to desired road segments and corresponding layers of map data. For example, the HD map may be segmented into a series of tiles that may correspond to a geographic region, and each of the tiles may include any number of road segments corresponding to portions of the geographic region. Each road segment may include a corresponding set of layers—which may include driving layers for use by the ego-machine and/or training layers for generating ground truth data—from the HD map that are associated with the road segment alone. As such, when traversing the environment, an ego-machine may determine one or more road segments within a tile corresponding to a current location, and may selectively download one or more layers for each of the one or more road segments.

30 Claims, 43 Drawing Sheets

(52) U.S. Cl.
CPC . *B60W 2420/403* (2013.01); *B60W 2420/408* (2024.01); *B60W 2552/53* (2020.02); *B60W 2556/40* (2020.02)

(56) References Cited

U.S. PATENT DOCUMENTS

| | | | | |
|---|---|---|---|---|
| 2019/0304097 | A1* | 10/2019 | Eade | G06F 16/29 |
| 2019/0325737 | A1 | 10/2019 | Moustafa et al. | |
| 2020/0025935 | A1* | 1/2020 | Liang | G06V 20/64 |
| 2020/0132476 | A1* | 4/2020 | Roeth | G01C 21/3819 |
| 2020/0182626 | A1* | 6/2020 | He | G06T 7/11 |
| 2020/0202706 | A1* | 6/2020 | Chaves | G08G 1/166 |
| 2020/0208995 | A1* | 7/2020 | Hou | G01C 21/34 |
| 2020/0408546 | A1* | 12/2020 | Vaughn | G01C 21/3423 |
| 2021/0063200 | A1 | 3/2021 | Kroepfl et al. | |
| 2021/0082132 | A1* | 3/2021 | Cheng | G06V 10/757 |
| 2021/0200801 | A1* | 7/2021 | Agrawal | G06F 16/219 |
| 2021/0201504 | A1* | 7/2021 | Xu | G05D 1/0221 |
| 2021/0341940 | A1* | 11/2021 | Baik | G01C 21/3878 |
| 2022/0165010 | A1* | 5/2022 | Foley | G05D 1/0251 |
| 2022/0170752 | A1* | 6/2022 | Beaurepaire | B60W 50/0205 |
| 2023/0168095 | A1* | 6/2023 | Lee | G01C 21/3415 |
| 2023/0273044 | A1* | 8/2023 | Kim | G01C 21/3885<br>701/26 |
| 2023/0358568 | A1* | 11/2023 | Schuerman | G06F 16/29 |

OTHER PUBLICATIONS

Proos, et al., "Performance Comparison of Messaging Protocols and Serialization Formats for Digital Twins in IoV", 2020 IFIP Networking Conference, Jun. 22, 2020, 9 pgs.
Invitation to Pay Additional Fees for PCT Application No. PCT/US2022/025839, filed Apr. 21, 2022, mailed Jul. 21, 2022, 15 pgs.
International Search Report and Written Opinion for PCT Application No. PCT/US2022/025839, filed Apr. 21, 2022, mailed Sep. 26, 2022, 22 pgs.
Chreptyk, Russell; International Preliminary Report on Patentability for PCT Application No. PCT/US2022/025839, filed Apr. 21, 2022, mailed Nov. 2, 2023, 16 pgs.

* cited by examiner

MANIFEST 102

NVMAP 104

TILE 106A

LAYER 108A

MAP DATA 112

MAP DATA 112

LAYER 108D

MAP DATA 112

MAP DATA 112

MAPDATA 112

MAPDATA 112

TILE 106B

LAYER 108B

MAP DATA 112

MAP DATA 112

LAYER 108E

MAP DATA 112

MAP DATA 112

MAP DATA 112

MAP DATA 112

TILE 106C

LAYER 108C

MAP DATA 112

MAP DATA 112

LAYER 108F

MAP DATA 112

MAP DATA 112

MAP DATA 112

MAP DATA 112

1400

1500

1900

2100

2500

2700

3400

3300

4100

4200

4500

SERVER(S) 4878

CPU 4880(A)

CPU 4880(B)

PCIE SWITCH 4882(A)

PCIE SWITCH 4882(B)

PCIE SWITCH 4882(C)

PCIE SWITCH 4882(D)

4886

GPU 4884(A)

GPU 4884(B)

GPU 4884(C)

GPU 4884(D)

GPU 4884(E)

GPU 4884(F)

GPU 4884(G)

GPU 4884(H)

4888

NETWORK(S) 4890

4892

4894

4800

HIGH DEFINITION MAPPING

CROSS-REFERENCE TO RELATED APPLICATIONS

This application claims the benefit of U.S. Provisional Application No. 63/177,814, filed on Apr. 21, 2021, which is hereby incorporated by reference in its entirety. This application is related to U.S. Non-Provisional application Ser. No. 17/007,873, filed on Aug. 31, 2020, U.S. Non-Provisional application Ser. No. 17/008,074, filed on Aug. 31, 2020, and U.S. Non-Provisional application Ser. No. 17/008,100, filed on Aug. 31, 2020, each of which is hereby incorporated by reference in its entirety.

BACKGROUND

A high definition (HD) map is a key feature for autonomous driving functionality. Typically, HD maps are highly accurate and often contain a substantial amount of detail not found on traditional maps to allow for, without limitation, autonomous vehicle localization with high levels of accuracy and precision. However, due to the amount of detail provided in a HD map, data files for conventional HD maps are often very large and may include information that is not needed and/or wanted by an autonomous driving system. For example, a HD map may include data corresponding to any number of different sensor modalities and/or machine operations (e.g., planning, control, localization, etc.), and traditional systems may require downloading all of the HD map corresponding to a particular region. As such, where an autonomous machine is not equipped with LiDAR sensors, the downloaded HD map may still include LiDAR related data that is useless to the autonomous machine. As another example, conventional HD maps require downloading large payloads, and then parsing through the data to generate HD map data that is interpretable by the autonomous system. As a result, conventional systems not only require downloading and storing unnecessary map data, but also require converting the data to a digestible format—thereby resulting in increased run-time, compute, and storage requirements.

Further, conventional HD maps may encode various types of information—such as locations of lane lines, road boundaries, road dividers, and/or the like. However, with respect to lane lines and road boundaries, conventional HD maps encode lane lines and road boundaries according to their type—e.g., dashed, solid, etc.—and encode their location, but do not encode a separate representation of the lanes for more accurate traversing of the driving surface. For example, the lane lines or markings may not provide the most accurate representation of the boundaries of the lanes for the autonomous system to follow when driving due to the noise, variability, or non-existence of lane markings on the driving surface. As another example, conventional HD maps may encode types and/or locations of road dividers, boundaries, and/or the like, but may not encode the corresponding height of such dividers, boundaries, etc. In such an example, the autonomous system may not be aware—at least from the map data alone—that a first road boundary is defined by a painted line while a second road boundary is defined by a concrete barrier. As such, were the autonomous machine to operate based on the map data alone, the machine may not be aware of the reversibility and thus the safety level associated with maneuvering across the road boundary or divider, thus requiring a reliance on live perception of the machine to identify an associated height of the boundary or divider.

Traditional HD maps further require the autonomous machine to understand the rules and regulations of the current locale when making driving decisions. For example, although intersection locations and types—e.g., stop sign regulated, stop light regulated, etc.—may be encoded into HD maps, the interpretation of red lights, stop signs, yield signs, painted markings, and/or other information in the environment is based on rules and regulations as applied to the intersection. However, by requiring the autonomous machine to not only identify the relevant information about the intersection, but to also apply a rule set corresponding to the locale in order to determine how to navigate the intersection, the probability of an error or mistake in navigating the intersection is increased. For example, where a right turn on red is allowed in some regions and not in others, the autonomous machine is required to identify the intersection from the HD map, access separately a set of rules corresponding to the location, and then apply one or more of the rules in view of the intersection information. As a result, processing time is increased, and the complexity of the processing is increased as two separate sources of information—e.g., the HD map data and a set of local rules—are being relied upon to make a single decision.

SUMMARY

Embodiments of the present disclosure relate to high definition (HD) mapping for autonomous machine systems and applications. Systems and methods are disclosed that provide a HD map in a segmented data structure to allow for selective downloads of desired or required layers of map data. For example, the HD map may be segmented into a series of tiles that may correspond to a portion of map data for a geographic region, and each of the tiles may be associated with one or more classes of data that may, conceptually, be organized into layers—such as a junctions layer, a traffic signs layer, a lane divider layer, a wait conditions layer, a localization layer, a path planning layer, a route planning layer, etc.

In some embodiments, the layers may be further classified as being training layers—such as a map data layer used for training a deep neural network (DNN) model—and/or driving layers that may be used to inform an underlying autonomous driving system of an ego-machine. For example, as the ego-machine is traversing an environment, the system may selectively choose which driving layers are needed and/or wanted by the system. As some layers may be dependent upon other layers in order to function properly, the system may receive a selection of a layer and access a dependency graph to determine layer dependencies in order to access each of the layers required to perform the underlying functions of the ego-machine.

In some embodiments, one or more serialization formats (e.g., flatbuffers or Protocol Buffers) may be used to access and provide map layers directly to the system and without the need to deserialize and parse through a map file. For example, based on receiving a selection for a particular layer, the system may directly access an on disk representation of the selected layer based on a corresponding unique identifier and load the selected layer into memory. Additionally, based on a determined global coordinate, the system may determine which tile and/or road segment the ego-vehicle is currently in and access only the selected layer types—and any dependent layer types—required for the ego-vehicle to operate at the location. For example, where an ego-machine includes camera and LiDAR sensors, but does not include RADAR sensors, the ego-machine may request or receive the map layers for a current tile and/or road segments within the current tile that correspond to camera localization layers and LiDAR localization layers, but may not access the map layers for RADAR localization. As a result, excess map data is not required to be downloaded to the ego-machine when the ego-machine is not capable or configured to use the map data.

In some embodiments, the HD map data may include various representations of lane lines and/or road boundaries. For example, in addition to or alternatively from encoding the lane marking locations and types, the HD map may encode lane channels for each of the lanes on in the environment. The lane channels may include contiguous left and right edges for each lane that define the boundaries of the lanes more accurately—e.g., taking into account any noise, errors, or absence of lane markings—to allow the ego-machine to traverse the environment within the boundaries of the lane channels. Further, in some examples, road boundaries or dividers may include a height channel that includes a line—e.g., a polyline—encoded with height information that indicates the height of the boundary or divider to provide additional information for the ego-machine when making planning and control decisions. For example, without relying on live perception, the ego-machine may understand that some road boundaries or dividers are not traversable while others may be—e.g., in an emergency situation where crossing a road boundary may be a safest option.

By way of further example, as the ego-machine is driving, the system may request a junctions layer. The junctions layer may describe right of way rules of a roadway and define contended areas of the roadway. For example, the junctions layer may define intersection rules that are specific to a given intersection. Accordingly, the ego-machine may approach a particular intersection and be provided with an understanding of how to navigate the particular intersection without relying on a specific jurisdiction's rules or regulations. In other words, each intersection and/or road segment may be encoded with specific rules for the specific intersection and/or road segment and, by using the junctions layer in the HD map, traffic rules may be abided by without requiring a separate understanding of the specific jurisdictional rules.

BRIEF DESCRIPTION OF THE DRAWINGS

The present systems and methods for high definition (HD) mapping for autonomous machine applications are described in detail below with reference to the attached drawing figures, wherein.

DETAILED DESCRIPTION

Systems and methods are disclosed related to high definition (HD) mapping for autonomous machine systems and applications. Although the present disclosure may be described with respect to an example autonomous vehicle 4800 (alternatively referred to herein as "vehicle 4800" or "ego-machine 4800," an example of which is described with respect to FIGS. 48A-48D), this is not intended to be limiting. For example, the systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to providing a HD map in a segmented data structure, this is not intended to be limiting, and the systems and methods described herein may be used for a variety of purposes, by way of example and without limitation, for machine control, machine locomotion, machine driving, synthetic data generation, digital twinning, model training, perception, augmented reality, virtual reality, mixed reality, robotics, security and surveillance, autonomous or semi-autonomous machine applications, deep learning, environment simulation, data center processing, conversational AI, light transport simulation (e.g., ray-tracing, path tracing, etc.), collaborative content creation for 3D assets, cloud computing, and/or any other technology spaces where HD maps may be used.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation and digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

Figure 1:
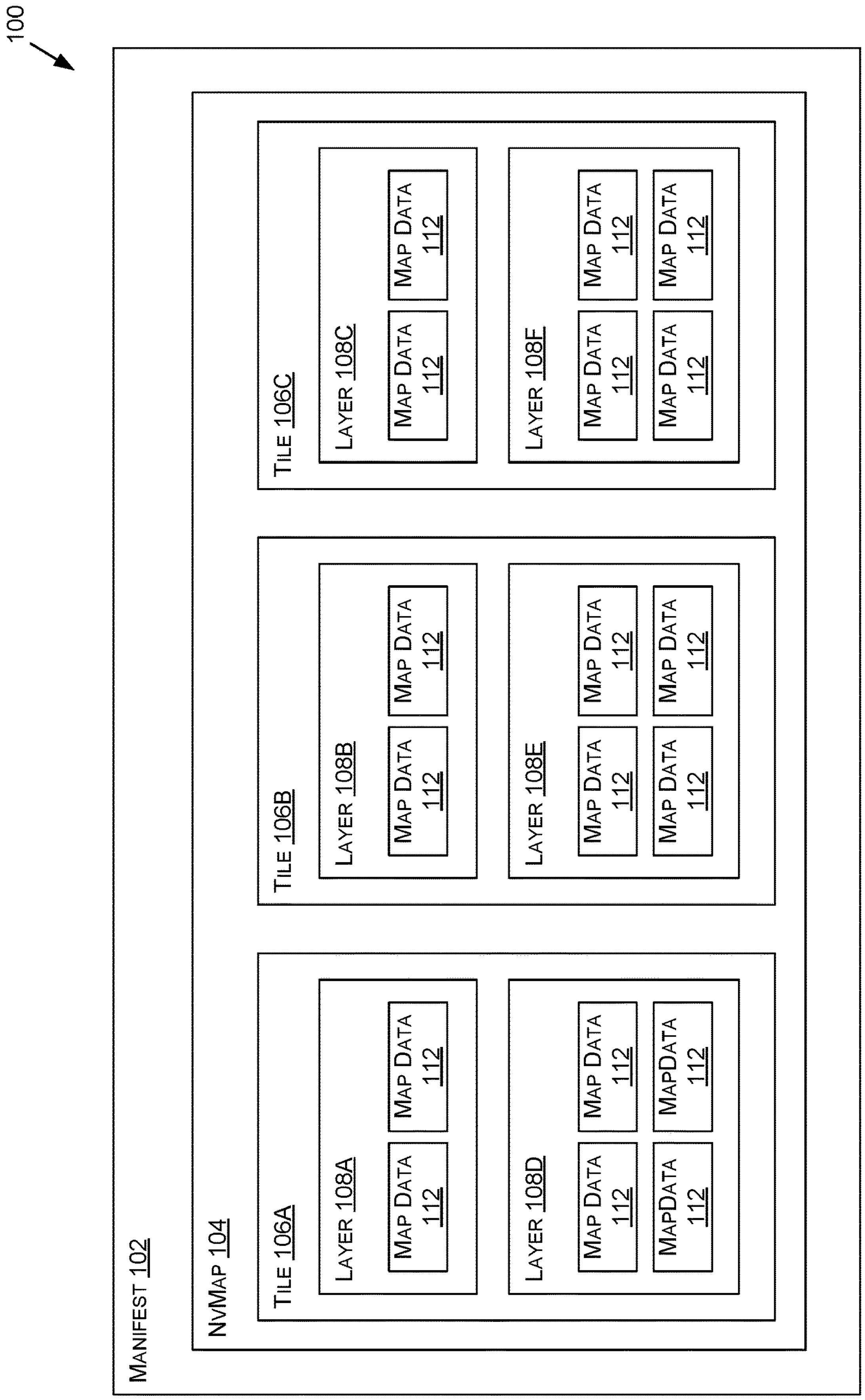
FIG. 1 illustrates a high level data architecture of a map manifest, in accordance with some embodiments of the present disclosure.

With reference to FIG. 1, FIG. 1 is an example a data format 100 for storing map data 112, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by any or a combination of hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 4800 of FIGS. 48A-48D, example computing device 4900 of FIG. 49, and/or example data center 4800 of FIG. 48.

Returning to FIG. 1, in some embodiments, the systems and methods disclosed may relate to the data format 100 for storing map data 112—such as, without limitation, in an NVIDIA Map (NVMap) data format. Additionally, the systems and methods may relate to interpreting the map data 112. By way of example, FIG. 1 illustrates a high level data architecture of a map manifest 102. As shown in FIG. 1, the map manifest 102 may provide a high level container for a HD map 104 (e.g., a map in the NVMap data format). In some embodiments, the HD map 104 may be identified by a universally unique identifier (UUID). In some embodiments, the data in the HD map 104 may be immutable and never change. For example, later versions or updates to the HD map 104 and/or map components may be published with a new UUID.

In some embodiments, the map manifest 102 for the HD map 104 may define one or more tiles 106A-106C. A tile (e.g., tile 106A) may represent a container for a portion of map data 112 that corresponds to a geographic region (e.g., one square kilometer) of the HD map 104. The one or more tiles 106A-106C may be designed to be downloaded as a unit, or may be designed such that individual road segments within the tile (e.g., tile 106A) may be downloaded. For example, a road segment within the tile 106A may represent a portion of a roadway (e.g., 50 meters), and each tile (e.g., tiles 106A-106C) may include a plurality of road segments defined therein—e.g., each of the road segments within the tile 106A geographic region may be included within the tile 106A. By storing the map data 112 in tiles 106A-106C, and then as road segments within the tiles 106A-106C, map data 112 may be more easily searchable. For example, instead of searching an entire map manifest 102, a listing of tile locations may be used to determine the tile 106A corresponding to a current location of the ego-machine, and then a listing of road segments within the tile 106A may be used to determine which road segments correspond to the current location of the ego-machine. As a result, this tiered structure for the HD map 104 may allow for easier access to the desired portions of the HD map 104 for use by the ego-machine.

Layer 108A-108F data may be stored in association with each road segment, such that each road segment may include a corresponding layer 108A-108F for each layer type that the HD map 104 represents. As such, for road segment A, there may be a camera localization layer A, a RADAR localization layer A, a lane graph layer A, a lane channel layer A, a junctions layer A, and so on, and for road segment B, there may be a camera localization layer B, a RADAR localization layer B, a lane graph layer B, a lane channel layer B, a junctions layer B, and so on. In various examples, if a developer wants to edit layer 108A-108F data for a road segment, the developer may select the road segment and be provided with all the layers 108A-108F associated with the road segment, which allows the developer to edit any layer 108A-108F of the road segment. In addition, by segmenting the HD map 104 by tiles 106A-106C, then road segments, and then layers 108A-108F within road segments, the HD map 104 may be updated, downloaded, and or used (e.g., for driving, training of perception systems, etc.) at a more granular level, without requiring downloads, updates, or use of portions or segments of the HD map 104 that are not relevant, supported, or needed for a given task.

Figure 2:
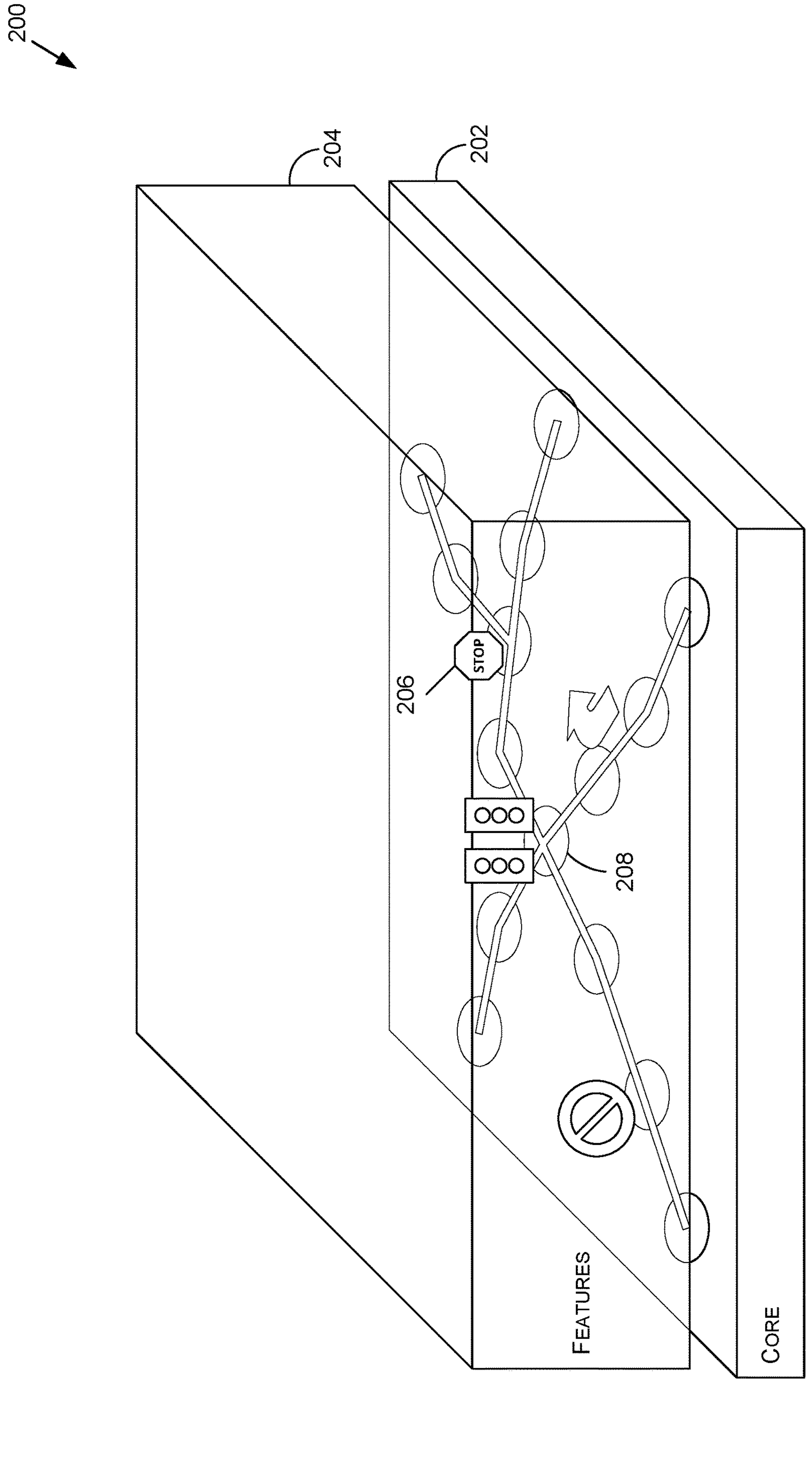
FIG. 2 illustrates an example tile that may be composed of map layers, in accordance with some embodiments of the present disclosure.

FIG. 2 illustrates an example visualization of a tile 200 that may be composed of map layers. In some embodiments, a map layer may represent a class of data on the map. These map layers may be selectively downloaded to allow a client to only download relevant data to the ego-machine. A map layer may be made up of a core layer 202 and one more map feature layers 204. The core layer 202 may define a graph structure of the map—such as a graph of road lanes. The map feature layer(s) 204 may include features such as traffic signs 206, junctions 208, training layers (e.g., for generating ground truth data for training machine learning models, deep neural networks (DNNs), and/or the like), and other types of feature layers. Individual map feature layers may be optionally/selectively downloaded as needed. For example, a user may optionally download a 'traffic signs' layer in order to gain access to traffic signs 206 in the world. In some embodiments, layers may also be used to augment existing data, such as a junctions 208 layer which may include rules for navigating intersections. Advantageously, the level of detail/granularity of the HD map may be scaled up or down based on the needs of the system.

In some embodiments, the layers may be further classified as being training layers—such as a map data layer used for training a deep neural network (DNN) model—and/or driving layers that may be used to inform an autonomous driving system of an ego-machine. For example, training layers may be used to help train underlying perception of the ego-machine. The training layers may be automatically generated, and/or may be human labeled. For example, a human labeler may label information in the HD map training layers that may be used to generate training data for any type of sensor modality. As a non-limiting example, lane marking and/or road boundary layers may be used as training layers, where lane markings and/or road boundaries from the HD map training layers may be used to generate ground truth data for an image-based DNN that processes images to compute locations of lane lines and/or road boundary lines. In some embodiments, as described herein, the lane markings layer (e.g., including lane line types, locations, etc.) may not be used for driving, and may only be used for training, while a lane channel layer may be used for driving. For example, the lane channel layer may include continuous unbroken boundaries of each lane that may be used for guiding the ego-machine along the roadway. In some embodiments, the lane markings layer may be used to aid in generating the lane channel layers, but the lane marking layers may be relied upon for driving while the lane channel layers may be relied upon for driving. Moreover, in some embodiments, one or more layers may be classified as both a training layer and a driving layer.

In some embodiments, layers may be identified by a unique string layer name. For example, layer names may identify the layer with names such as 'core', 'junctions', and/or 'images radar detections'. Accordingly, references to a layer may be made by the layer's unique layer name.

In some embodiments, a data compatibility contract may be defined per layer name such that a payload for each layer may be designed to be backwards and forwards compatible. If a data format must change that will break backwards and forward compatibility, a new layer with a new layer name may be defined. For example, if a new format is required for the data inside a new 'traffic signs' layer that would be incompatible with existing clients of the 'traffic signs' layer, a new layer may be created instead (e.g. 'traffic_signs2'). In further embodiments, optional additional data may be added to one or more layers provided it is not required for legacy consumers to read the data.

In some embodiments, layers may have layer dependencies. A layer that has a dependency may not be processed or may only be partially processed by the system unless one or more required dependent layers are also present and/or provided to the system. For example, each layer may depend on the 'core' 202 layer and require that the 'core' 202 layer or a portion thereof be provided to the system in order to use any additional layers. In some embodiments, layer dependencies may be configured into a dependency graph where layers may reference sub-layers that may be required in order to use a particular layer. Other types of dependencies can be applied between layers and/or defined within the dependency graph. For example, a particular layer may have multiple dependencies and/or conditional dependencies. If a particular layer is selected, the system may determine which sub-layers are needed and provide each of the needed sub-layers or portions thereof, along with the selected layer, to the ego-machine to enable the ego-machine to process or otherwise utilize the data of the selected layer. For example, if the junctions 208 layer is selected, the system may determine that a lanes layer is required to describe the geometry of the roadway in order to apply roadway rules from the junctions 208 layer.

In some embodiments, the system may restrict new layer dependencies from being added to a layer. In some examples, new layer dependencies are disallowed as past clients may not be able to understand the new dependent layer. However, in some embodiments, layer dependencies may be removed if data no longer references the target layer. In further embodiments, the system may prohibit circular dependencies, such that a layer that is depended on cannot then depend on the layer(s) that depend on it—e.g., if a circular dependency exists, this may be evidence that two layers should be collapsed into one. In an example, the layer name and layer dependencies may be defined by the system in a layer descriptor.

In some embodiments, the system may enforce layer design principles when designing new layers. For example, the system may allow for the creation of a new layer in examples where a portion of data is desired by only specific clients. In such examples, a new layer may not enforce restrictions on a layer below the new layer, as layer designers may prefer ease of encoding correctly, over encoding compactly. In addition, in an embodiment, layers may be designed with size optimizations based at least in part on calculations and benchmarking, rather than premature optimization. In some examples, creating types of changes (e.g., breaking changes) to layers are prevented and there types of changes to the layers may be made by creating a new layer and deprecating the old layer.

In some embodiments, a map manifest may be stored in a file format—such as a JavaScript Object Notation (JSON) file—that describes a tile layout and layer layout of a map. The manifest may operate as a container for data payloads and may not prescribe any detail of a layer's payload format. The format for layers may be described in a 'Layer Format' section of the manifest.

By way of example, the manifest may contain a JSON object, such as the example provided below.

```
{
  "id": "fd105691-bc7d-4655-96f4-be79ce72f792",
  "tiles": [
    {
      "id": "cc9f7d3f-055c-432c-a5c0-821cf1ab8bba",
      "region": {
        "top": 57.78217684286119,
        "left": 12.733587643120245,
        "bottom": 57.761107887540284,
        "right": 12.759924436699398
      },
      "layers": [
        {
          "name": "images__radar__detections",
          "link": {
            "size": 71523,
            "hash":
"b88fd3707b4e947fe76371f0b7115c7a9c23cb6f69691ec74555d2d34f384c2c",
            "path": "http://cdn.devo.drive.nvda.io/nvmap/v3/l/cc9f7d3f-055c-432c-
a5c0-821cf1ab8bba/images__radar__detections",
            "type": "json"
          }
        },
        {
          "name": "core",
          "link": {
            "size": 2608874,
            "hash":
"7b53e01a7d8c52be84cb1ef22da953369f9c8dce6c8a8ec810c8f4073c6c35c1",
            "path": "http://cdn.devo.drive.nvda.io/nvmap/v3/t/cc9f7d3f-055c-432c-
a5c0-821cf1ab8bba/core",
            "type": "xml"
```

-continued

```
          }
        }
      ]
    }
  ],
  ...
}
```

In some embodiments, the manifest file may contain a UUID for a map ('id') and a list of tiles ('tiles'). Each of the tiles of the list of tiles may contain a UUID for the tile ('id'), a quadrilateral for a geographic region the tile represents ('region'), a list of layers within the tile ('layers'), and/or other necessary data for the tiles. One or more layers in the layer list may contain a unique name of the layer(s) ('name'), a 'Link' object that may describe a URL for the layer payload. In some embodiments, the layer payload may be raw layer data, for example, an XML, file for a legacy XML layer and/or a layer manifest when layer contains multiple payloads.

By way of example, a layer manifest file may be formatted as shown below.

```
{
  "tile_id": "cc9f7d3f-055c-432c-a5c0-821cf1ab8bba",
  "name": "images_radar_detections",
  "items": [
    {
      "name": "1000-0-0",
      "link": {
        "size": 2250017,
        "hash":
"e0e49d07743b967d2bebcfb2476bb73b17bc97db1811c0d04db1e3b8c64d951c",
        "path":
"http://cdn.devo.drive.nvda.io/nvmap/p/e0e49d07743b967d2bebcfb2476bb73b17
bc97db1811c0d04db1e3b8c64d951c",
        "type": "pgm"
      },
      "meta": {
        "width": 1500,
        "height": 1500,
        "resolution_meter_per_pixel": 0.2,
        ...
      }
    },
    {
      "name": "1000-1-0",
      "link": {
        "size": 2250017,
        "hash":
"dfe273a01df15db373efcb5a81f821059036cccc7c0cb0e027799a38c0cd5374",
        "path":
"http://cdn.devo.drive.nvda.io/nvmap/p/dfe273a01df15db373efcb5a81f82105903
6cccc7c0cb0e027799a38c0cd5374",
        "type": "pgm"
      },
      "meta": {
        "width": 1500,
        "height": 1500,
        "resolution_meter_per_pixel": 0.2,
        ...
      }
    }]
  }
```

In some embodiments, the layer manifest file may contain a UUID of the tile that contains it ('tile id'), a unique name of the layer ('name'), a list of payload items ('items'), and/or other necessary data for the layer manifest. The payload items may contain a name for the payload ('name'), a link object that may describe where to download the payload ('link'), metadata regarding the payload ('meta'), and/or other payload information.

In some embodiments, the manifest may not prescribe the content of layer payloads and instead, a data contract for the payload is defined per layer name. In a non-limiting embodiment, there may be four format archetypes that layers follow for their data contract and new archetypes may be added for new layers. In some embodiments, a 'Flatbuffer Layer' may be the preferred archetype for all new layers. This layer format may rely on Flatbuffers for data serialization. A Flatbuffer Layer may include a layer manifest as described herein, and the payloads of a Flatbuffer Layer may be configured as a Flatbuffer message. The Flatbuffer messages may be defined in, for example, in the HD map, data object, JSON object, or other location. In further embodiments, layer content may be stored in Flatbuffer messages for each core road segment. Additionally, the name of the payload may be the unique UUID of the road segment. Common data types may be available for use within the Flatbuffer layers. An example Flatbuffer layer is provided below.

```
{
  "tile_id": "cc9f7d3f-055c-432c-a5c0-821cf1ab8bba",
  "name": "lane_dividers",
  "items": [
    {
      "name": "1000-0",
      "link": {
        "size": 30,
        "hash":
"e0e49d07743b967d2bebcfb2476bb73b17bc97db1811c0d04db1e3b8c64d951c",
        "path":
"http://cdn.devo.drive.nvda.io/nvmap/p/e0e49d07743b967d2bebcfb2476bb73b17
bc97db1811c0d04db1e3b8c64d951c",
        "type": "nvmap"
      }
    },
    {
      "name": "1000-1",
      "link": {
        "size": 544,
        "hash":
"dfe273a01df15db373efcb5a81f821059036cccc7c0cb0e027799a38c0cd5374",
        "path":
"http://cdn.devo.drive.nvda.io/nvmap/p/dfe273a01df15db373efcb5a81f82105903
6cccc7c0cb0e027799a38c0cd5374",
        "type": "nvmap"
      }
    }]
}
```

In some embodiments, data elements in a map may be referenced by a UUID. For example, the standard identifier message may be 'MapElementId', as shown in the example below.

```
message MapElementId {
  uint64 id_high = 1; //The higher 64-bits of the Id
  uint64 id_low = 2; //The lower 64-bits of the Id
}
```

In some embodiments, a UUID may comprise 128-bits, which may be stored as two 64-bit unsigned integers, with the high and low bits being stored as 'id high' and 'id low' respectively.

In some embodiments, a layer may refer to elements of another layer. For example, a traffic light on the 'traffic lights' layer may be associated with a lane on the 'core' 202 layer. As used herein, in various examples, a layer whose data is being referenced may be called the target layer and a layer that contains the reference to the target layer may be called a source layer. A 'MapElementId', for example, may be used to refer to an entity when the target layer does not change. In an embodiment, the target layer may be documented in the message comments so that a decoding implementation knows which layer to search to find the data.

In some embodiments, the disk representation may include per road segment (e.g., flatbuffers) payloads being stored in a map directory (e.g., map directory/[layer name]/[road segment id].nvmap). For example, the use of flatbuffers may allow for each layer corresponding to each road segment to be downloaded individually and directly to the ego-machine without deserialization or parsing. As opposed to conventional HD maps where large map files are downloaded, deserialized, and parsed in order to generate map data in a digestible format for the ego-machine, the HD map of the present disclosure may include individual flatbuffer payloads for each layer within each road segment identified using UUIDs, for example. As such, when downloading the desired layer(s) for a given (e.g., current) road segment, the ego-machine may request the data corresponding to the layer within the road segment and receive the flatbuffer payload that may be used directly without deserialization, parsing, and/or the like. For example, the entire payload from the flatbuffer may be downloaded directly to memory—e.g., into a cache— and then discarded once the road segment has been traversed. In some examples, the cache may store data for a current road segment and one or more surrounding road segments, and may discard road segment data once the road segment has been traversed, or is not going to be traversed.

In some embodiments, a legacy layer may be a layer whose payload consists of a single payload file—such as a XML payload file. In such embodiments, the only layer to use this format may be old 'core' layer implementations. In some examples, legacy layers may have no formal definitions for layer dependencies or layer references. In an embodiment, new layers may use a particular layer archetype (e.g., Protobuf layer archetype). In one example, legacy image layers may contain raw images per core road segment, and the payload of an image layer may be a layer manifest. In some embodiments, layer manifest items may contain a list of images whose name is a road segment UUID. In some embodiments, metadata for the images including their width and height may be included in the file. An example, file is shown below.

```
{
  "tile_id": "cc9f7d3f-055c-432c-a5c0-821cf1ab8bba",
  "name": "images_radar_detections",
  "items": [
    {
      "name": "1000-0-0",
      "link": {
        "size": 2250017,
        "hash":
"e0e49d07743b967d2bebcfb2476bb73b17bc97db1811c0d04db1e3b8c64d951c",
        "path":
"http://cdn.devo.drive.nvda.io/nvmap/p/e0e49d07743b967d2bebcfb2476bb73b17
bc97db1811c0d04db1e3b8c64d951c",
        "type": "pgm"
      },
      "meta": {
        "width": 1500,
        "height": 1500,
        "resolution_meter_per_pixel": 0.2,
        ...
      }
    },
    {
      "name": "1000-1-0",
      "link": {
        "size": 2250017,
        "hash":
"dfe273a01df15db373efcb5a81f821059036cccc7c0cb0e027799a38c0cd5374",
        "path":
"http://cdn.devo.drive.nvda.io/nvmap/p/dfe273a01df15db373efcb5a81f82105903
6cccc7c0cb0e027799a38c0cd5374",
        "type": "pgm"
      },
      "meta": {
        "width": 1500,
        "height": 1500,
        "resolution_meter_per_pixel": 0.2,
        ...
      }
    }]
  }
```

By way of example, the table below provides a list of layers that may be included in an HD map.

| Layer Name | Archetype | Description |
| --- | --- | --- |
| core | Legacy XML | The core map that contains: Road Segments, Lanes, Lane Traversability |
| core_v1 | Flatbuffer | Legacy core representation in Flatbuffers |
| road_segments_v1 | Flatbuffer | Defines coordinate systems for the map |
| lanes_v1 | Flatbuffer | Contains detailed geometry of road lanes and their traversability |
| lane_dividers | Protobuf | Lane Dividers and Road Boundaries |
| lane_channels | Protobuf | Channels that define the lateral space of lanes |
| road_markings | Protobuf | Painted features on the road |
| poles | Protobuf | Vertical features that correspond with real-world poles for localization |
| junctions | Protobuf | Right of way rules for navigating intersections and contentions |
| images_lidar_ground_reflectance | Legacy Image | Images used for LiDAR Location |
| images_lidar_elevation_model | Legacy Image | Images used for LiDAR Location |
| images_lidar_giraffe_plane_raw | Legacy Image | Images used for LiDAR Location |
| images_lidar_giraffe_plane | Legacy Image | Images used for LiDAR Location |
| images_radar_detections_raw | Legacy Image | Images used for RADAR Location |
| images_radar_detections_rcs | Legacy Image | Images used for RADAR Location |
| images_radar_detections | Legacy Image | Images used for RADAR Location |
| frame_transforms_v1 | Flatbuffer | Map fusion frame transforms data |
| ground_truth_v1 | Flatbuffer | Per-segment GT (origin + ENU rotation) |
| static_obstacles_v1 | Flatbuffer | Speed bumps and undriveable areas |
| parking_spaces_v1 | Flatbuffer | Parking-specific map annotations |

In some embodiments, a core 202 layer may contain non-image features and may be replaced with other layers specified. A schema—such as a flatbuffer or protobuf schema—may be used to define each road segment of a layer. In some embodiments, one or more serialization formats (e.g., flatbuffers or protocol buffers (protobuff)) may be used to access and provide map layers directly to the system and without the need to deserialize and parse through a map file. For example, based on receiving a selection for a particular layer, the system may directly access an on disk representation of the selected layer based on a corresponding UUID and load the selected layer into memory. Additionally, based on a determined global coordinate, the system may determine which tile and/or road segment the ego-vehicle is in and access only the selected layer(s)— and any dependent layers—from the tile(s) and/or road segments corresponding to the location of the ego-machine.

In some embodiments, a map directory may contain several files. For example, there may be a directory called 'core_v1' with files of the format "[id].nvmap" where each file may be decoded using a layer table—such as a 'CoreV1Layer' table. For example, the directory/layer may contain elements such as, Road Segments, Lanes, Lane Groups, Lane Divider Groups, Lane Dividers, and/or Features, among others.

In some embodiments, the payloads of, for example, core_v1, may represent one or more road segments. In an embodiment, the road segments may define a local coordinate system for all other elements. These elements may be defined by a UUID, a World Geodetic System 1984 (WGS84) global position (latitude, longitude, height), and/or connections (e.g., including relative local transformations) to other road segments. In some embodiments, road segments may be connected to nearby segments, and any two road segments that a vehicle can travel between may be connected. For example, these road segment connections include a transformation from a connected coordinate system into a local coordinate system. In some examples, a direction of the connections is not relevant, such that the connections between road segments and/or the transformations there between may not be related to the travel direction of an ego-machine.

In some embodiments, a lane is defined as a 3D polyline that represents a drivable path. In some examples, the lanes may coincide with real-world lanes, but in many instances such as an intersection, lanes may simply represent drivable paths through the world. Further, lane geometry may not correspond directly with the geometric center between lane dividers, in some examples.

In some embodiments, lanes may include connections to other lanes, and these lane connections may represent the ability for a vehicle to move from one path to another. In some examples, there may be no geometric gap between two connected lanes, and each lane may have a set of previous and next connections where the previous and next are relative to the geometry of the lane. Moreover, each connection may include a direction flag, which may be oriented in the same direction. In some embodiments, a value of a SameDirection flag may indicate whether the geometry of the connected lane is in the same order as the origin lane. For example, when the SameDirection is a false value, the connected lane's geometry may be in the opposite order. An example evaluation of lane connections is: A->NEXT={B, SameDirection=TRUE} and B->PREVIOUS {A, SameDirection=TRUE} where the lane's geometry for A and B is defined as the same direction; C->NEXT={D, SameDirection=FALSE} and D->NEXT={C, SameDirection=FALSE} where the lane's geometry for C and D is not defined as the same direction. In various embodiments, the SameDirection flag is set to true if the lanes being compared travel in the same directed and false when the lanes do not.

In some embodiments, wait elements and wait conditions may describe yielding rules between lanes. In addition, in various embodiments, lane groups may describe a set of neighboring lanes, where two lanes may be neighboring when the ego-machine can physically cross between the two lanes—e.g., irrespective of whether it is legal to do so. For example, lane groups may describe the ability to legally traverse between the lanes with a flag. In some embodiments, lanes in a group may be ordered left to right, with lower index lanes being left of higher index lanes. In an example, left/right may be defined by the geometry of the lanes instead of the driving direction of the lanes. In some embodiments, a lane divider may represent a painted marking or physical boundary bordering a lane. Features of the map may be arbitrary objects that may be defined by a polyline or polygon.

In some embodiments, the core layer may define the fundamental map structure through road segments and lanes. With initial reference to road segments, the map of the world may be divided into sections called road segments. Furthermore, in an embodiment, segments may be defined by a single global—e.g., WSG84—latitude, longitude, and/or height point, and may also be defined by a local coordinate system of the road segment itself with an origin near a center of the road segment. In such embodiments, features of the map may have a location relative to the local coordinate system of the road segments, and the local coordinate system may have a relative location in a global coordinate system. For example, the geometry for each element may be defined within the coordinate system defined by a road segment.

Figure 3:
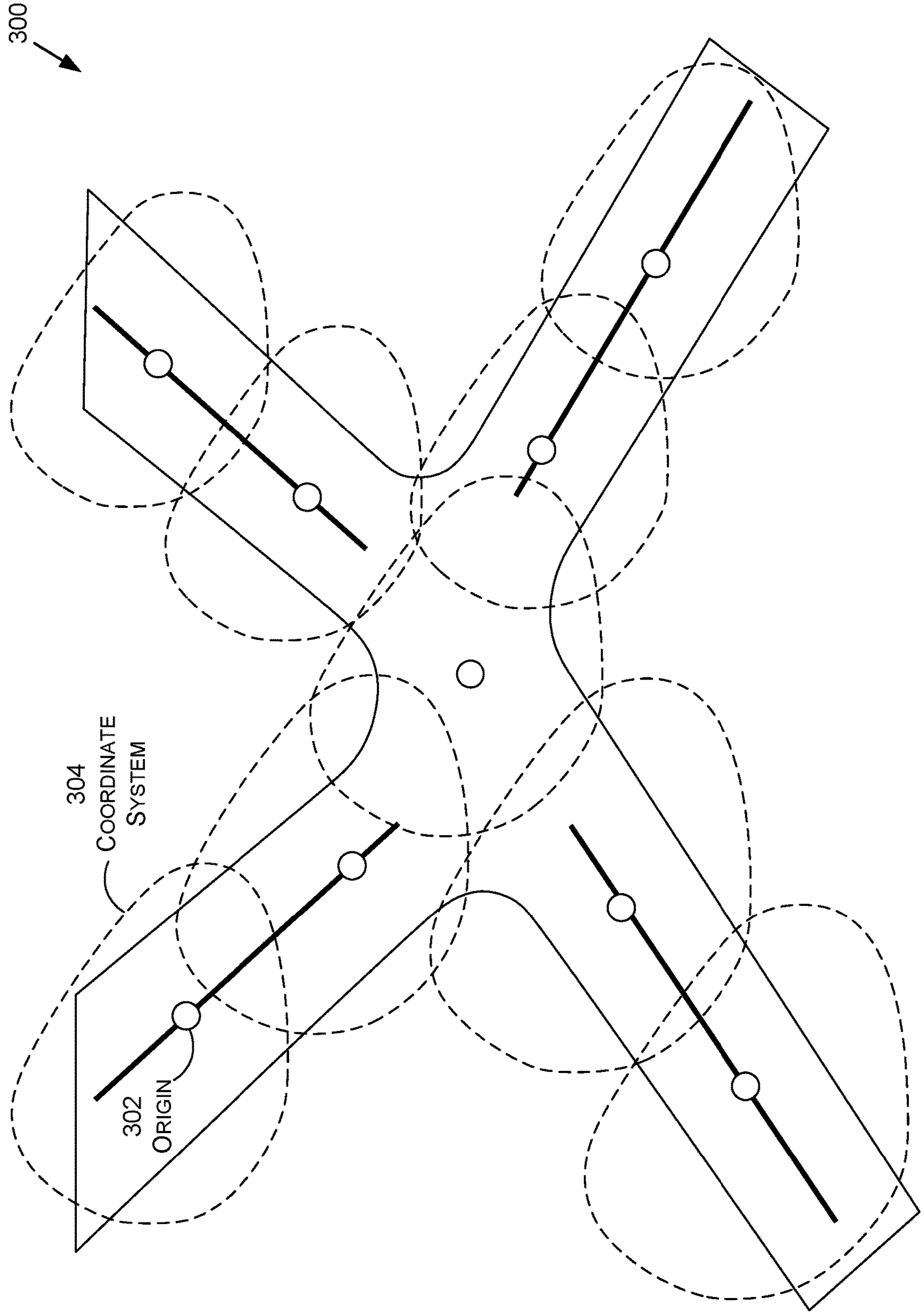
FIG. 3 illustrates an example of road segments, in accordance with some embodiments of the present disclosure.

FIG. 3, illustrates an example 300 of road segments. For example, in FIG. 3, each blob (represented by dashed lines in FIG. 3) may represent a road segment, and each dot may correspond to a local origin 302 of the road segment in the local coordinate system 304. The transformations between road segments may include transformation between origins 302 of adjacent road segments. In some embodiments, road segments may have a maximum size (e.g., 1 km) such that points are within a distance (e.g., 500 m) to a road segment origin 302. In some embodiments, road segments may be connected to nearby segments—e.g., any two road segments that a vehicle can travel between may be connected.

Figure 4:
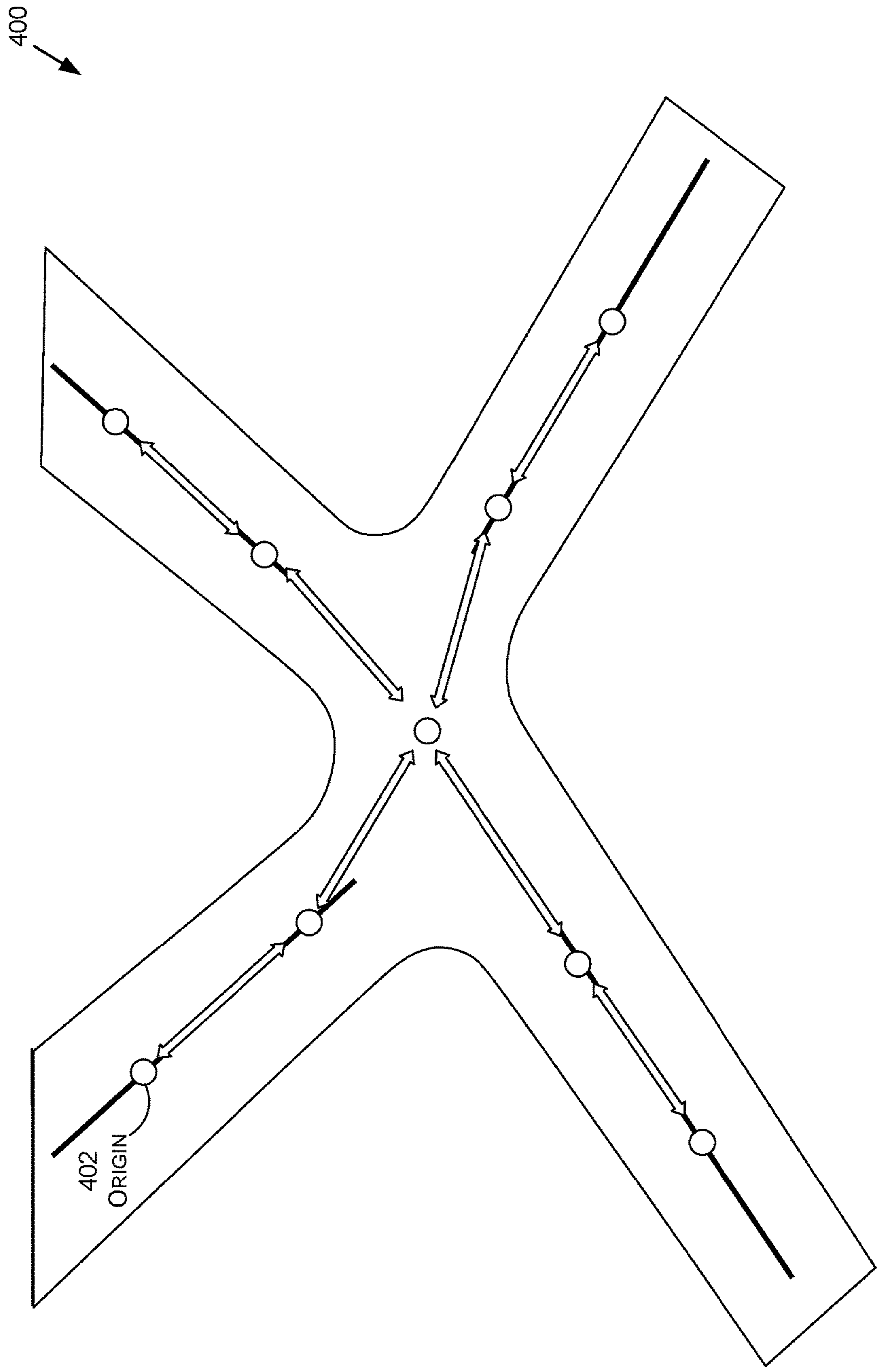
FIG. 4 illustrates an example of connections between road segments, in accordance with some embodiments of the present disclosure.

FIG. 4, illustrates an example 400 of connections between road segments. For example, FIG. 4 illustrates connections between adjacent road segments as indicated by arrows as illustrated in FIG. 4 between origins 402 of connected road segments. As such, in various embodiments, when an ego-machine is localized to a local coordinate system (e.g., coordinate system 302 described above in connection with FIG. 3) of a road segment, and then traverses into a next connected road segment, the localization results may be transformed to the local coordinate system of the next or connected road segment using the known transformation between the two road segments stored in the map data.

In some embodiments, a lane may be defined as a three dimensions (3D) polyline that represents a drivable path. These lanes may coincide with real-world lanes, but in many instances—such as an intersection—lanes may represent one or more drivable paths through the world. In some embodiments, the lane geometry may not correspond directly with the geometric center between lane dividers as described in greater detail below with respect to FIGS. 5 and 6.

Figure 5:
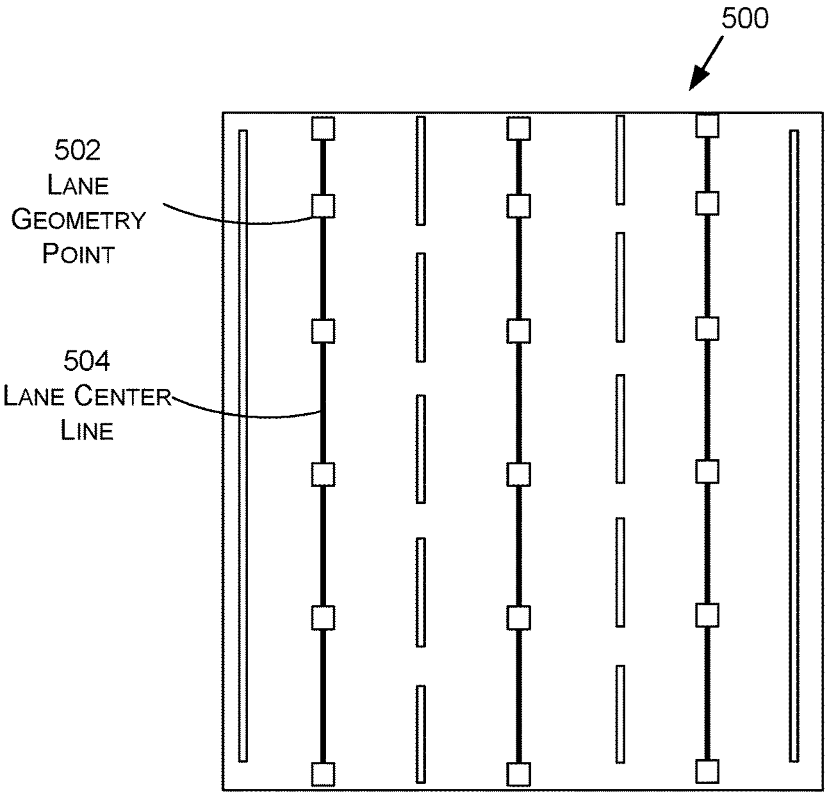
FIG. 5 illustrates an example of lanes representing one or more drivable paths through an environment, in accordance with some embodiments of the present disclosure.

FIG. 5 illustrates an example 500 of lanes representing one or more drivable paths through an environment. For example, FIG. 5 illustrates lane geometry points 502 and lane center lines 504. In some embodiments, a direction an ego-machine drives is not always the same as the order of points (lane geometry points 502) in a polyline. Each lane may include one of the following driving directions: forward (e.g., ego-machines may drive from point 0 to the last point in the lane); backward (e.g., ego-machines may drive from the last point to point 0 in the lane); and/or bidirectional (e.g., ego-machines may drive in either direction).

Figure 6:
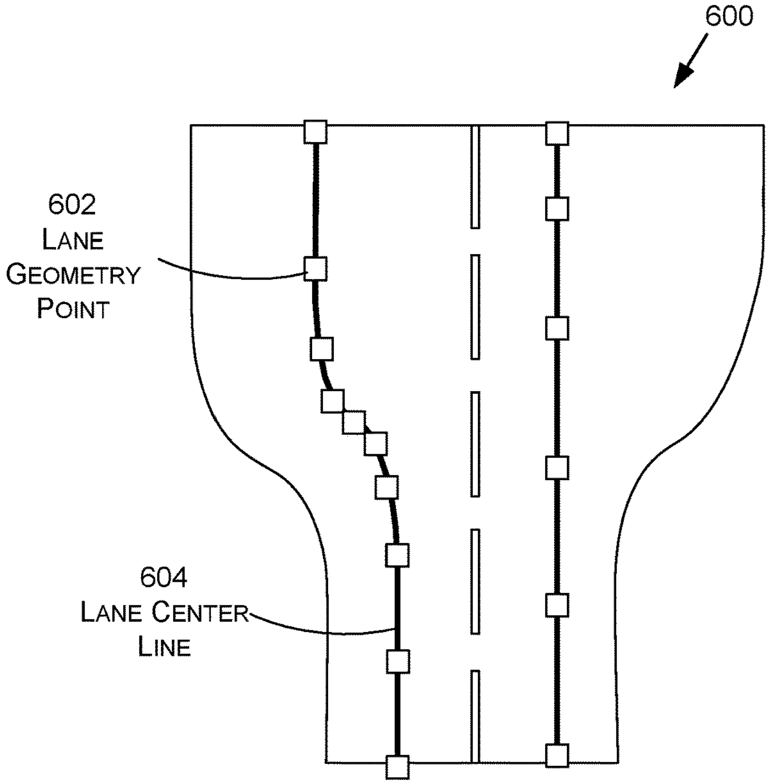
FIG. 6 illustrates an example of lanes representing one or more drivable paths through an environment, in accordance with some embodiments of the present disclosure.

FIG. 6 illustrates an example 600 of lanes representing one or more drivable paths through an environment. For example, FIG. 6 illustrates lane geometry points 602 and lane center lines 604. In various embodiments, a lane representing a drivable path includes a greater (or lesser) number of lane geometry points 602. In addition, the lane center line 604, as illustrated in FIG. 6, need not be in the center of the lane as indicated by the lane markings.

Figure 7:
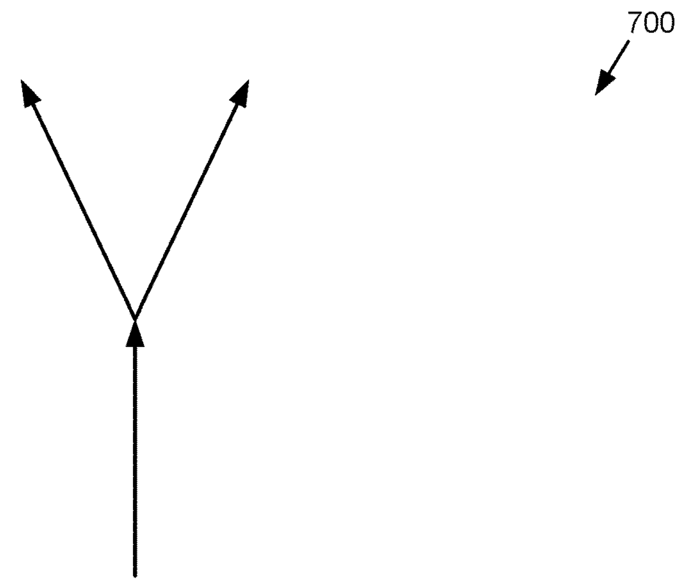
FIG. 7 illustrates an example of lanes that include connections to other lanes, in accordance with some embodiments of the present disclosure.

FIG. 7 illustrates an example 700 of lanes that include connections to other lanes. For example, a lane connection may represent the ability for an ego-machine to move from one path to another, illustrated in FIG. 7 as diverging arrows. For connected lanes, in some embodiments, there may be no geometric gap between two connected lanes. In addition, in some embodiments, each lane may include a set of previous and next connections. Previous and next connections may be relative to the geometry of the lane. For example, previous connections may be attached to center line[0] and next connections may be attached to center line[center_line.length−1]. Each connection may include identifying information of a connected channel side and a same_direction flag. If the same_direction value is true, then the connected channel side is considered to be oriented the same way. In some examples, at splits and merges, all members of a connection may be required to be connected to all other members. For example, and as shown in FIG. 7, if there is a split with 1 incoming channel and 2 outgoing channels, the incoming channel's next connections may connect to both outgoing channels. Accordingly, the outgoing channels' previous connections may connect to the incoming channel, and the other outgoing channel with a same direction flag as false, as illustrated in FIG. 7.

In various embodiments, when driving, an ego-machine is permitted to change lanes. For example, since the lane change can occur at any point along the lane and not just at the beginning or end, the map may use a lane change metric to represent the ability to traverse between lanes. In an embodiment, the lane change metric may define an interval along source and destination lanes, where the interval may define an area along the source and destination lanes where the ego-machine can change lanes.

Figure 8:
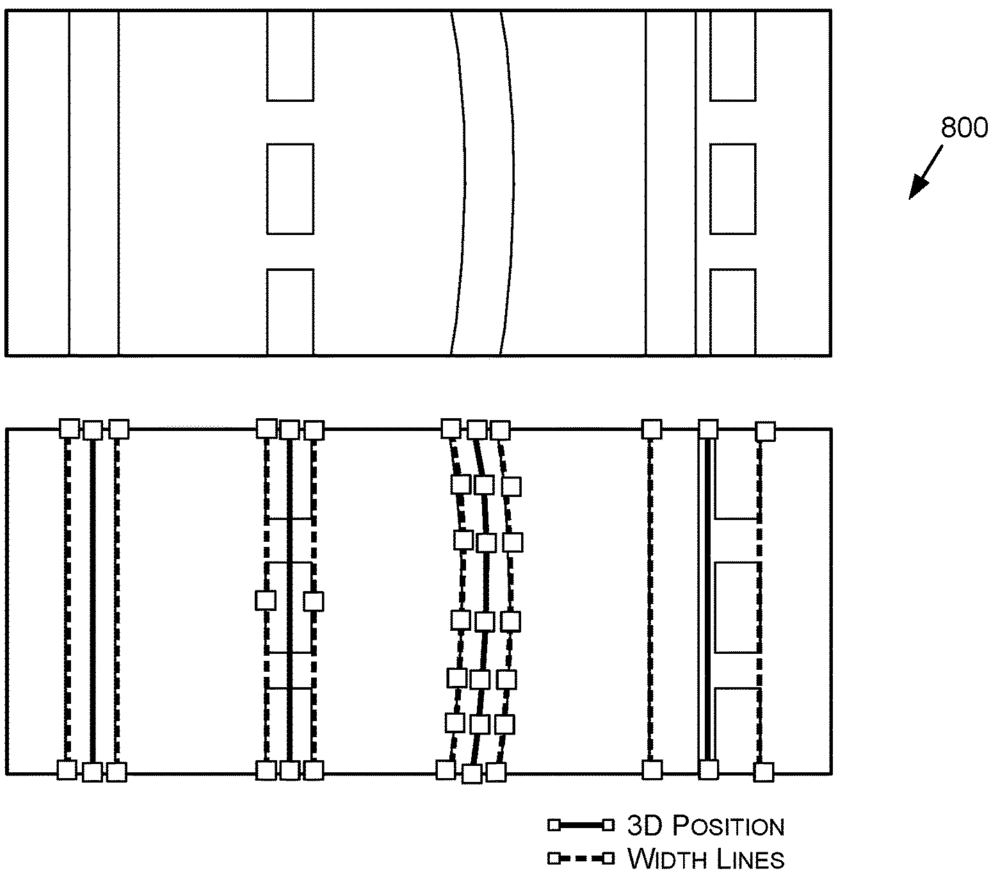
FIG. 8 illustrates an example of lane divider layers, in accordance with some embodiments of the present disclosure.

FIG. 8 illustrates an example 800 of lane divider layers. In some embodiments, a lane dividers layer (e.g., lane_dividers) may contain lane dividers and road boundaries. For example, the lane dividers may be painted physical markings that separate two lanes from each other, and the dividers may be physically crossable by a vehicle. In another example, the road boundaries may define physical obstacles that together define the boundaries of drivable space. In some embodiments, the goal of the lane dividers layer may be to provide the geometry and type of lane dividers and road boundaries on the road.

With reference to FIG. 8, divider geometry may be defined by one or more polylines. In some embodiments, all polylines may include the same number of points. In the example of a center polyline describing the center of a divider, along the length of the divider, if the divider is flat with no height then the center line may exist on the road surface plane. In other examples, left/right polylines may together describe a width of the divider. In additional examples, a height polyline may describe a height along the length of the divider. For example, if a divider includes a raised structure—e.g., a cement barricade, a fence, a wall, etc.—the height polyline may encode the height of the structure such as to inform the ego-machine whether the structure can be traversed. In such examples, some road dividers may include a painted line that is easily traversable in an emergency situation, while other dividers are not traversable. As such, by encoding the height in a polyline corresponding to the road boundary, the height information may be relied upon by the ego-machine without requiring the ego-machine to use live perception to identify or estimate a height.

In some embodiments, the center polyline may be required if the height is specified, or if no left/right width polylines are specified. Further, the left/right polyline may be required if the divider's width is known to ensure the ego-machine does not cross the divider, in various embodiments. The height polyline may be required when the divider raises above the road surface (e.g., botts' dots or similar round non-reflective raised pavement markers).

In some embodiments, lane divider layers may contain information on color, style, and material of the lane divider. For example, the lane divider layer may contain information indicating the lane divider is white, yellow, blue, red, green, orange, dashed, solid, dotted, long dash, short dash, double dashed, etc.

Figure 9:
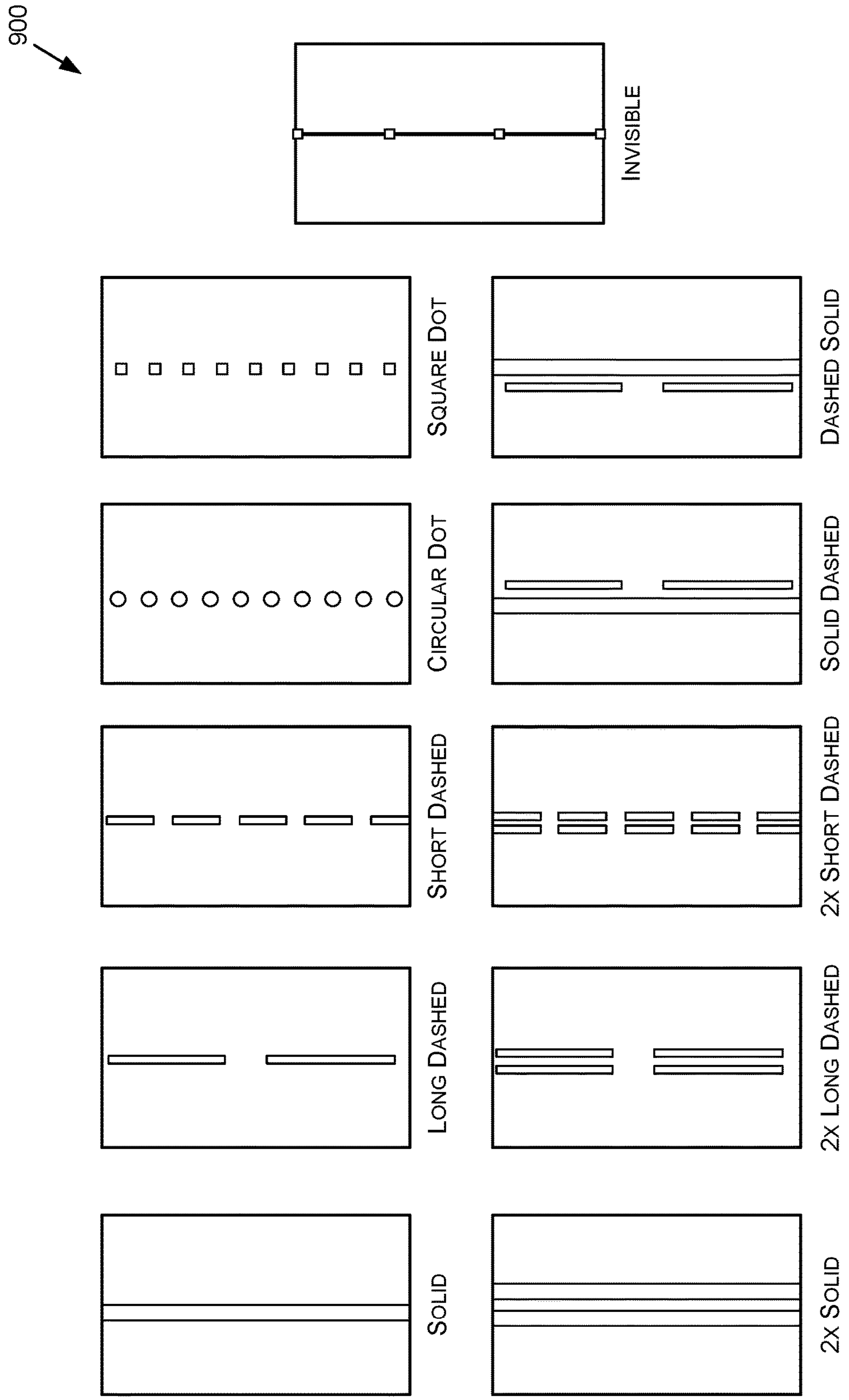
FIG. 9 illustrates an example of style information associated with lane dividers that can be encoded in a lane divider layer, in accordance with some embodiments of the present disclosure.

For example, the lane dividers may include encoded style information, such as the styles illustrated in FIG. 9. FIG. 9 illustrates an example 900 of style information associated with lane dividers that can be encoded in a lane divider layer. In some embodiments, if a divider consists of more than one line, then multiple styles may be encoded for each line (e.g., parallel line) left-to-right. If a lane divider is "invisible", then the divider may be encoded with no style information. For example, a data array corresponding to the style of the line may remain empty. Additionally, in various embodiments, the lane divider may include material information such as whether the divider is paint, botts' dots, rumble strips, etc.

In some embodiments, road boundaries may specify a border of a safe drivable area, and any number of road boundaries may be included in a map. Road boundary geometry may be defined as a center polyline describing a center of the road boundary, along the length of the road boundary in an embodiment. In an example, if the road boundary is flat with no perceptible or appreciable height, then the center line may exist on the road surface plane. In embodiments, road boundary geometry may further be defined as left/right polylines that together describe a width of the road boundary and/or a height polyline that describes a height along the length of the road boundary.

In some embodiments, the center polyline may be required if the height is specified, or if no left/right width polylines are specified. Left/right polylines may be used if the road boundary's width is known—e.g., to ensure the ego-machine does not cross the road boundary. The height polyline may be required when the road boundary raises above the road surface (e.g. botts' dots). Road boundary classes such as "Road Edge" (e.g., where the road changes into a non-drivable surface (asphalt to grass)), "Drivable Curb" (e.g., a curb designed for vehicles to drive over (driveway curb)), "Walkable Curb" (e.g., a curb designed for pedestrians to walk over), "Fence", "Wall", "Guidepost", among others classes are defined in the map in various embodiments.

In some embodiments, legacy formats (e.g., Legacy core.xml format) may include a lane divider groups. In such embodiments, to maintain backward compatibility, a first lane divider (laneDividers[0]) may be the divider that forms a water-tight channel for a lane. For example, every drivable lane, a water-tight channel indicates a left and right contiguous channel edge defined for every point of the lane—e.g., without breaks or gaps. Specifically, laneDividers[0] may physically overlap with the laneDivider[0] of any connected lane on both right and left. Further, the laneDivider[0] on both right and left may be the closest lane divider to the lane.

In some embodiments, lane divider issues may be required to be associated with a RoadSegment ID to indicate the layer file where the lane divider issue occurs. Examples of lane divider issues and road boundary issues are illustrated in the following table:

| Context Location | Sanity Issue Enum Type | Description |
|---|---|---|
| LaneDivider | LAYER_VERSION_CONFLICT, | Layer version shall be up to date with the sanity tool |
| LaneDivider.id | DIVIDER_ID_DUPLICATE, | Ids shall be unique within a tile size of map |
| LaneDivider.id | DIVIDER_ID_NULL, | Id shall be set. |
| LaneDivider.id | DIVIDER_ID_OUT_OF_RANGE | Id shall be within range of two uint64 fields |
| LaneDivider.road_segment_id | ROADSEGMENT_ID_NULL, | reference roadSegment ID shall be set |
| LaneDivider.road_segment_id | ROADSEGMENT_ID_MISMATCH, | reference roadSegment ID shall match the file name of the file name of the lane divider |
| LaneDivider.style | STYLE_NULL | field shall be set. |
| LaneDivider.style.pattern | PATTERN_NULL | field shall be set |
| LaneDivider.style.pattern_confidence | PATTERN_CONFIDENCE_NULL | field shall be set |
| LaneDivider.style.material | MATERIAL_NULL | field shall be set |
| LaneDivider.style.material_confidence | MATERIAL_CONFIDENCE_NULL | field shall be set |
| LaneDivider.style.color | COLOR_NULL | field shall be set |
| LaneDivider.style.color_confidence | COLOR_CONFIDENCE_NULL | field shall be set |
| LaneDivider.style.pattern | PATTERN_INVALID | shall be within the range of enum, shall not be set to PATTERN_UNKNOWN |
| LaneDivider.style.material | MATERIAL_INVALID | shall be within the range of enum, shall not be set to MATERIAL_UNKNOWN |
| LaneDivider.style.color | COLOR_INVALID | shall be within the range of enum, shall not be set to COLOR_UNKNOWN |
| LaneDivider.style.color_confidence | MATERIAL_CONFIDENCE_INVALID | confidence value shall be within 0 to 1 inclusive |
| LaneDivider.style.pattern_confidence | PATTERN_CONFIDENCE_INVALID | confidence value shall be within 0 to 1 inclusive |
| LaneDivider.style.color_confidence | COLOR_CONFIDENCE_INVALID | confidence value shall be within 0 to 1 inclusive |

-continued

| Context Location | Sanity Issue Enum Type | Description |
|---|---|---|
| LaneDivider.geometry.center_line | CENTERLINE_POLYLINE_OUT_OF_RANGE | Values shall meet all of this below conditions $\lvert x\rvert < 1000$ m, $\lvert y\rvert < 100$ m, $\lvert z\rvert < 10$ m |
| LaneDivider.geometry.left_line | LEFT_LINE_POLYLINE_OUT_OF_RANGE | Values shall meet all of this below conditions $\lvert x\rvert < 1000$ m, $\lvert y\rvert < 100$ m, $\lvert z\rvert < 10$ m |
| LaneDivider.geometry.right_line | RIGHT_LINE_POLYLINE_OUT_OF_RANGE | Values shall meet all of this below conditions $\lvert x\rvert < 1000$ m, $\lvert y\rvert < 100$ m, $\lvert z\rvert < 10$ m |
| LaneDivider.geometry.height_line | HEIGHT_LINE_POLYLINE_OUT_OF_RANGE | Values shall meet all of this below conditions $\lvert x\rvert < 1000$ m, $\lvert y\rvert < 100$ m, $\lvert z\rvert < 10$ m |
| LaneDivider.geometry.lateral_confidence | LATERAL_CONFIDENCE_NULL | field shall be set |
| LaneDivider.geometry.longitudinal_confidence | LONGITUDINAL_CONFIDENCE_NULL | field shall be set |
| LaneDivider.geometry.lateral_confidence | LATERAL_CONFINDENCE_OUT_OF_RANGE | confidence value shall be within 0 to 1 inclusive |
| LaneDivider.geometry.longitudinal_confidence | LONGITUDINAL_CONFIDENCE_OUT_OF_RANGE | confidence value shall be within 0 to 1 inclusive |
| LaneDivider.geometry.surface_normal | SURFACE_NORMAL_NULL | field shall be set |
| LaneDivider.geometry.surface_normal | SURFACE_NORMAL_INVALID | Surface normal absolute value shall be 1, it should be pointing upwards relative to ground surface |
| LaneDivider.geometry.normal_lateral_confidence | NORMAL_LATERAL_CONFIDENCE_NULL | field shall be set |
| LaneDivider.geometry.normal_lateral_confidence | NORMAL_LATERAL_CONFIDENCE_OUT_OF_RANGE | confidence value shall be within 0 to 1 inclusive |
| LaneDivider.geometry.normal_longitudinal_confidence | NORMAL_LONGITUDINAL_CONFIDENCE_NULL | field shall be set |
| LaneDivider.geometry.normal_longitudinal_confidence | NORMAL_LONGITUDINAL_CONFIDENCE_OUT_OF_RANGE | confidence value shall be within 0 to 1 inclusive |
| LaneDivider.geometry.height_line | RAISED_DIVIDER_CENTER_LINE_IS_NULL | height line being set shall always be followed with centerline being set |
| LaneDivider.geometry.right_line | MISSING_RIGHT_DIVIDER | field shall be set |
| LaneDivider.geometry.left_line | MISSING_LEFT_DIVIDER | field shall be set |
| LaneDivider.geometry | ONE_OF_DIVIDER_REQUIRED | one of center, left, right dividers shall be set |
| LaneDivider.geometry | LEFT_LINE_ORIENTATION_INVALID | the left line shall be left to center_line with relative orientation of surface_normal |
| LaneDivider.geometry | RIGHT_LINE_ORIENTATION_INVALID | the right line shall be right to center_line with relative orientation of surface_normal |
| LaneDivider.geometry.left_line, LaneDivider.geometry.right_line, LaneDivider.geometry.center_line, LaneDivider.geometry.height_line, | POLYLINE_TOO_SMALL | combined distance shall be greater than 10 cm |
| LaneDivider.geometry.left_line, LaneDivider.geometry.right_line, LaneDivider.geometry.center_line, LaneDivider.geometry.height_line, | POLYLINE_TOO_LARGE | combined distance shall be less than 100 m |

In some embodiments, road boundary issues may be associated with a RoadSegment ID to indicate the layer file where the road boundary issue occurs.

| | Sanity Issue Enum Type | Description |
|---|---|---|
| RoadBoundary.id | ROAD_BOUNDARY_ID_DUPLICATE, | |
| RoadBoundary.id | ROAD_BOUNDARY_ID_NULL, | |
| RoadBoundary.id | ROAD_BOUNDARY_ID_OUT_OF_RANGE | trigger if out of Uint64 range |
| RoadBoundary.road_segment_id | ROADSEGMENT_ID_NULL, | |
| RoadBoundary.road_segment_id | ROADSEGMENT_ID_MISMATCH, | |
| RoadBoundary.type | TYPE_NULL | |
| RoadBoundary.type | TYPE_OUT_OF_RANGE | out of enum |
| RoadBoundary.type_confidence | TYPE_CONFIDENCE_NULL | |
| RoadBoundary.type_confidence | TYPE_CONFIDENCE_OUT_OF_RANGE | conf $<0$, $>1$ |
| RoadBoundary.geometry.center_line | CENTER_LINE_NULL | |
| RoadBoundary.geometry.center_line | CENTERLINE_POLYLINE_OUT_OF_RANGE | $\lvert x\rvert > 1000$ m, $\lvert y\rvert > 100$ m $< \lvert z\rvert > 10$ m |

-continued

| | Sanity Issue Enum Type | Description |
|---|---|---|
| RoadBoundary.geometry.left_line | LEFT_LINE_NULL | |
| RoadBoundary.geometry.left_line | LEFT_LINE_POLYLINE_OUT_OF_RANGE | $\lvert x \rvert > 1000$ m, $\lvert y \rvert > 100$ m < $\lvert z \rvert > 10$ m |
| RoadBoundary.geometry.right_line | RIGHT_LINE_NULL | |
| RoadBoundary.geometry.right_line | RIGHT_LINE_POLYLINE_OUT_OF_RANGE | $\lvert x \rvert > 1000$ m, $\lvert y \rvert > 100$ m < $\lvert z \rvert > 10$ m |
| RoadBoundary.geometry.height_line | HEIGHT_LINE_NULL | |
| RoadBoundary.geometry.height_line | HEIGHT_LINE_POLYLINE_OUT_OF_RANGE | $\lvert x \rvert > 1000$ m, $\lvert y \rvert > 100$ m < $\lvert z \rvert > 10$ m |
| RoadBoundary.geometry.center_line | CENTER_LINE_POLYLINE_OUT_OF_RANGE | Values shall meet all of this below conditions $\lvert x \rvert > 1000$ m, $\lvert y \rvert > 100$ m, $\lvert z \rvert > 10$ m |
| RoadBoundary.geometry.left_line | LEFT_LINE_POLYLINE_OUT_OF_RANGE | Values shall meet all of this below conditions $\lvert x \rvert > 1000$ m, $\lvert y \rvert > 100$ m, $\lvert z \rvert > 10$ m |
| RoadBoundary.geometry.right_line | RIGHT_LINE_POLYLINE_OUT_OF_RANGE | Values shall meet all of this below conditions $\lvert x \rvert > 1000$ m, $\lvert y \rvert > 100$ m, $\lvert z \rvert > 10$ m |
| RoadBoundary.geometry.heightline | HEIGHT_LINE_POLYLINE_OUT_OF_RANGE | Values shall meet all of this below conditions $\lvert x \rvert > 1000$ m, $\lvert y \rvert > 100$ m, $\lvert z \rvert > 10$ m |
| RoadBoundary.geometry.lateral_confidence | LATERAL_CONFIDENCE_NULL | field shall be set |
| | LATERAL_CONFIDENCE_OUT_OF_RANGE | conf <1, >0 |
| RoadBoundary.geometry.longitudinal_confidence | LONGITUDINAL_CONFIDENCE_NULL | field shall be set |
| RoadBoundary.geometry.lateral_confidence | LATERAL_CONFINDENCE_OUT_OF_RANGE | confidence value shall be within 0 to 1 inclusive |
| RoadBoundary.geometry.longitudinal_confidence | LONGITUDINAL_CONFIDENCE_OUT_OF_RANGE | confidence value shall be within 0 to 1 inclusive |
| RoadBoundary.geometry.surface_normal | SURFACE_NORMAL_NULL | field shall be set |
| RoadBoundary.geometry.surface_normal | SURFACE_NORMAL_INVALID | Surface normal absolute value shall be 1, it should be pointing upwards relative to ground surface |
| RoadBoundary.geometry.normal_lateral_confidence | NORMAL_LATERAL_CONFIDENCE_NULL | field shall be set |
| RoadBoundary.geometry.normal_lateral_confidence | NORMAL_LATERAL_CONFIDENCE_OUT_OF_RANGE | confidence value shall be within 0 to 1 inclusive |
| RoadBoundary.geometry.normal_longitudinal_confidence | NORMAL_LONGITUDINAL_CONFIDENCE_NULL | field shall be set |
| RoadBoundary.geometry.normal_longitudinal_confidence | NORMAL_LONGITUDINAL_CONFIDENCE_OUT_OF_RANGE | confidence value shall be within 0 to 1 inclusive |
| RoadBoundary.geometry.height_line | RAISED_DIVIDER_CENTERLINE_IS_NULL | height line being set shall always be followed with centerline being set |
| RoadBoundary.geometry.right_line | MISSING_RIGHT_DIVIDER | field shall be set |
| RoadBoundary.geometry.left_line | MISSING_LEFT_DIVIDER | field shall be set |
| RoadBoundary.geometry | ONE_OF_DIVIDER_REQUIRED | one of center, left, right dividers shall be set |
| RoadBoundary.geometry | LEFT_LINE_ORIENTATION_INVALID | the left line shall be left to center_line with relative orientation of surface_normal |
| RoadBoundary.geometry | RIGHT_LINE_ORIENTATION_INVALID | the right line shall be right to center_line with relative orientation of surface_normal |
| RoadBoundary.geometry.left_line, RoadBoundary.geometry.right_line, RoadBoundary.geometry.center_line, RoadBoundary.geometry.height_line, | POLYLINE_TOO_SMALL | combined distance shall be greater than 10 cm |
| RoadBoundary.geometry.left_line, RoadBoundary.geometry.right_line, RoadBoundary.geometry.center_line, RoadBoundary.geometry.height_line, | POLYLINE_TOO_LARGE | combined distance shall be less than 100 m |

In some embodiments, the lanes in a core lane graph may include a channel that defines left and right boundaries of a lane. In such embodiments, this channel is considered 'water-tight' which means that for every drivable lane, there may be a left and right contiguous channel edge defined for every point of the lane—e.g., without breaks or gaps. In some embodiments, exactly one channel (e.g., where a single channel is defined by the left and right edges) may be defined for one or more lanes in the map.

In some embodiments, each side of a channel's geometry may define an inner edge of a lane. In such embodiments, the vehicle may be required to stay within the channel edge to stay within the real world lane boundaries. If a divider or road boundary exists, the channel geometry may coincide with, or almost coincide with, an inner edge of the divider or road boundary. For example, the channel edges may not be identical to the lane marker/divider edges, or the road boundary edges, but may be as conservative or more conservative in location as the markers/dividers/boundaries. In such examples, this may aid in keeping the ego-machine within a safe driving space within lanes, while still providing the necessary lane information (e.g., type of lane lines, features of the lane lines, road divider heights, etc.) for traversing the environment safely and effectively. For example, due to noise in perception (e.g., processing sensor data to perform object detection using one or more machine learning models) that may have resulted in noisy detections of lane marking types and/or locations, the lane markings may not be as accurate or precise for driving. However, with a lane channel, noise in perception may be accounted for as continuous road edges may be used for driving that filter out the noise from the detections.

Figure 10:
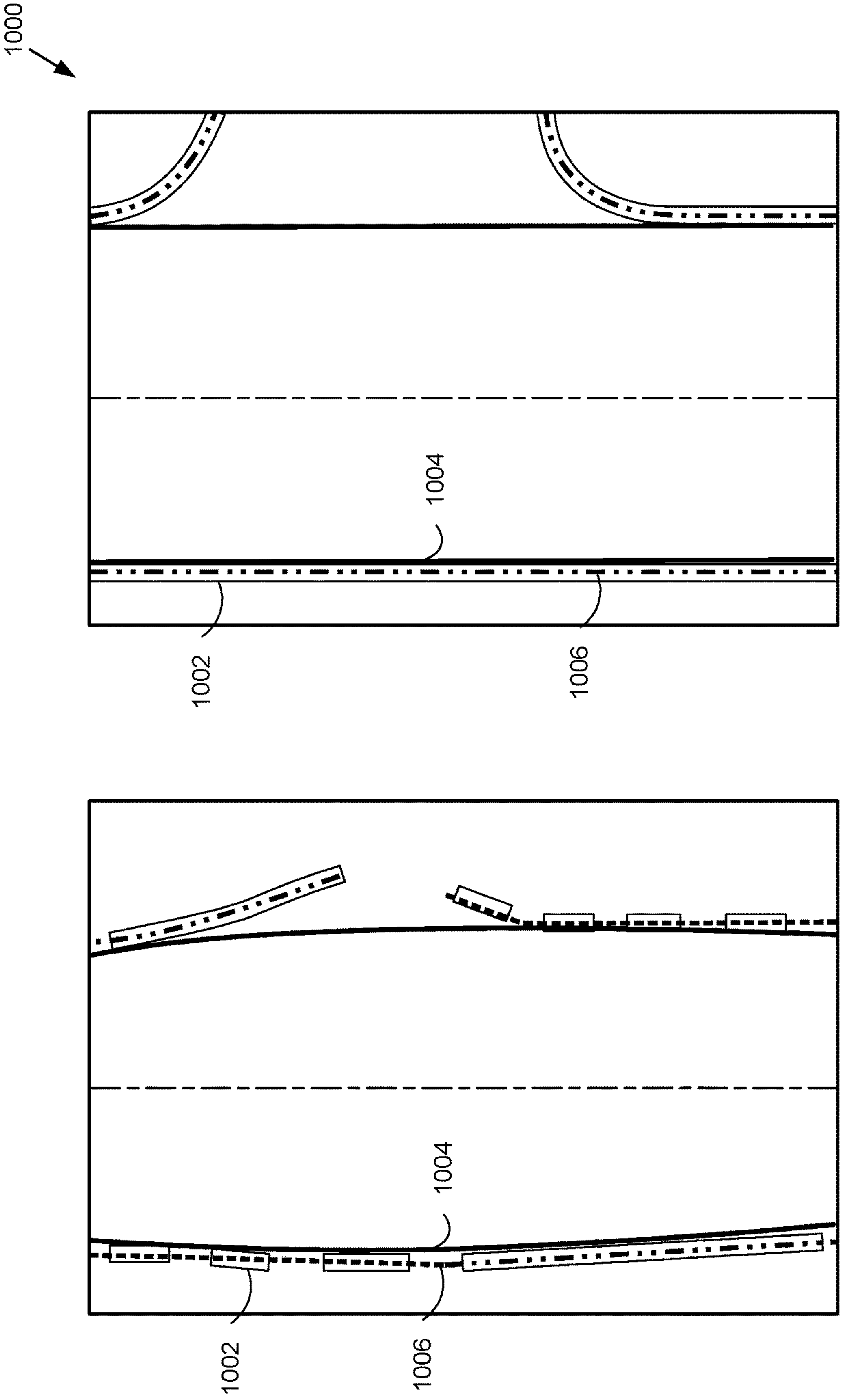
FIG. 10 illustrates an example of a channel for a plurality of lanes, in accordance with some embodiments of the present disclosure.
Figure 11:
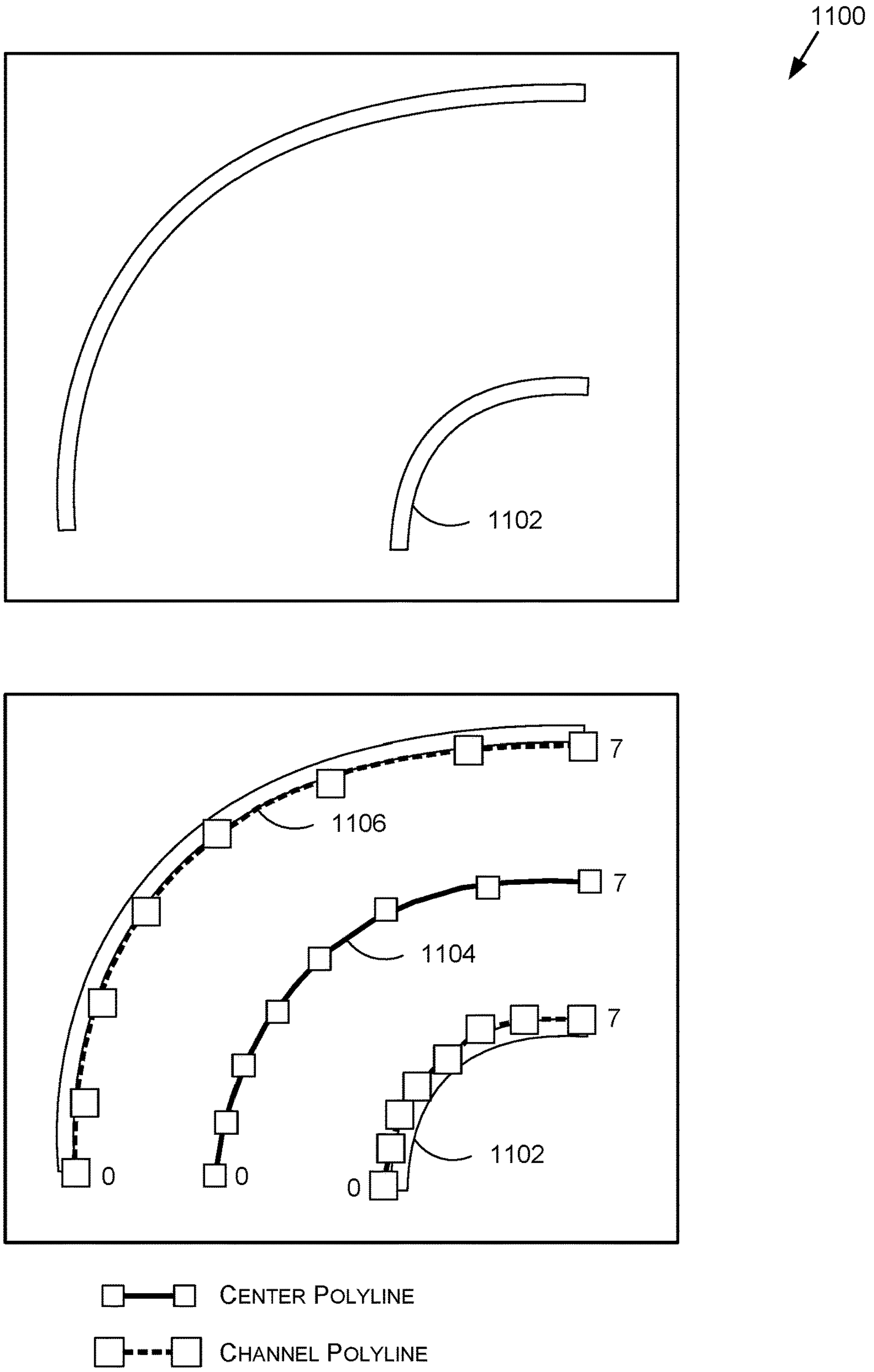
FIG. 11 illustrates an example of a channel for a lane, in accordance with some embodiments of the present disclosure.

With reference to FIG. 10, FIG. 10 illustrates an example 1000 of a channel for a lane. In FIG. 10, rectangles 1002 are representative of painted lane dividers, the dashed lines 106 represent a center polyline associated with the dividers, and solid line 1004 represents polylines associated with a channel for the lane. With reference to FIG. 11, FIG. 11 illustrates an example 1100, for the single lane 1102, channel edges 1106 are represented by a dashed lined while a center polyline 1104 defining a center of the lane—e.g., where a center is known, and a width is known (such as a standard road width) is represented by a solid line. In various embodiments, the center line (e.g., center polyline 1104) may be used to define an entire geometry of a lane. In some embodiments, channel geometry may form triplets with the lane 1102 (e.g., each left channel edge point may have a corresponding right channel edge point, and each pair of channel edge points may have a corresponding center line point), which may indicate that for the Nth point on a lane's geometry, the point that best approximates the left/right side of the lane may be the Nth point on the left and right channels. In various embodiments, this may mean that the channel's polyline may be required to have the same number of points as the lane's center line, as illustrated in the example in FIG. 11 (e.g., points 0 through 7 of the pair of channel edges and the lane's center line 104).

In some embodiments, lane channels may have connections to other lane channels to allow a client (e.g., ego-machine) to follow a side of a lane channel through multiple connected lanes. For example, channel sides include a set of previous and next connections, previous and next connections may be determined relative to the geometry of the lane channel edge. In some embodiments, previous connections may be attached to the 0th index of the edge geometry, and next connections may be attached to the last index (e.g., 7th as illustrated in FIG. 11) of the edge geometry. In various embodiments, the connections may include identification information associated with the connected channel side and a same_direction flag. If the same_direction is true, then the connected channel side may be considered to be oriented the same way. An example is shown below:

```
message ChannelConnection {
  MapElementId target__lane__channel__side = 1;
  bool same__direction = 2;
}
```

In some embodiments, at splits and merges, all members of a connection may be required to be connected to all other members. For example, as illustrated in FIG. 7, if there is a split with 1 incoming channel and 2 outgoing channels, the incoming channel's next connections may connect to both outgoing channels, the outgoing channels' previous connections would connect to the incoming channel, and the other outgoing channel with a same direction flag as false.

In some embodiments, the position of a lane channel edge may be positioned on top of a lane divider or road boundary. Moreover, in an embodiment, the map may specify whether a lane channel coincides with a lane divider or boundary using lane channel sections, an example of which is provided below:

```
message LaneChannelSection {
  datatype.protobuf.FloatValue start__index = 1;
  datatype.protobuf.FloatValue end__index   = 2;
  enum SideType {
    INVISIBLE      = 0;
    LANE__DIVIDER  = 1;
    ROAD__BOUNDARY = 2;
  }
  SideType type = 3;
  MapElementId side__entity = 4;
}
```

Figure 12:
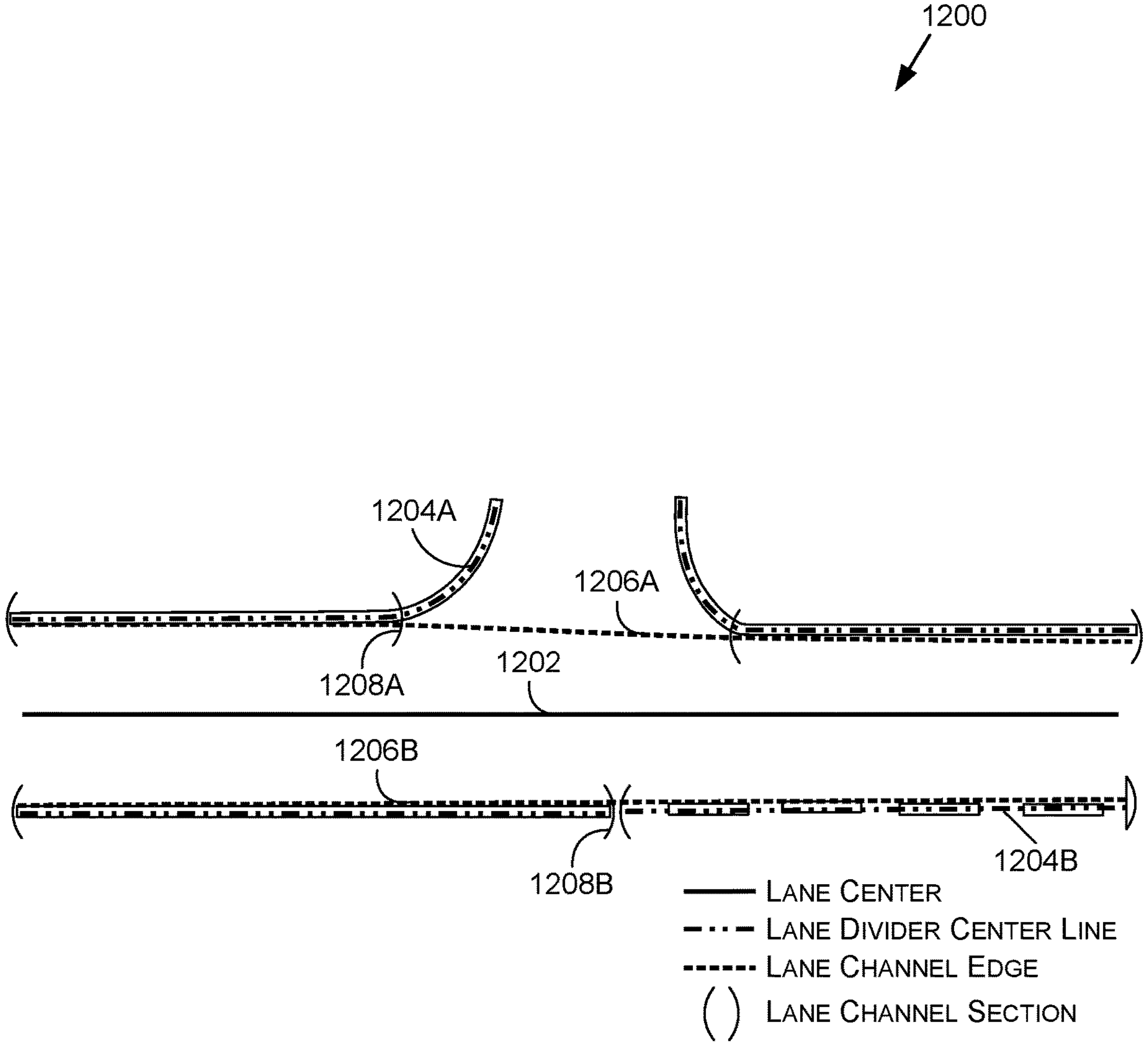
FIG. 12 illustrates an example of lane channel sections, in accordance with some embodiments of the present disclosure.

In some embodiments, a lane channel section may specify an index range along an edge's polyline that may coincide with a lane divider or road boundary from the lane dividers layer. An example of lane channel sections is illustrated in FIG. 12. In FIG. 12 the lane channels are broken into sections of a specified length in order to allow for connections to adjoining lanes, turns, merges, and/or the like. In various embodiments, the sections of the lane channels include a lane center 1202, lane divider center lines 1204A and 1204B, lane channel edges 1206A and 10206B, and/or lane channel sections 1208A and 1208B.

In some embodiments, a start index and an end_index may define a range of polyline indexes that the divider corresponds to. Additionally, in various examples, map element identification information may specify the divider or road edge that influenced the position of the lane channel edge 1206A and/or 1206A. In some embodiments, no lane channel section may exist for ranges of the channel that are not influenced by the existence of a divider.

In some embodiments, since sections of channels may contain duplicate geometry from an underlying lane divider or road boundary, the lane_channels layer may allow the reuse of a lane divider's geometry. For example, the geometry of a channel's edge may be specified as a collection of lane channel geometry chunks, and polylines specified by these chunks may be concatenated together to form the single polyline defining the lane edge. For example, a lane channel geometry chunk may be one of a polyline for the chunk and/or a reference to a lane divider/road boundary whose geometry may be re-used for the polyline. Once all chunks are assembled, triplet rules may still be followed, which may mean that the encoder may only reuse divider geometry if the dividers geometry conforms to the triplet rules in accordance with an embodiment.

In some embodiments, all lanes may be required to have a lane channel, lane channels may specify lane divider sections, but do not require them, and lane channels may be prohibited from having overlapping sections. Lane divider sections may be defined with a start and end index along the lane points. In some embodiments, all lane channel issues may be required to be associated with a road segment identification information to indicate the layer file where the issue occurs.

In some embodiments, road markings may include imagery placed on a road surface, such as icons, that communicate to drivers. Semantic elements of road markings may be placed in other layers and, in some embodiments, consuming raw images of road markings may not be needed. In an embodiment, each road marking may be associated with a unique identifier, and may be anchored or otherwise associated with on a road segment (e.g., stored in the JSON or other data object associated with the road segment and/or layer).

In one example, image road markings may be images painted onto a road surface. As a result, in various embodiments, unlike lane dividers, the image road markings may be associated with a definite start/end and may be described by a bounding box as described in greater detail below in connection with FIG. 13. In further embodiments, image road markings may be encoded with 3D tightly fitting points (e.g., four 3D points). For example, a quadrilateral formed by these points may encompass an entire image road marking, and the points may be stored in a uniform manner (e.g., clockwise) so that orientation can be determined. An example is shown below:

```
message Quadrilateral {
   Point top_left     = 1;
   Point top_right    = 2;
   Point bottom_right = 3;
   Point bottom_left  = 4;
}
```

In an embodiment, image road markings may contain an association with one or more lanes, and these associations may inform which lane a road marking's message applies to. As examples, basic image road markings may be encoded according to the following:

| Property | Data Type | Description |
|---|---|---|
| ID | UUID | The unique identifier of the image marking |
| Road Segment | Reference | The road segment |
| Geometry | 3D Quadrilateral | 4 points that tightly surround the road marking |
| Lane References | Reference | The lanes that the road marking applies to. |
| Type | Enum: Arrow, Bike, Railroad Crossing, Accessible Parking, HOV Diamond, Text, Do Not Block Box, Route Crest, Zig Zag, Speed Bump | The class of road marking. Some of these types are not Basic Image Markings, but have additional properties that define them |

Figure 13:
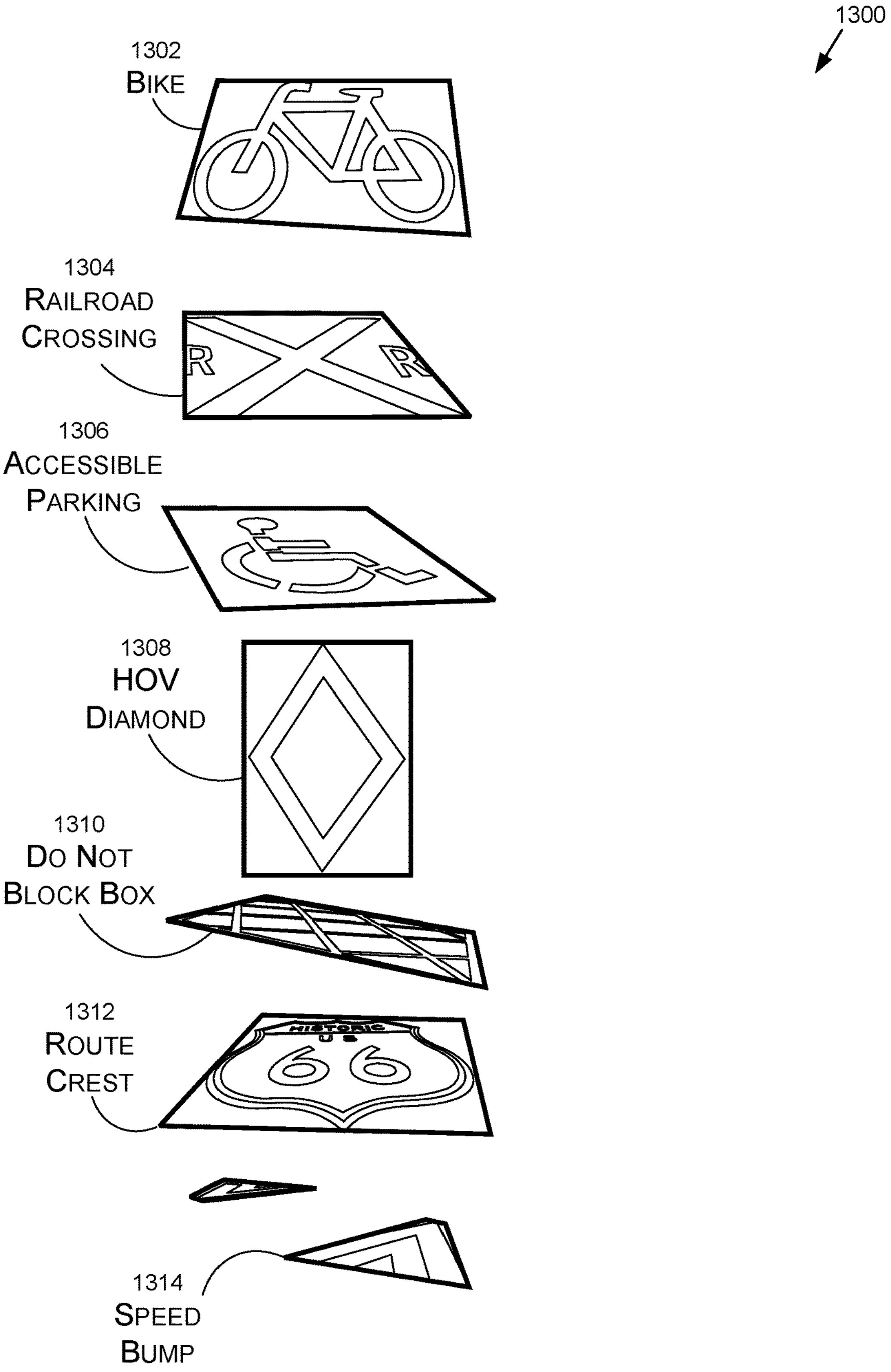
FIG. 13 illustrates an example image road markings including bounding boxes, in accordance with some embodiments of the present disclosure.

FIG. 13 illustrates an example 1300 of image road markings depicted in images including bounding boxes. As described herein, the tightly fitting bounding boxes, in various embodiments, are defined points of a quadrilateral. As illustrated in FIG. 13, examples of image road markings can include a bike 1302, a railroad crossing 1304, accessible parking 1306, a High Occupancy Vehicle (HOV) diamond 1308, a do not block box 1310, a route crest 1312, and a speed bump 1314. In an example, the bike 1302 marks are shown on the road to denote a bike lane. Similarly, in another example, the railroad crossing 1304 marks denote that a railroad track will contend with the lane. Accessible parking 1306 road markings, for example, are used to denote parking spots that are reserved for those who need additional accessibility. In an embodiment, the HOV lanes are denoted using the HOV 1308 mark. In another embodiment, the do not block box 1310 represent areas that a vehicle should not stop within. In another example, the route crest 1312 includes a figure that represents the current route. In yet another example, the speed bump 1314 includes painted marking that helps drivers see speed bumps.

In some embodiments, detailed image marks may include information about content of an image marking, in addition to a four point quadrilateral bounding the marking.

Figure 14:
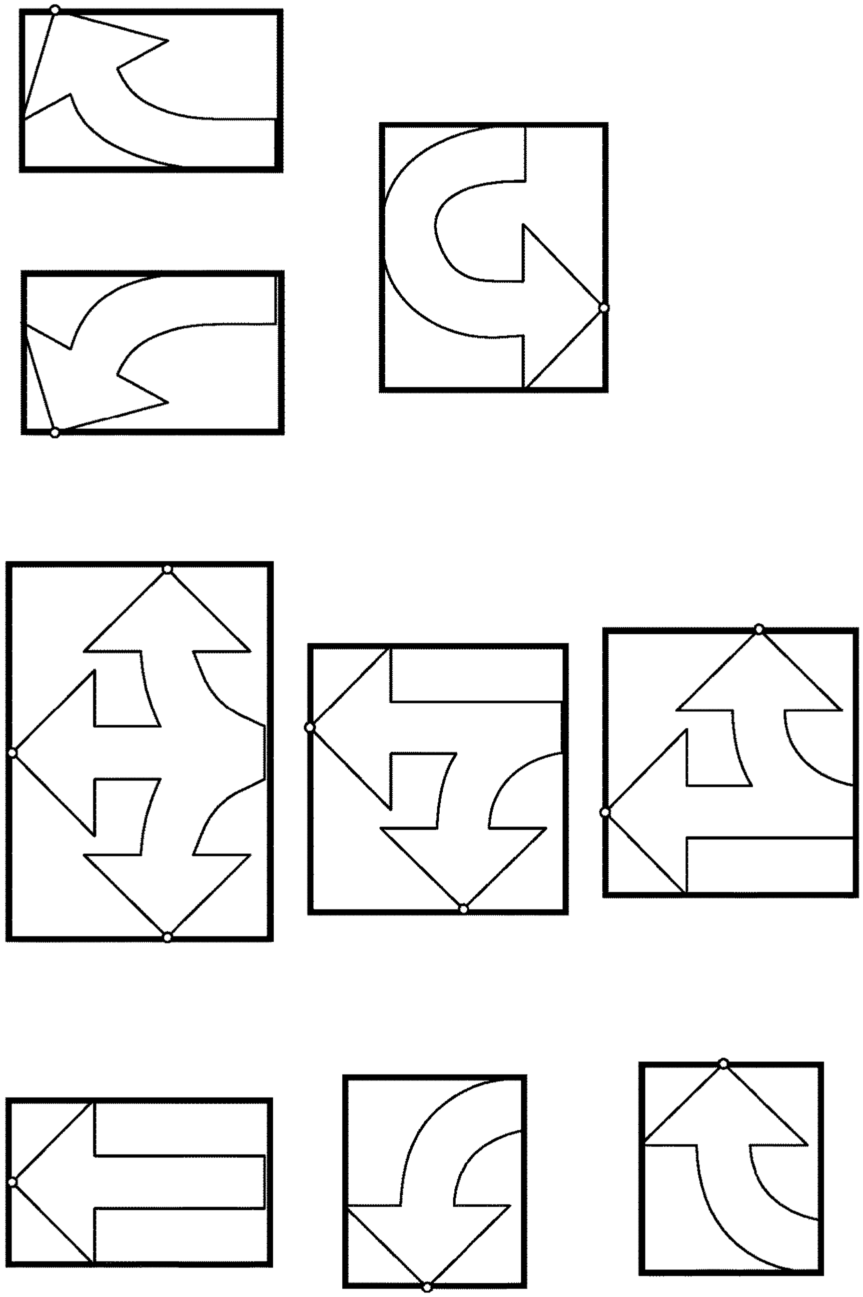
FIG. 14 illustrates an example of arrow markings including bounding boxes, in accordance with some embodiments of the present disclosure.

FIG. 14 illustrates an example 1400 of arrow markings including bounding boxes. In some embodiments, arrow markings may be encoded with a 3D quadrilateral, 3D point per arrow tip, arrow direction enumeration, among others. Arrow marks may represent directions on the road, and may further include data such as direction (e.g., straight, left, right, u-turn) and arrow class (e.g., lane_heading, merge, wrong_way). An example of 3D points (e.g., denoted by a white circle) for each tip of arrow marks as illustrated in FIG. 14.

Figure 15:
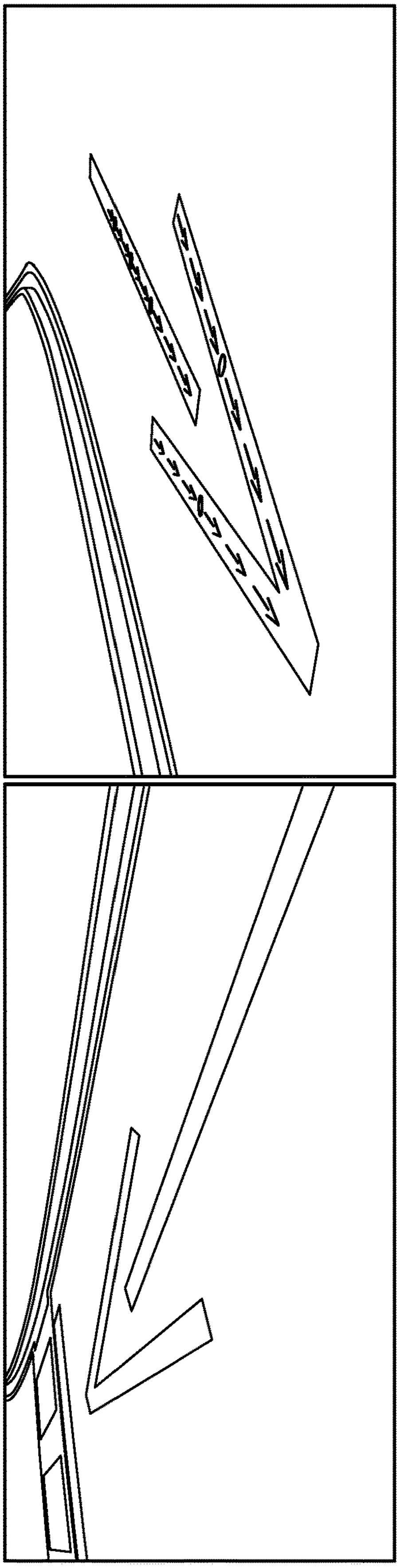
FIG. 15 illustrates an example of arrow markings indicating a direction of traffic, in accordance with some embodiments of the present disclosure.
Figure 16:
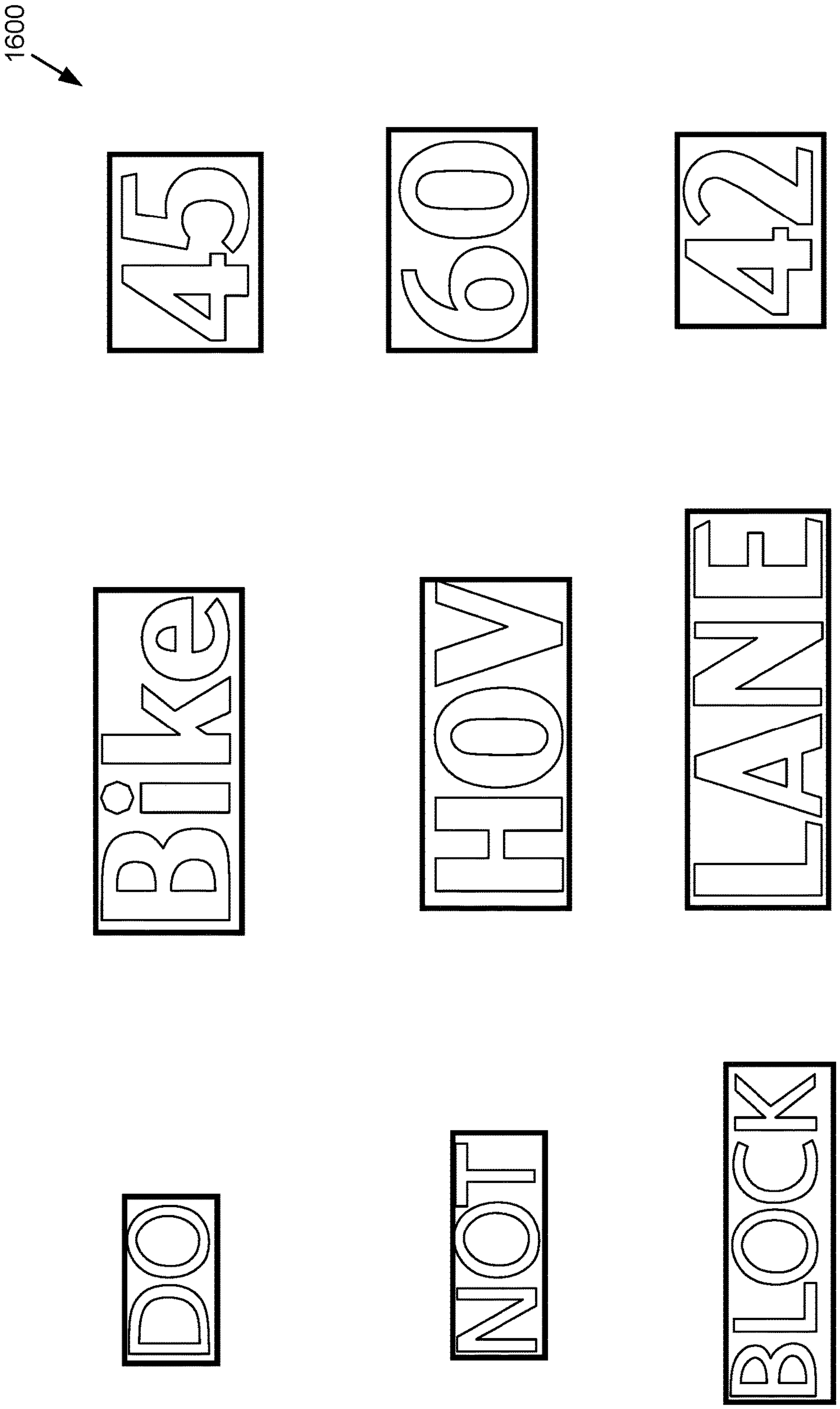
FIG. 16 illustrates an example of text marking including bounding boxes, in accordance with some embodiments of the present disclosure.

FIG. 15 illustrates an example 1500 of arrow markings indicating a direction of traffic. In some embodiments, a wrong way arrow may be an arrow specifically designed with markers to communicate to an oncoming driver. Turning now to FIG. 16, FIG. 16 illustrates an example 1600 of text marking including bounding shapes. In some embodiments, text markings may be encoded with 3D quadrilaterals and text marks, where the text marks may be strings of text on the road, and there may be a text mark per word on a road. By way of example, the following strings may be included in the map: mph, ahead, stop, signal, school, xing, slow, ped, curve, bump, hump, do, not, block, keep, clear, enter, express, only, lane, to, bike, bus, taxi, fire, car, pool, yield, stop, east, west, north, south, etc. Additionally, arbitrary numbers may be included, such as those shown in FIG. 16.

Figure 17:
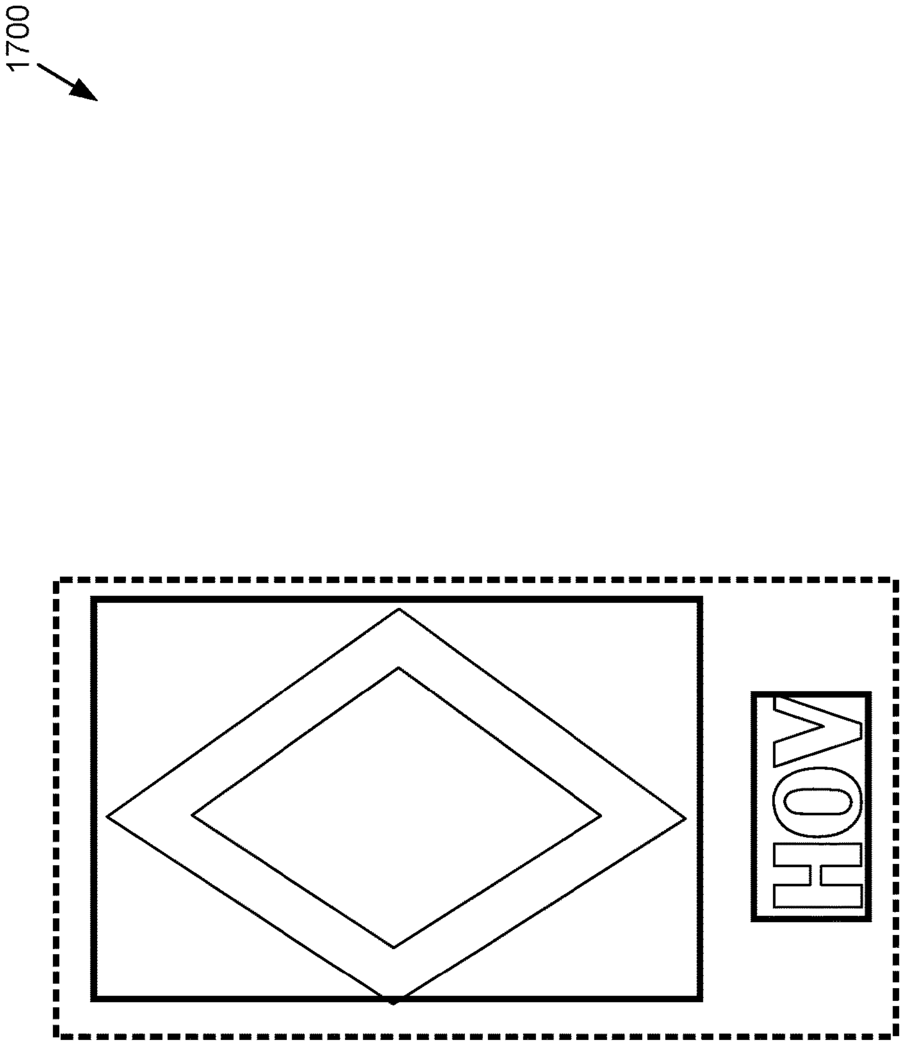
FIG. 17 illustrates an example of a composite road marking, in accordance with some embodiments of the present disclosure.

In some embodiments, composite road markings may allow road markings to be grouped when they form a semantic message together. FIGS. 17-21 illustrate examples of composite road markings. In such examples, composite road markings include one or more types of road markings such as image road markings, arrows, and/or text markings. A dashed line in FIGS. 17-21 represents groupings of road markings (e.g., a composite road marking). However, in various embodiments, there may be no geometry associated with the dashed lines—only a linking of road markings. In the example 1700 and as shown in FIG. 17, an HOV composite marking may be encoded with a composite of a HOV diamond and 'HOV' text. In such examples, HOV composite markings may be used when HOV diamond markings are present beside the HOV text marking, or 'HOV' Lane' markings.

Figure 18:
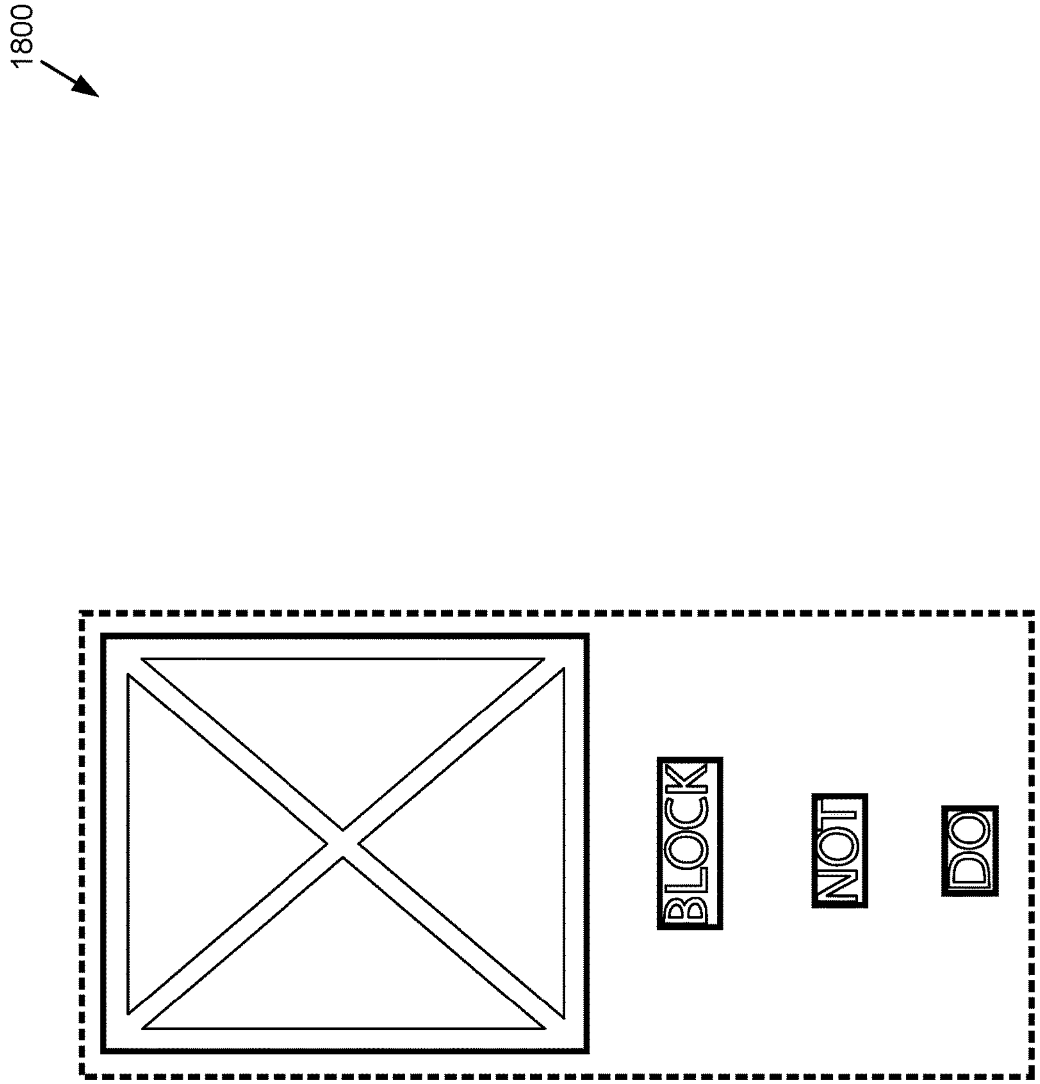
FIG. 18 illustrates an example of a composite road marking, in accordance with some embodiments of the present disclosure.

As shown in the example 1800 illustrated in FIG. 18, the "Do Not Block" composite markings may be encoded with a composite of a Do Not Block image road marking and 'Do', 'Not', 'Block' text markings. For example, 'Do Not Block Boxes' may be reinforced with painted text stating 'Do Not Block.' In an embodiment, the Do Not Block Composite marking may combine the Box marking with the 'Do', 'Not', and 'Block' text markings, as illustrated in FIG. 18.

Figure 19:
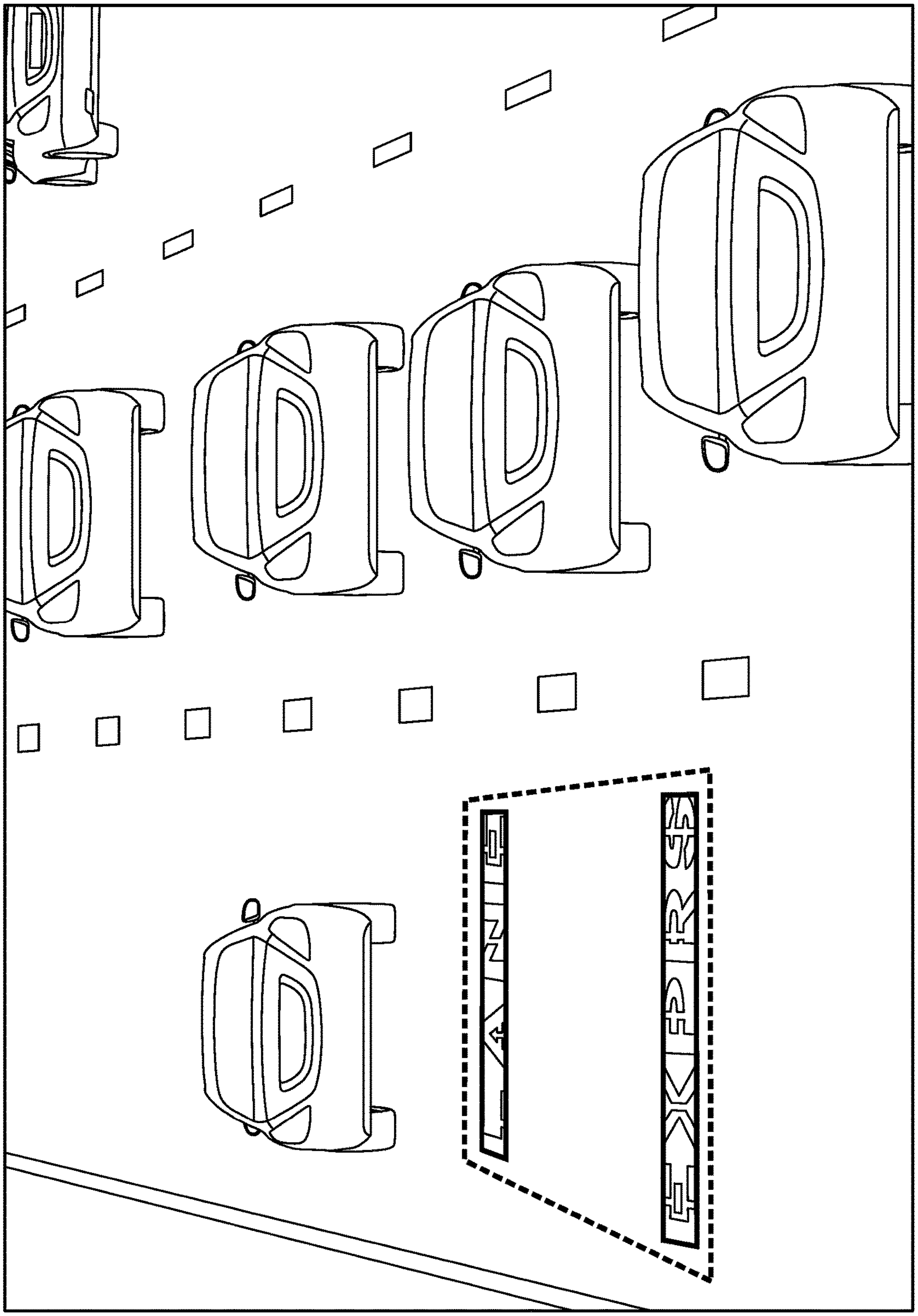
FIG. 19 illustrates an example of a composite road marking, in accordance with some embodiments of the present disclosure.
Figure 20:
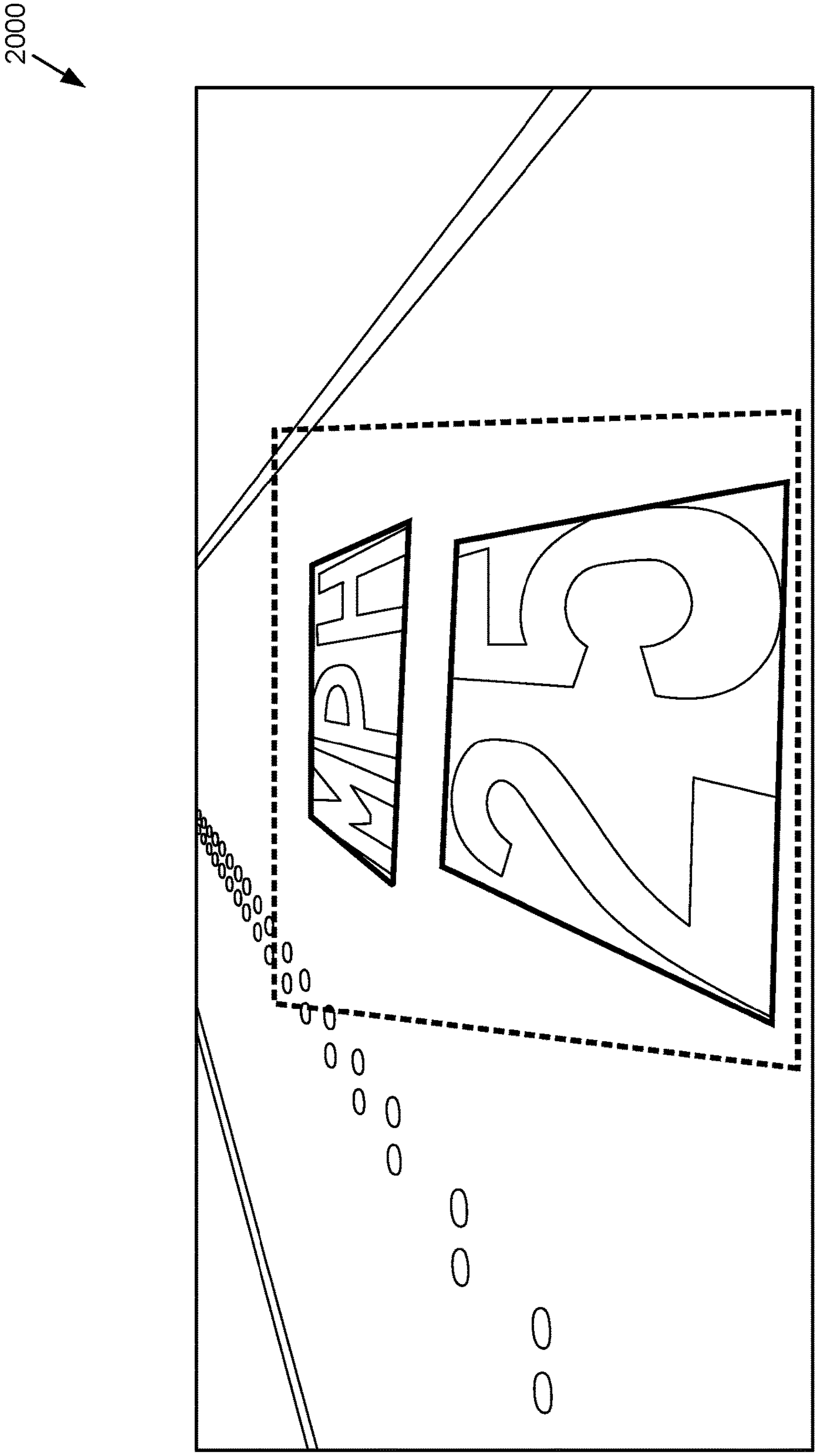
FIG. 20 illustrates an example of a composite road marking, in accordance with some embodiments of the present disclosure.
Figure 21:
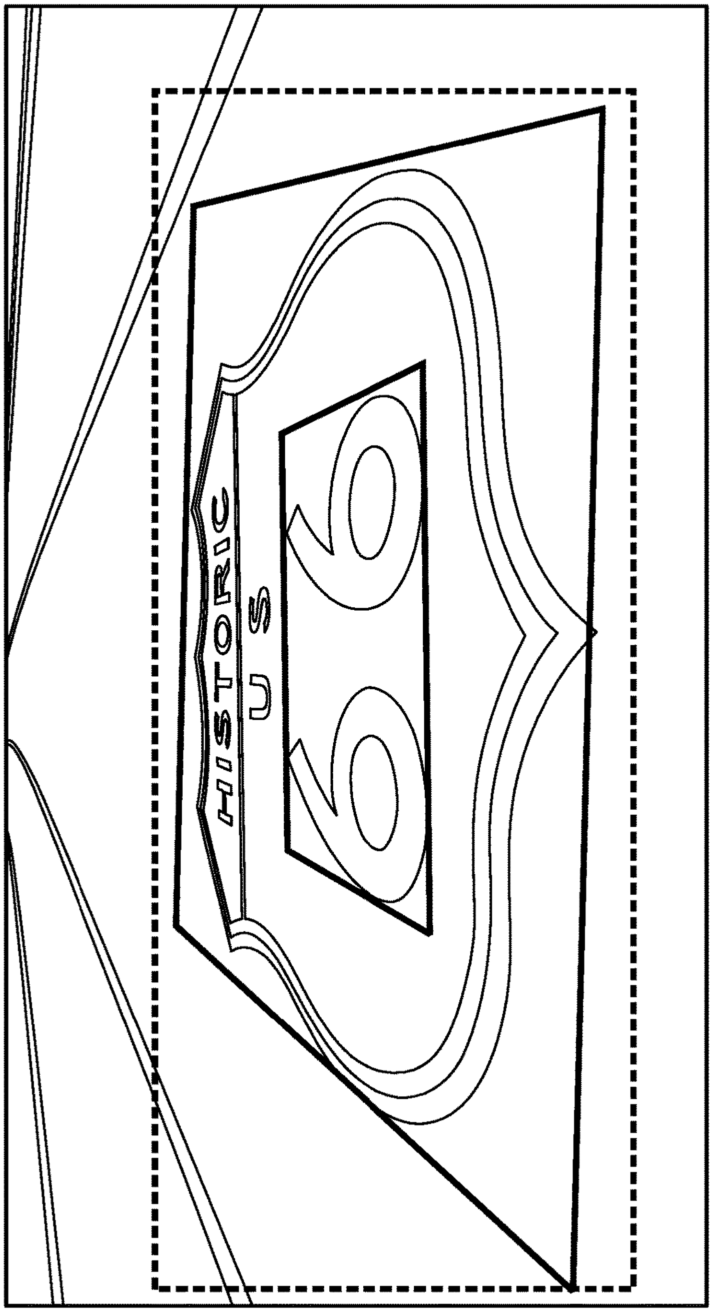
FIG. 21 illustrates an example of a composite road marking, in accordance with some embodiments of the present disclosure.

As shown in the example 1900 illustrated in FIG. 19, express lane markings may be encoded with a composite of 'Express' and 'Lane' text markings. For example, express lane markings may be a composite marking of 'Express' and 'Lane' text markings. Together, these markings may signal the existence of an express lane in various embodiments. Speed limit markings may be a composite road marking that combines textual marks to denote a speed limit on the road, as shown in the example 2000 illustrated in FIG. 20. Turning to the example 2100 illustrated in FIG. 21, route markings may be encoded according to a composite marking of a route crest image road marking, and a text marking containing a route name, and a string of a route name, as shown in FIG. 21. The composite route marking combines all imagery used to convey a route, including text and crest.

Figure 22:
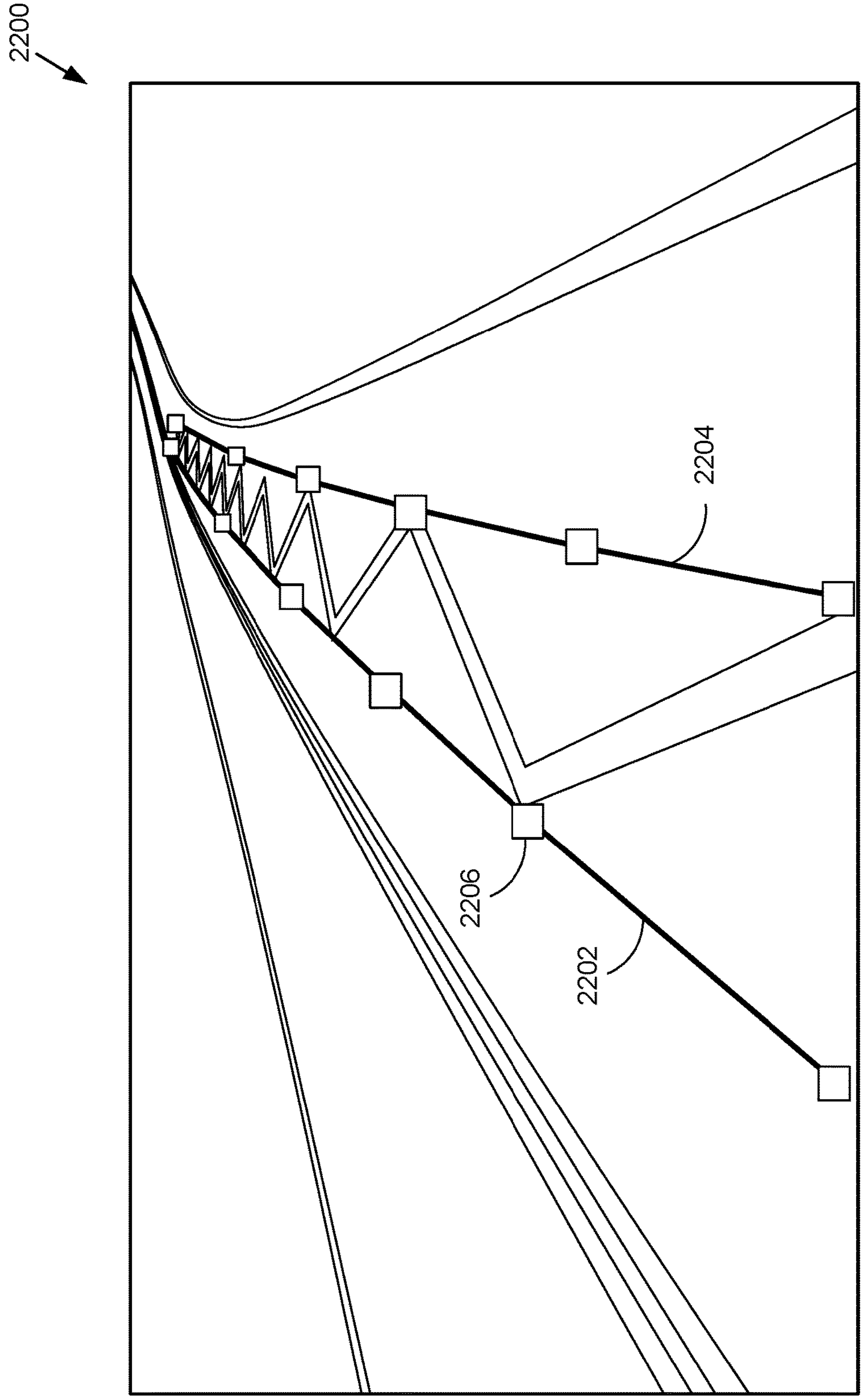
FIG. 22 illustrate examples of complex markings, in accordance with some embodiments of the present disclosure.
Figure 23:
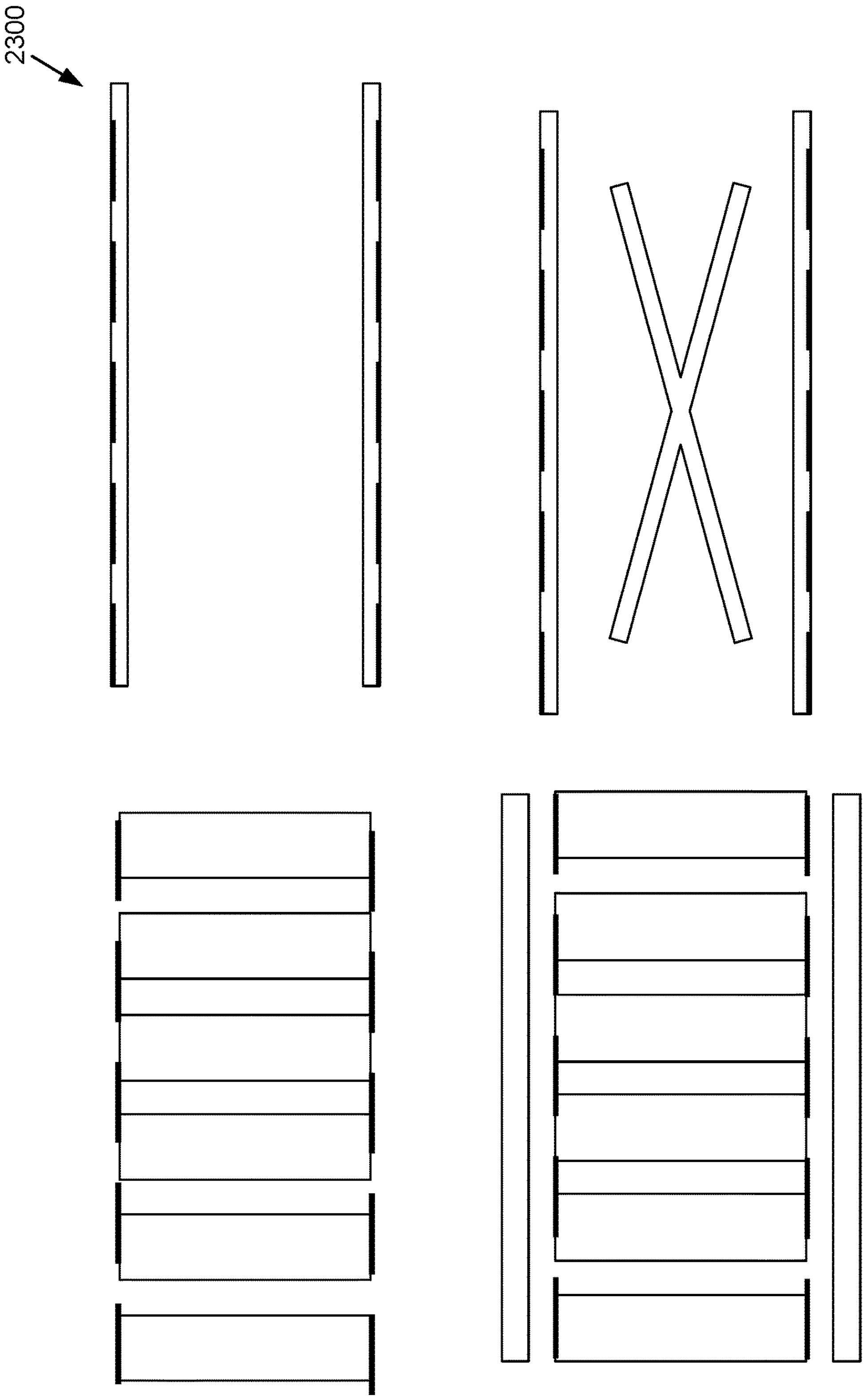
FIG. 23 illustrate examples of complex markings, in accordance with some embodiments of the present disclosure.
Figure 24:
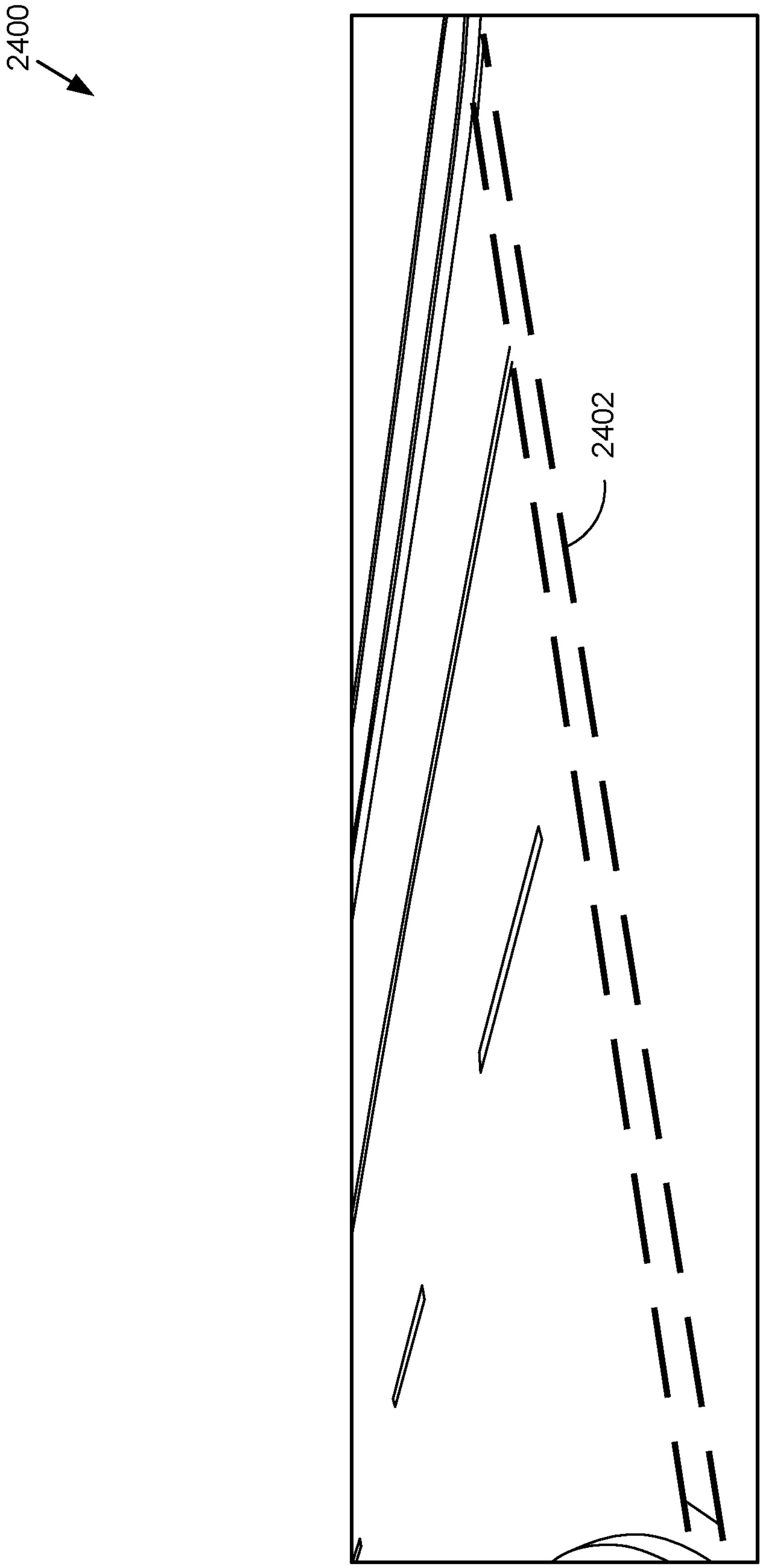
FIG. 24 illustrate examples of complex markings, in accordance with some embodiments of the present disclosure.

FIGS. 22-24 illustrate examples of complex markings. Turning to FIG. 22, FIG. 22 illustrates an example 2200 of a zigzag complex markings. In various embodiments, the zigzag complex markings may be encoded according to a left polyline 2202, a right polyline 2204, and connections 2206 (represented by squares in FIG. 22) to other zigzag markings that represent the same physical marking in other road segments. In an embodiment, zigzag markings may communicate the existence of a crosswalk ahead, and may be long markings that exist in the center of a lane. In the example illustrated in FIG. 22, given the length of the zigzag marking, the zigzag marking may be represented by two polylines: one for left and one for right. In some embodiments, zigzag markings may span multiple road segments. In such embodiments, when a zigzag marking is split across a road segment, each zigzag portion may contain connections to its neighboring connection. An example is shown below:

```
message ZigZagMarking {
  ...
  Polyline left_side = 3;
  Polyline right_side = 4;
  message Connection {
    MapElementId road_segment_id = 1;
    MapElementId zig_zag_mark_id = 2;
  }
  repeated Connection connected_zig_zag_markings = 4;
}
```

Similarly, in other examples, pedestrian and/or bike Crossings may be encoded according to two polylines, 'Bike' and/or 'Pedestrian' class. Turning to FIG. 23, FIG. 23 illustrates an example 2300 of crossing areas for pedestrian and bikes may be defined by two polylines. In various embodiments, the dash lines illustrated in FIG. 23 may define entry and exit lines for a vehicle contending with the crossing. In an embodiment, the dash lines represent two polylines corresponding to the outer edges of the marking, as further shown in FIG. 23. FIG. 24 illustrates an example 2400 of a pedestrian crossing encoding as two polylines 2402 illustrated in FIG. 24 as dashed lines.

Figure 25:
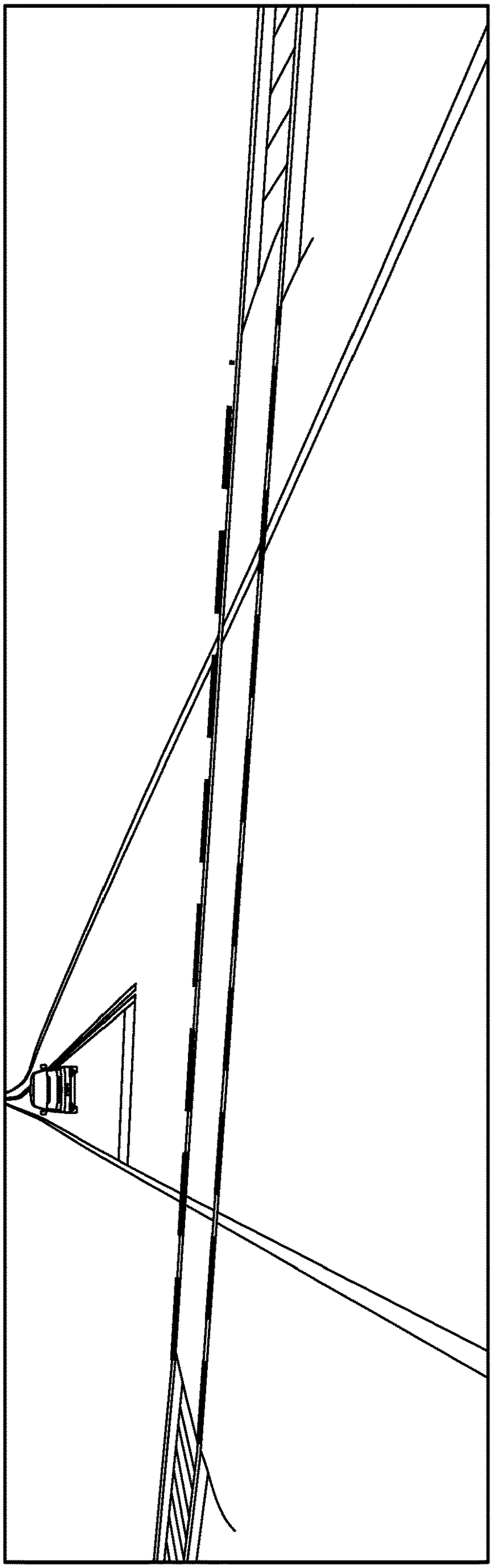
FIG. 25 illustrates an example of a rail road crossing, in accordance with some embodiments of the present disclosure.
Figure 26:
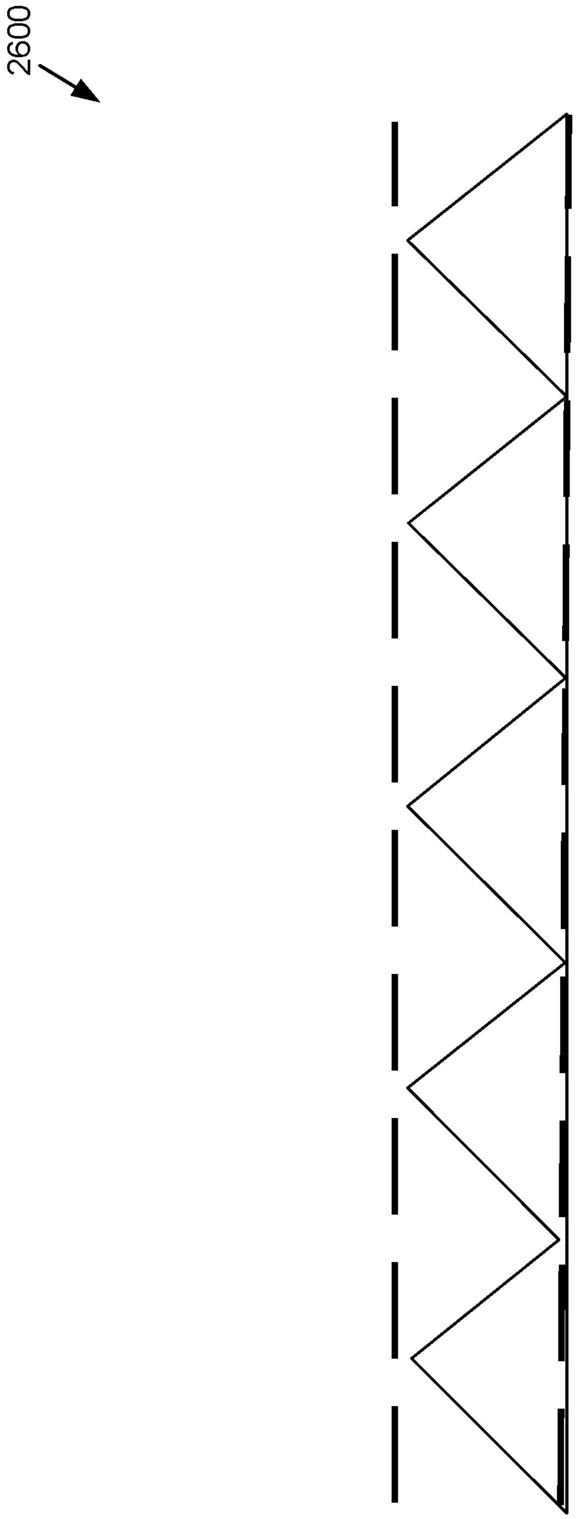
FIG. 26 illustrates an example of a wait line, in accordance with some embodiments of the present disclosure.

Turning to FIG. 25, FIG. 25 illustrates an example 2500 of a rail road crossing. In some embodiments, railroad markings may represent physical railroad and/or tram tracks on the road. In some embodiments, the railroads may be encoded according to two polylines, shown dashed lines in FIG. 25. Turning to FIG. 26, FIG. 26 illustrates an example 2600 of a wait line. In various embodiments, a wait line may be encoded according to two polylines, shown as dashed lines FIG. 26. For example, wait lines may denote a line that a driver may be required to stop and/or yield. In an embodiment, the wait lines may be encoded by two polylines that may follow the edges that a vehicle will cross over when passing the line.

In some embodiments, arrow markings may be text markings and image road markings. However, in various embodiments, a duplicate image road marking may not be placed in 'image_markings' data element. For example, Arrow markings and text markings may only be placed in arrow markings and text markings respectively. Below is an example table of types of road markings:

| Name | Type | Description |
|---|---|---|
| image_markings | ImageRoadMarking | The image markings in this road segment |
| arrow_markings | ArrowMarking | The arrow markings in this road segment |
| text_markings | TextMarking | The text markings in this road segment |
| do_not_block_box | DoNotBlockBox | The do not block markings in this road segment |
| zigzag_markings | ZigZagMarking | The zigzag markings in this road segment |
| pedestrian_crossing_markings | CrossingMarking | The crossing markings in this road segment |
| rail_road_tracks | RailRoadTracks | The railroad tracks in this road segment |
| wait_line_markings | WaitLineMarking | The wait lines in this road segment |
| marking_groups | RoadMarkingCompositeGroup | Groups of markings that are semantically related |

In various embodiments, a quadrilateral shape may be used to specify bounding shapes (e.g., boxes, quadrilaterals, circles, etc.) for road markings. In such embodiments, to do so, all four points may be required to be set and the four points may be required to be specified clockwise, as illustrated in the table below:

| Name | Type | Description |
|---|---|---|
| top_left | Point | The top left of the quadrilateral |
| top_right | Point | The top right of the quadrilateral |
| bottom_right | Point | The bottom right of the quadrilateral |
| bottom_left | Point | The bottom left of the quadrilateral |

For polyline quadrilaterals, for example, a quadrilateral shape defined by polylines may be used to specify bounding boxes for road markings. In such examples, to do so, all four lines may be set and the points may be in clockwise order. Additionally, the first/last points of each polyline may be identical to the last/first points or each connecting side, as illustrated by the table below:

| Name | Type | Description |
|---|---|---|
| top_line | Polyline | The top of the quadrilateral |
| right_line | Polyline | The right of the quadrilateral |
| bottom_line | Polyline | The bottom of the quadrilateral |
| left_line | Polyline | The left of the quadrilateral |

In yet other examples, a linear area may describe an area in the world with two polylines. In such examples, to do so, the left and ride side may include at least two points, the left and ride side may include the same number of points, and the left side may be left of the right points with respect to the order of points, as illustrated by the table below:

| Name | Type | Description |
|---|---|---|
| left_side | Polyline | The left side of the area |
| right_side | Polyline | The right side of the area |

An example image road marking table is provided below:

| Name | Type | Description |
|---|---|---|
| id | ElementId | The id of the element |
| box | Quadrilateral | The quadrilateral defining the image marking |
| lane__ids | ElementReference[ ] | Lanes that this road marking are associated to |
| type | Enum | The type of the image marking |

An example arrow marking table is provided below:

| Name | Type | Description |
|---|---|---|
| image__mark | ImageMarking | The image marking that describes the shape of the road marking |
| arrow__tips | Point[ ] | Describes the position of the arrow tips |
| arrow__class | Enum | The class of the arrow |
| included__directions | Enum[ ] | The directions that the arrow is pointing |

An example text marking table is provided below:

| Name | Type | Description |
|---|---|---|
| image__mark | ImageMarking | The image marking that describes the shape of the road marking |
| text | string | The text contained in the marking |

An example image road marking table is provided below:

| Name | Type | Description |
|---|---|---|
| id | ElementId | The id of the element |
| box | PolylineQuadrilateral | The quadrilateral defining the image marking |
| lane__ids | ElementReference[ ] | Lanes that this road marking are associated to |

An example road marking composite group table is provided below:

| Name | Type | Description |
|---|---|---|
| id | ElementId | The id of the element |
| road__markings | ElementReference[ ] | The IDs of road markings in this group. |

An example ZigZag marking table is provided below:

| Name | Type | Description |
|---|---|---|
| id | ElementId | The id of the element |
| marking__line | LinearArea | The linear area that defines the zigzag marking space |
| next__zig__zag | ElementReference | A connection to the next section of the road marking if it spans multiple road segments |
| previous__zig__zag | ElementReference | A connection to the previous section of the road marking if it spans multiple road segments |

An example crossing marking table is provided below:

| Name | Type | Description |
|---|---|---|
| id | ElementId | The id of the element |
| shape | LinearArea | The linear area that defines the marking space |
| type | Enum | The type of the crossing marking |

An example railroad tracks table is provided below:

| Name | Type | Description |
|---|---|---|
| id | ElementId | The id of the element |
| shape | LinearArea | The linear area that defines the marking space |
| next__connections | ElementReference[ ] | If the railroad track splits, or continues into another road segment, the list of railroad track sections that this section continues into |
| previous__connections | ElementReference[ ] | If the railroad track splits, or continues into another road segment, the list of railroad track sections that continue into this one |

An example wait line marking table is provided below:

| Name | Type | Description |
|---|---|---|
| id | ElementId | The id of the element |
| shape | LinearArea | The linear area that defines the marking space |
| type | Enum | The type of the wait line. |
| position_confidence | Confidence | The confidence of the position of the wait line |
| type_confidence | Float | The confidence of the type of the wait line |

In some embodiments, traffic and sign poles may be included in the map as a poles layer to assist in localization. An example table is provided below:

| Property | Data Type | Description |
|---|---|---|
| ID | UUID (as two uint64) | A unique identifier for pole |
| Road Segment | Reference | A pole is anchored on a road segment |
| Geometry | 3D Point: Pole Bottom<br>3D Point: Pole Top | A pole in the map is a straight segment line defined by two points. |
| Type | Enumeration: Light, Sign | A pole is either a Light (e.g. traffic or street), or Sign pole |
| Material | Enumeration: Metal, Concrete, Plastic, Wood | The material for the pole is included |

Figure 27:
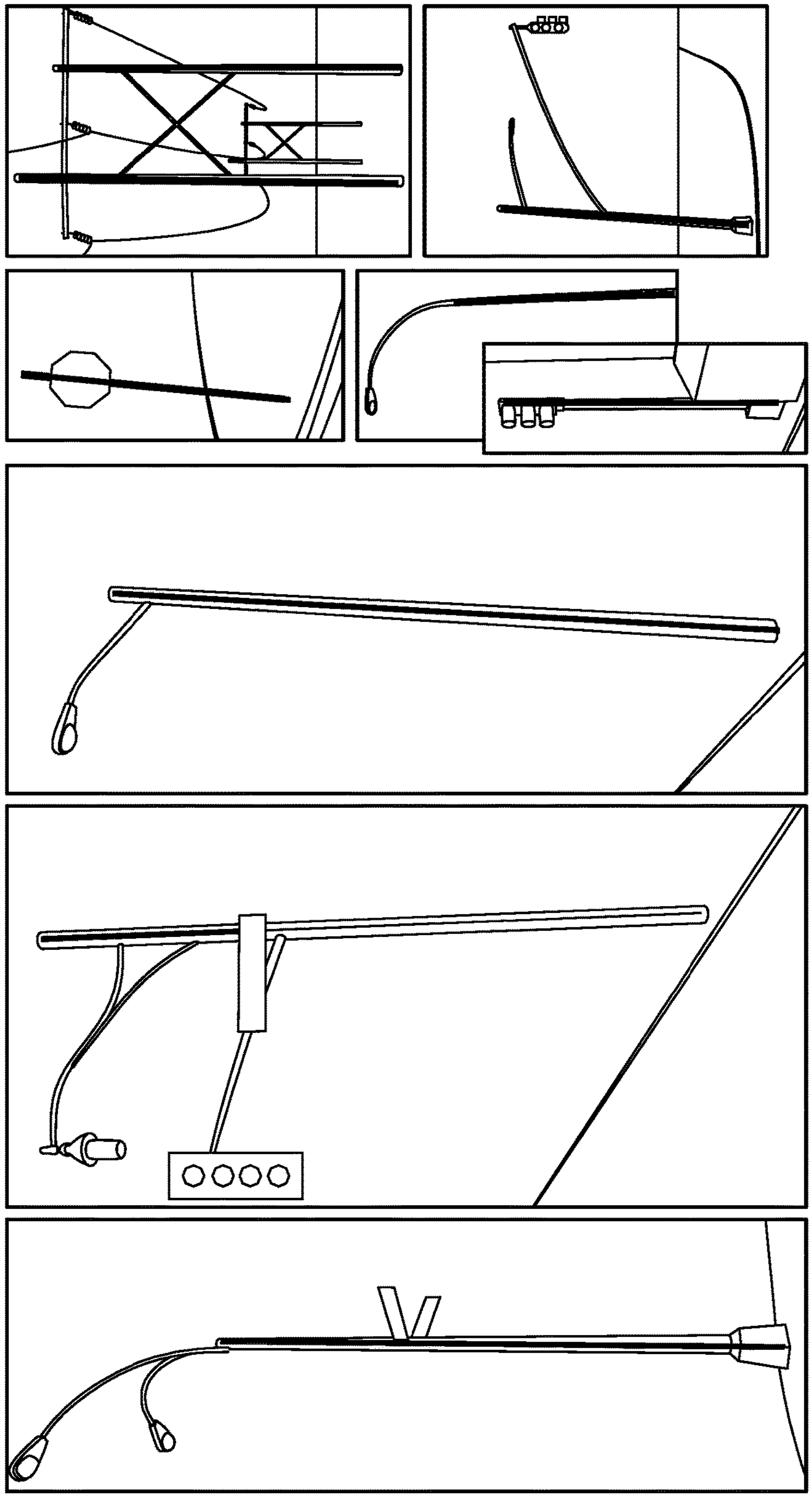
FIG. 27 illustrates an example of polylines for poles, in accordance with some embodiments of the present disclosure.

FIG. 27 illustrates an example 2700 of polylines for poles. In various examples, poles in the map may be straight, or close to straight, and the corresponding line segment may be in the center of the pole. If a pole has curvature, for example, then only the straight portion of the pole may be included. In other examples, if a pole has branches (e.g., a tree, an extension including a light from a light pole, etc.), only the center of the pole may be included. In some embodiments, traffic lights, street lights, and traffic sign poles may be included. In some additional embodiments, poles of 1 meter or greater may be included. Examples of polylines for poles and similar structures are illustrated in FIG. 27.

Figure 28:
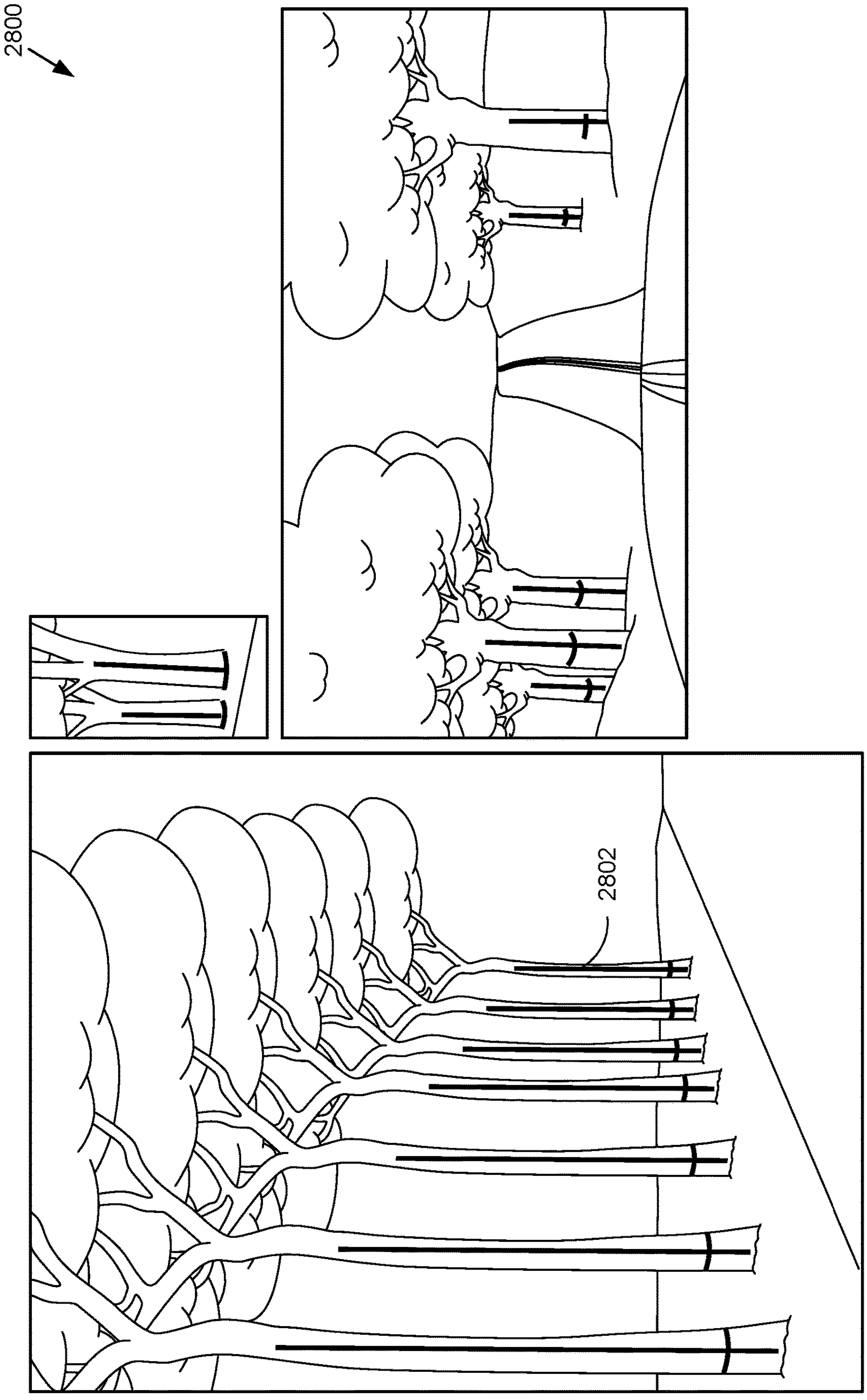
FIG. 28 illustrates an example of polylines for trees, in accordance with some embodiments of the present disclosure.

FIG. 28 illustrates an example 2800 of polylines for trees. In some embodiments, tree trunks may be labeled (illustrated in FIG. 28 as the horizontal line of the cross 2802), and a straight portion of the tree trunk may be the portion of the tree labeled (illustrated in FIG. 28 as the vertical line of the cross 2802). Additionally, in various embodiments, trees that have no visible trunk may not be labeled.

In some embodiments, if any poles exist in the road segment, they may be included in the poles array in the payload. An example poles (including trees) table is provided below:

| Name | Type | Description |
|---|---|---|
| poles | Pole[ ] | The poles in this road segment |

The below table represents an example array for storing a beginning and end point for a line in space.

| Name | Type | Description |
|---|---|---|
| start | Point | The start of the line |
| end | Point | The end of the line |

The below table may represent examples of different information that may be stored or encoded in the map for poles (e.g., street lights, traffic lights, trees, etc.).

| Name | Type | Description |
|---|---|---|
| id | ElementID | The ID of the element |
| line | Line | The linear area that defines the marking space |
| diameter | Float | The diameter of the pole. |
| type | Enum | The type of the pole. |
| material | Enum | The material of the tree. |

Figure 29:
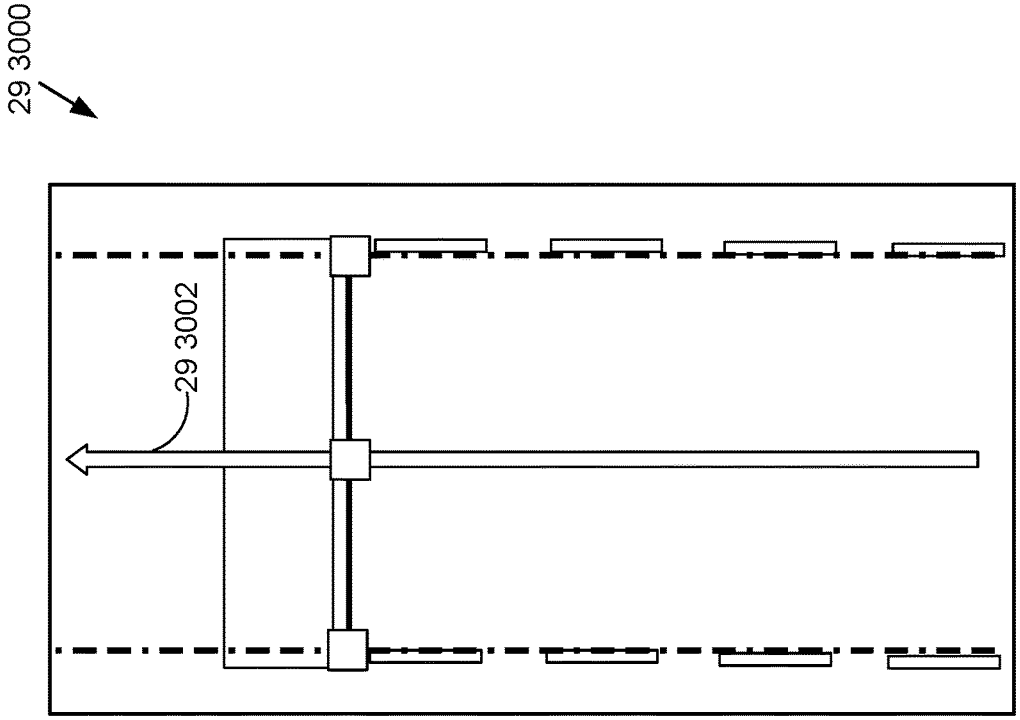
FIG. 29 illustrates an example of a junction layer indicating a right of way associated with a road, in accordance with some embodiments of the present disclosure.

FIG. 29 illustrates an example 2900 of a junction layer indicating a right of way associated with a road. In some embodiments, a junction layer may describe right of way rules 2902 of the road. For example, junctions may define contended areas, and the junction layer may define intersection rules that are specific to a given intersection or contended area. Accordingly, in such embodiments, the ego-machine may approach a particular intersection and be provided with information indicating how to navigate the particular intersection without relying on specific jurisdiction rules. In other words, each intersection and/or road segment may be encoded with specific rules for the specific intersection and/or road segment. As a result, and in contrast to conventional systems that required the use of a HD map to identify intersection features, and then a separate listing of rules and regulations for a particular locale to interpret how to approach and navigate the intersection, the HD map of the present disclosure may encode both the intersection structure type and location, but also the rules of the road. In such an example, intersections that are approached by the ego-machine may include the rules of the road encoded thereto for the particular locale, and/or the particular intersection within the particular locale (e.g., in a same locale, some intersections may allow a right turn on red and others may not, and this information may be encoded in the HD map). For example, at an abstracted level, an intersection may be encoded to include locations and types of lane lines, signs, lights, etc., and may also include information such as "at this intersection, if the light is green, ego-machine can drive through the intersection," or "at this intersection, when the light is red, ego-machine cannot turn right." As a result, the ego-machine is not required to understand or interpret the rules of the road in view of the intersection, but can rely fully on the HD map knowing that the HD map includes the rules of the road encoded thereto.

According to various non-limiting embodiments of the present disclosure, term definitions may be as follows: a path may be a set of lanes that are traversed in order to navigate to a destination lane; a contender may be an actor that interferes with a driving path; a contender lane may contain contenders with respect to another lane; a junction may be an area where paths have contention; junctions may be defined as physical road structure (e.g., an intersection); a wait line may be an entry line or exit line that defines an entry and an exit point for a junction (not all contended areas have entry line or exit lines; an entry line may be a virtual line (which may or may not corresponding to road markings) that defines a safe point to yield or stop to contending traffic and may denote a beginning point of a maneuver; an exit line may be a virtual line (which may or may not corresponding to road markings) that when passed denotes the end of a maneuver, bringing the ego-machine into a non-contended area; a maneuver may be a series of actions an ego-machine may take to pass through a contender area; a maneuver may be required to be atomically possible since stopping mid-maneuver may be unsafe.

In an embodiment, in the map, wait lines may be represented by a point along a lane. Furthermore, in various embodiments, a virtual line may be formed by using the corresponding left and right points in the channel layer. In an example, if a wait line's placement is due to a wait line marking, it may have a reference to a wait line in the road marking layer. In some embodiments, entry lines may be used in combination with junction rules to enable autonomous driving and to determine a safe stopping point if unable to autonomously navigate a junction and the user fails to respond. In some embodiments, entry lines may exist when there exists a safe point to stop before a contender area. For example, in some intersections this may mean the entry line must exist before entering the intersection.

In some embodiments, safe may be defined as (1) if stopped at the line, there are no contenders with the vehicle's position and no vehicles will have the right of way to cross through the vehicle's position; and (2) legal to stop is not relevant to safety. In some examples, it may not be legal to stop at a green light, however it is safe since no contenders will have right of way through the vehicle's position. With this definition of safety, as used in various embodiments, if the ego-machine is unable to traverse a contended interval, it may stop at the entry line and request user intervention. In an embodiments, entry lines may not exist when there is no discernible safe position to stop, for example on highway merge zones.

Figure 30:
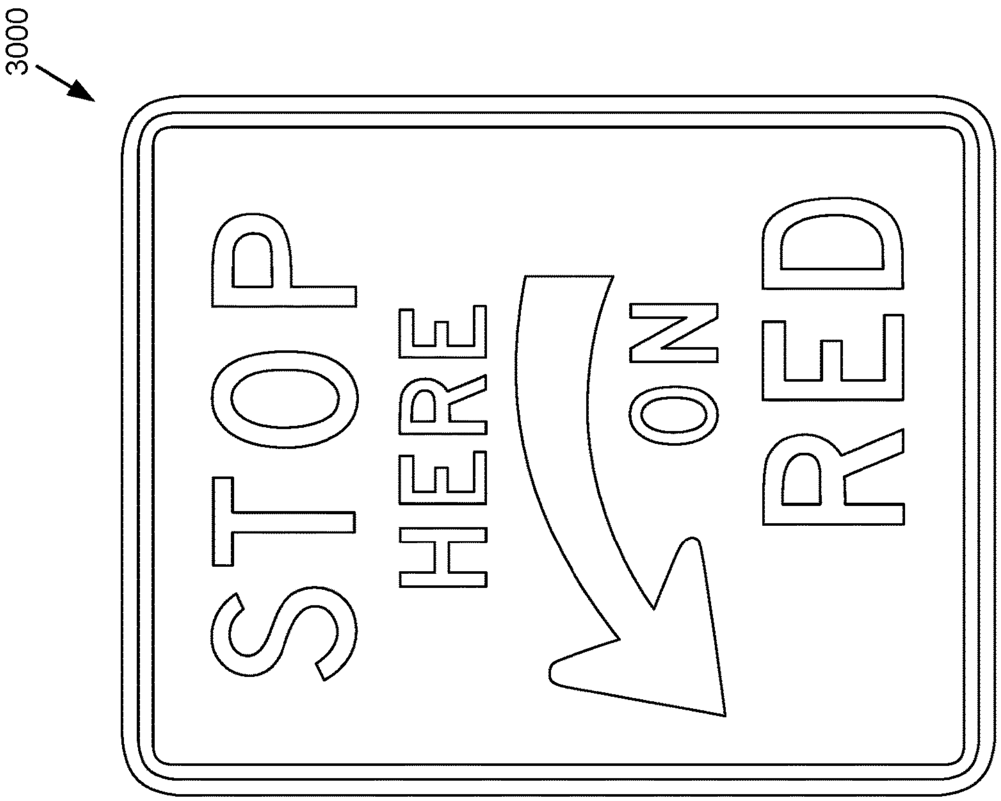
FIG. 30 illustrates an example of a physical road marking sign indicating a wait line, in accordance with some embodiments of the present disclosure.

FIG. 30 illustrates an example 3000 of a physical road marking sign indicating a wait line. In some embodiments, by default, if a physical road marking exists for a wait line, the entry line may be placed on the inner edge of the road marking. Further, in some embodiments, if there is a sign denoting a stopping location, then the entry line may be placed there. Lastly, in other embodiments, if no physical road marking exists, an entry line may be placed in a safe position outside of the contending area. For example, in conventional intersections, this may be where a painted line would be placed, or just outside of the junction area. In some embodiments, the map may place the entry line somewhere different than the physical road marking or sign indication if it has compelling information (e.g. user behavior).

In some embodiment, exit lines may be a point on a lane that when cleared by a vehicle may denote the successful completion of a maneuver. In such embodiments, this may allow an ego-machine to determine if it can fully complete the maneuver before initiating it. For example, if a vehicle has a green light in stop and go traffic, it may use the exit line to determine if it is able to fully clear the intersection. In other examples, if no exit line exists, the implicit exit line may be the same as the entry line, meaning by clearing the entry line, the ego-machine has also cleared any contenders.

In some embodiments, Micro Operational Design Domains (Micro ODDs) may describe atomic level interactions between lanes. The rules applied to these Micro ODDs may be combined into full ODDs in some embodiments. For example, when a vehicle must stop, but has no contention, an entry line may exist and a rule may apply to the wait line. Accordingly, since in some examples no contention may exist, the vehicle may be clear of any contentions once passed the entry line (e.g., no exit line may exist).

In some embodiments, an entry line may be placed before the contentions follow prior specified rules and the exit line may be placed beyond the contention. In other embodiments, when two or more contentions must be cleared together, the exit line may be placed so that the vehicle is clear of all contentions and the entry line is before all contentions. In some embodiments, a Micro ODD may merge with a primary and/or secondary lane with no junction area. In such embodiments, this Micro ODD refers to merges where one lane merges into another, but may include stipulations such as one lane has right of way and there is no discernible shared junction area. In an example, the secondary lane may be joining the primary and there may be no easily identifiable geometry of a shared space. In various embodiments, in forced lane changes (e.g., highway merges), wait lines in Operational Design Domains (ODDs) may apply the rules from the Micro ODDs. Example intersections applying the Micro ODDs rules are illustrated in FIGS. 31-45.

Figure 32:
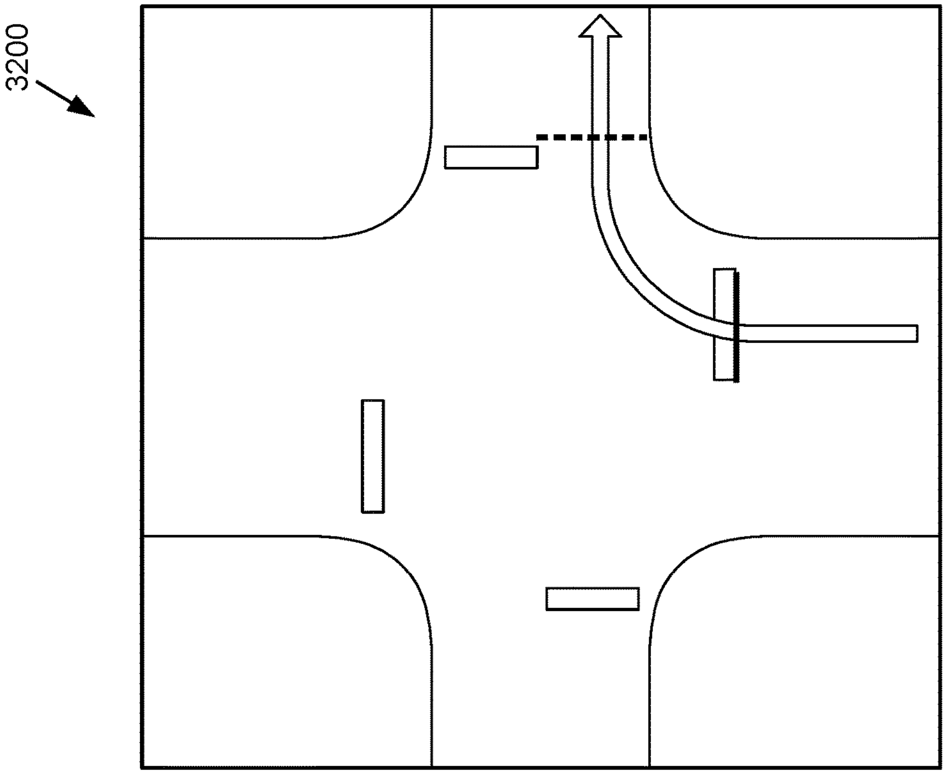
FIG. 32 illustrates an example of a 4-way intersection with no painted lines, in accordance with some embodiments of the present disclosure.
Figure 31:
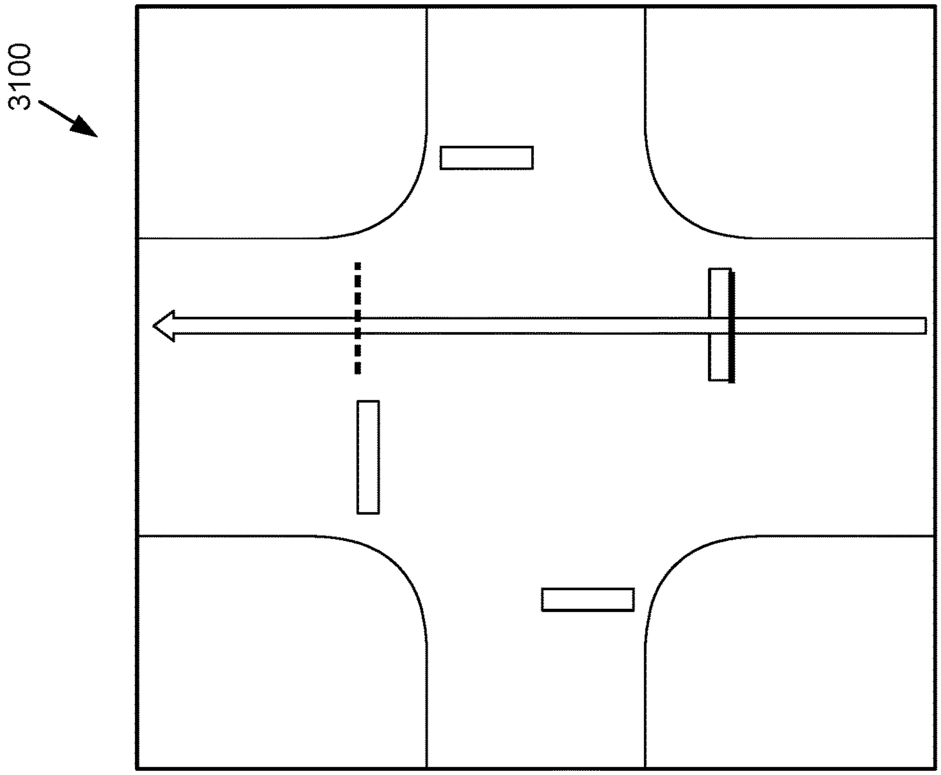
FIG. 31 illustrates an example of a 4-way intersection with no painted lines, in accordance with some embodiments of the present disclosure.
Figure 34:
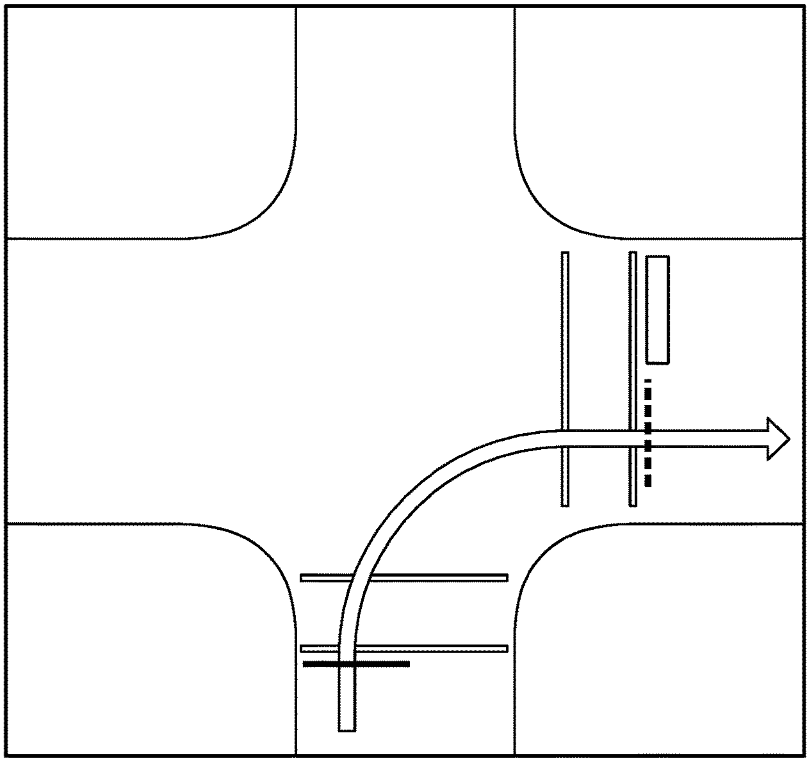
FIG. 34 illustrates an example of a 4-way intersection with a crosswalk, in accordance with some embodiments of the present disclosure.
Figure 33:
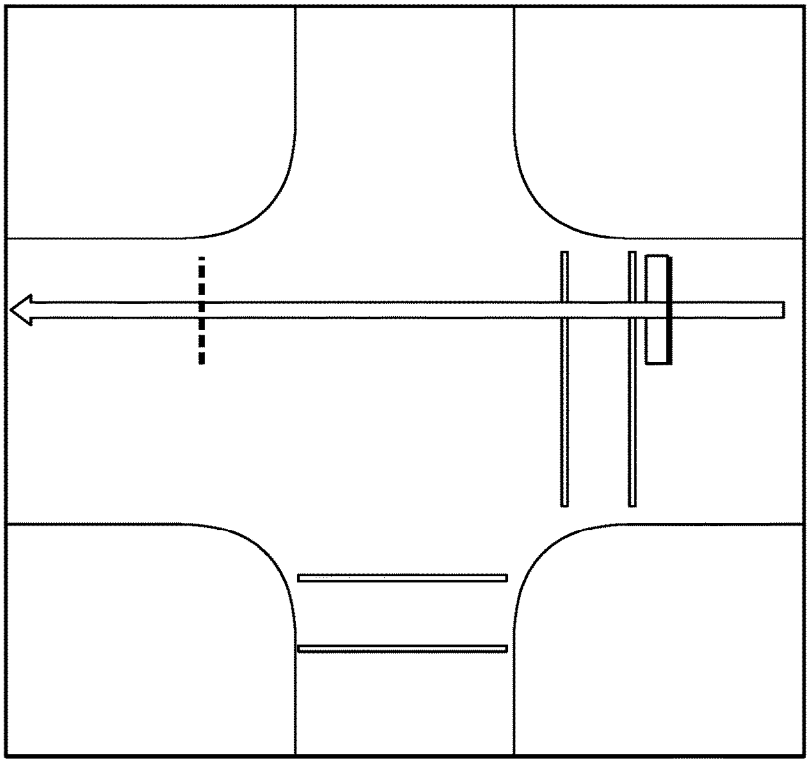
FIG. 33 illustrates an example of a 4-way intersection with a crosswalk, in accordance with some embodiments of the present disclosure.

FIGS. 31 and 32 illustrates examples 3100 and 3200 of a 4-way intersection with no painted lines. As illustrated in FIGS. 31 and 32 the entry lines are indicated by solid lines and the exit lines are indicated by dashed lines. FIGS. 33 and 34 illustrate examples 3300 and 3400 of a 4-way intersection with a crosswalk. In various embodiments, when a crosswalk is integrated into an intersection, entry lines (illustrated in FIGS. 33 and 34 as solid lines) may be placed before the crosswalk since the ego-machine can safely stop before the crosswalk. In such embodiments, exit lines (illustrated in FIGS. 33 and 34 as dashed lines) may be placed after the crosswalk, since the ego-machine may not clear of all contenders until passing the exit line.

Figure 35:
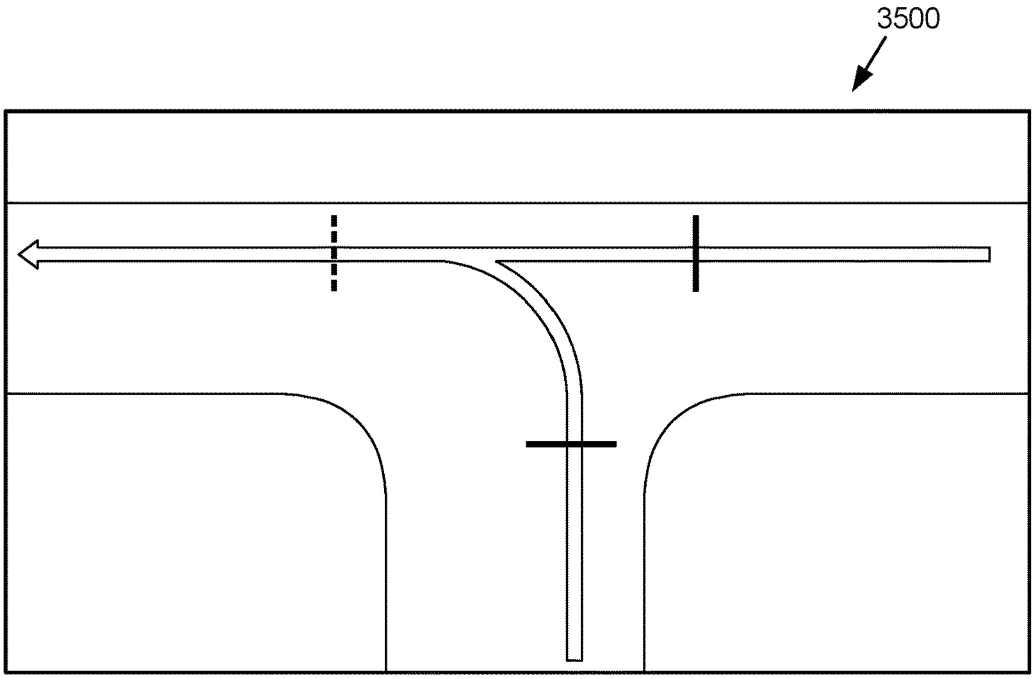
FIG. 35 illustrates an example of a T junction, in accordance with some embodiments of the present disclosure.

FIG. 35 illustrates an example 3500 of a T junction. In some embodiments, for a lane going straight such as illustrated in FIG. 35, an entry line (illustrated as a solid line in FIG. 35) may describe a point before entering the T junction. In various embodiments, if the ego-machine is unable to drive autonomously through this junction, then the ego-machine may stop at the wait line until there is user interaction. Further, an exit line (illustrated as a dashed line in FIG. 35) may inform the straight line of when the ego-machine is clear of the T junction. In stop and go traffic, the ego-machine may decide to not block the intersection in an embodiment.

Figure 36:
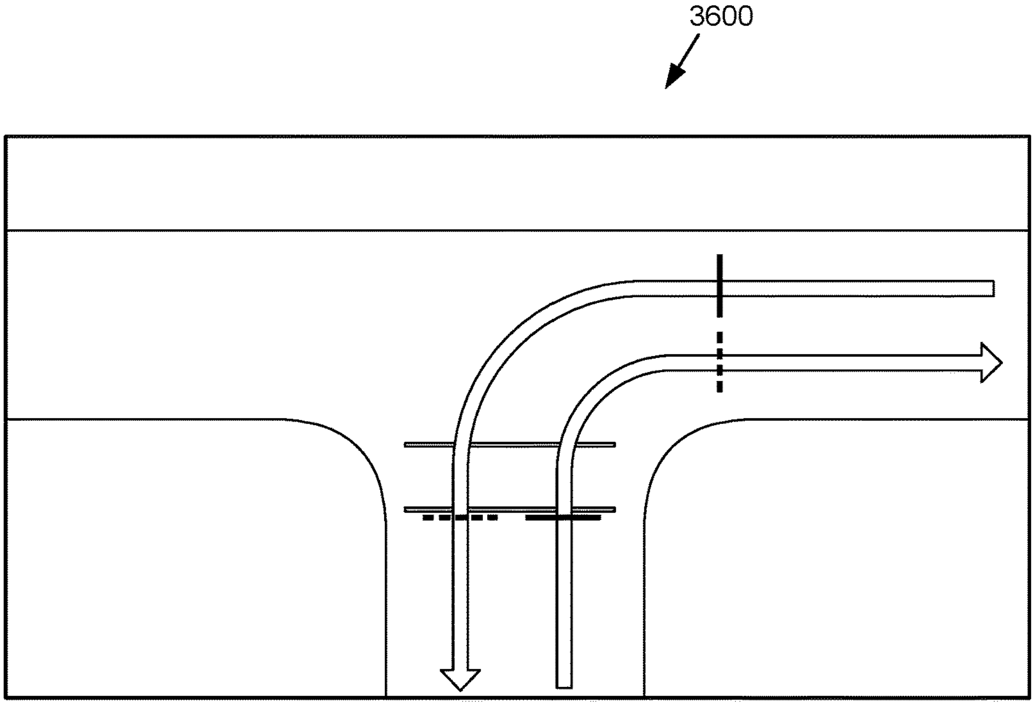
FIG. 36 illustrates an example of a T junction with a crosswalk, in accordance with some embodiments of the present disclosure.
Figure 37:
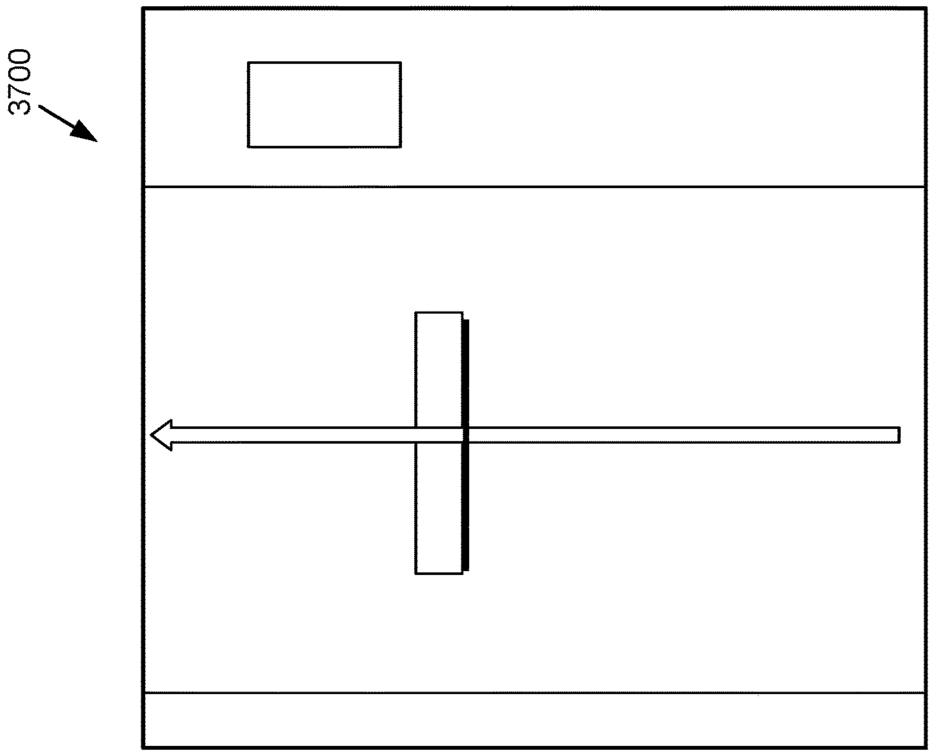
FIG. 37 illustrates an example of a metered highway entry, in accordance with some embodiments of the present disclosure.
Figure 38:
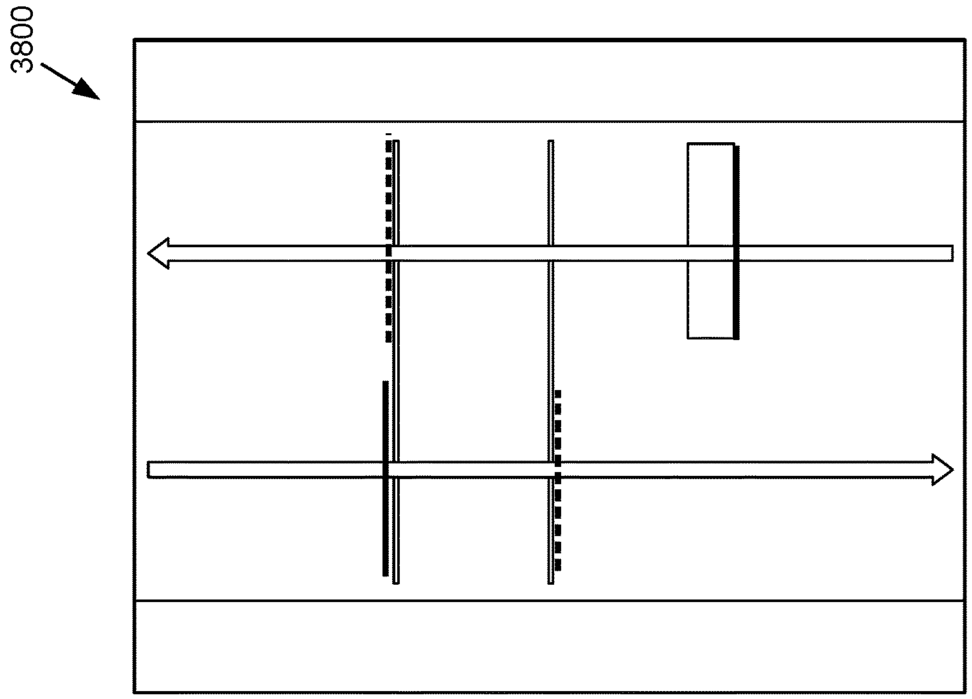
FIG. 38 illustrates an example of a crosswalk, in accordance with some embodiments of the present disclosure.
Figure 39:
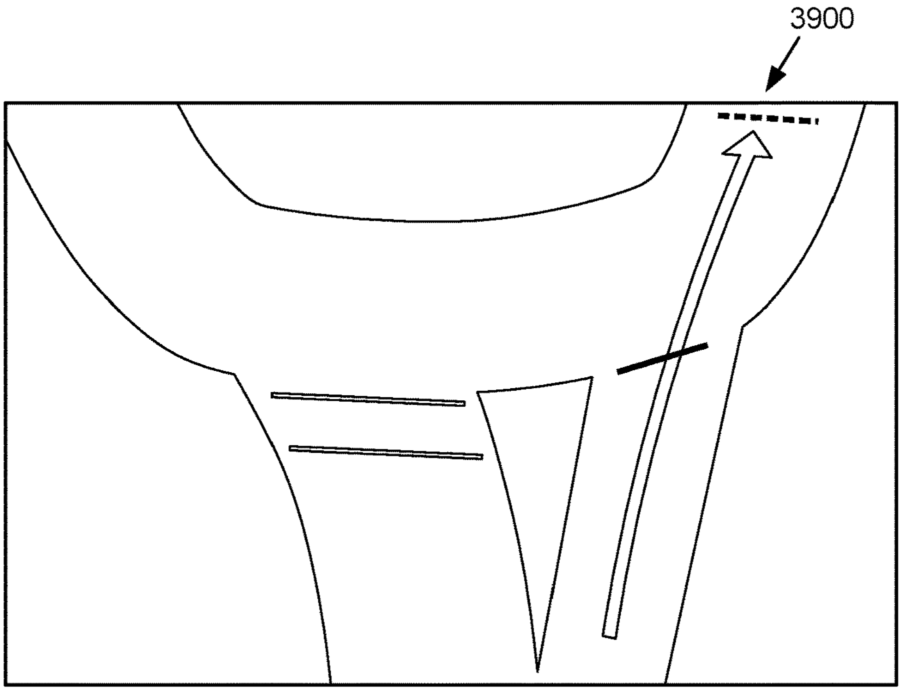
FIG. 39 illustrates an example of a roundabout, in accordance with some embodiments of the present disclosure.
Figure 40:
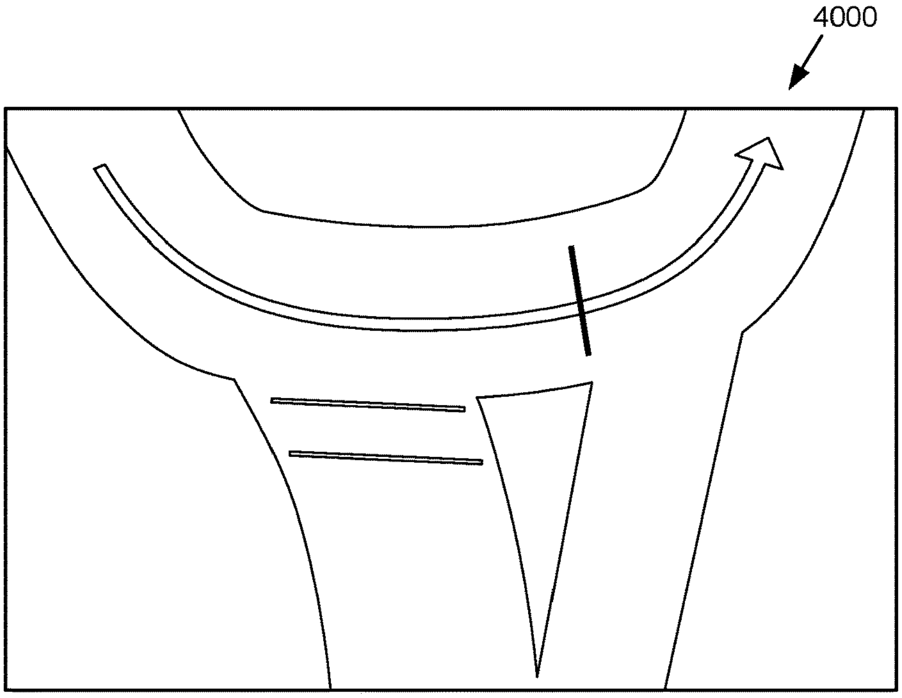
FIG. 40 illustrates an example of a roundabout, in accordance with some embodiments of the present disclosure.
Figure 41:
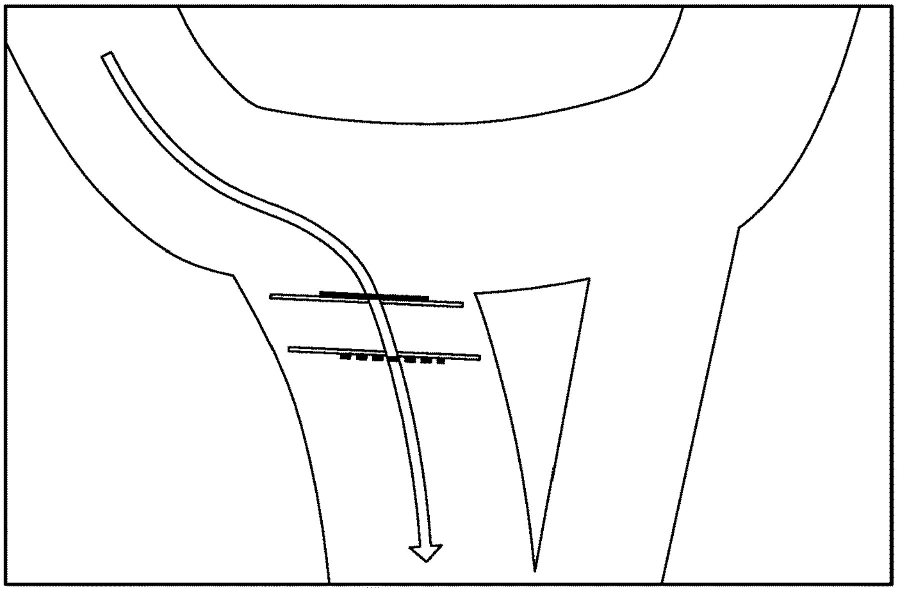
FIG. 41 illustrates an example of a roundabout, in accordance with some embodiments of the present disclosure.

FIG. 36 illustrates an example 3600 T junction with a crosswalk. In various embodiments, the crosswalk corresponds to entry lines (indicated by solid lines) and exit lines (indicated by dashed lines) relative to the direction of the ego-machine (e.g., if the ego-machine is starting or ending the maneuver at the crosswalk. FIG. 37 illustrates an example 3700 of a metered highway entry. In various embodiments, the metered highway entries may not have exit lines, since the maneuver may be complete once the ego-machine has passed the entry line. FIG. 38 illustrates an example 3800 of a crosswalk. FIGS. 39-41 illustrate example 3900, 4000, and 4100 of roundabouts where entry lines are indicated by solid lines and exit lines are indicated by dashed lines.

Figure 42:
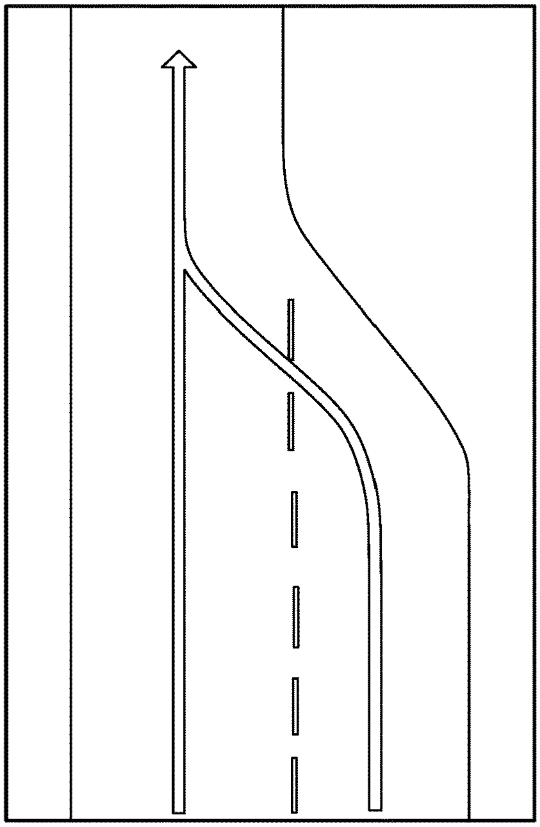
FIG. 42 illustrates an example of a highway merge, in accordance with some embodiments of the present disclosure.
Figure 43:
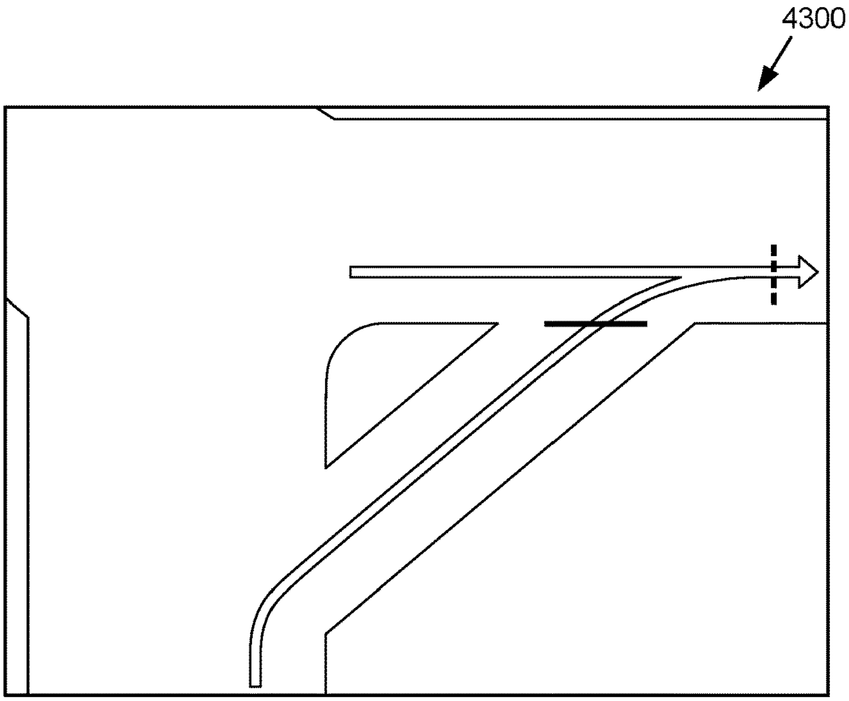
FIG. 43 illustrates an example of an intersection with a right turn lane, in accordance with some embodiments of the present disclosure.
Figure 45:
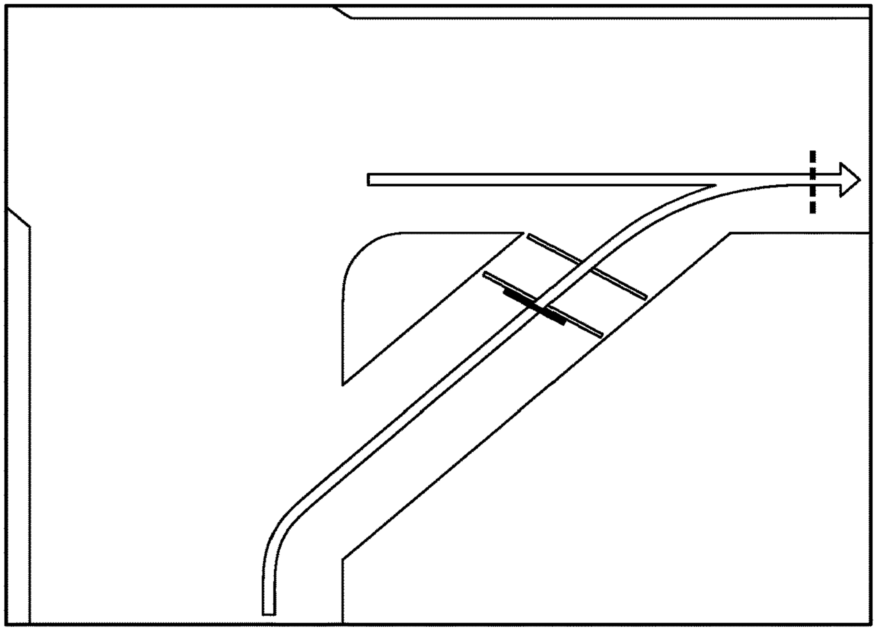
FIG. 45 illustrates an example of an intersection with a right turn lane crosswalk, in accordance with some embodiments of the present disclosure.

FIG. 42 illustrates an example 4200 of a highway merge. In some embodiments, a highway merge may act as a lane change, rather than a junction, as illustrated in FIG. 45. In various embodiments, highway merges may not contain exit or entry lines and there may be no safe stop point on the highway since the ego-machine must remain at a sufficient speed to safely merge. FIG. 43 illustrates an example 4300 of an intersection with a right turn lane without a crosswalk where entry lines are indicated by solid lines and exit lines are indicated by dashed lines.

Figure 44:
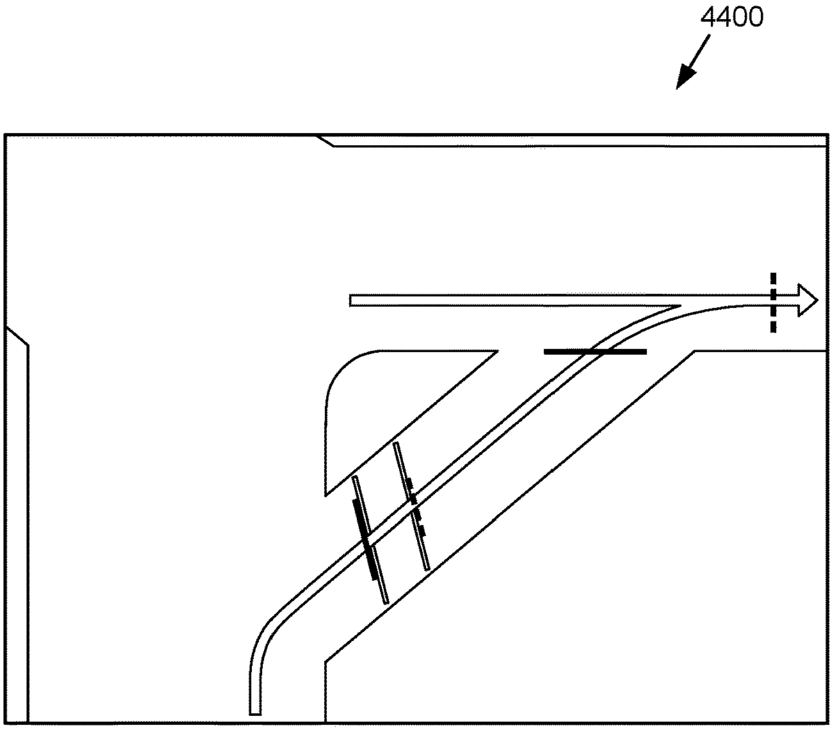
FIG. 44 illustrates an example of an intersection with a right turn lane crosswalk, in accordance with some embodiments of the present disclosure.

FIGS. 44 and 45 illustrate examples 4400 and 4500 of intersections with a right turn lane and a crosswalk. In some embodiments, if there is, e.g., ten meters from the merge entry line (indicated by solid lines) and the exit line (indicated by dashed lines), of the crosswalk, then the entry line and the exit line may be represented with two sets of wait lines (e.g., two pairs of entry lines and exit lines). In such embodiments, this may be enough room for a vehicle to stop after the crosswalk. In some embodiments, if the exit line is closer than, e.g., ten meters to the merge entry line, crossing the crosswalk and merging may become one maneuver.

In various embodiments, junction directions may contain a list of junction rules, where a junction rule may define a rule that should be followed in order for the ego-machine to proceed through a path. In such embodiments, these rules may be associated with a contention; however this may not be required. For example, in special cases (e.g. metered highway), there may be no contention.

In some embodiments, payloads may be encoded per segment. For example, each payload may be stored per road segment in the format: [road segment id].nvmap. In some embodiments, wait lines may be encoded as intervals along a channel. For example, wait lines may be defined as one or more points along a channel. In an embodiment, a position along the lane divider, left and right channels may be defined as an index into their geometry.

In some embodiments, the junction layer may include features such as rules with multiple-lights, probability density function (PDF) support for light combinations, phase 1 signal interface support, and/or understanding of signal interface and/or rule interplay, among other features.

An example junction layer format data table is provided below.

| Name | Type | Description |
|---|---|---|
| junctions | Junction | A list of junctions in this road segment |
| uniform__signal__rules | UniformSignalRuleTable | Rule tables used within this payload |

An example, junction format data table is provided below.

| Name | Type | Description |
|---|---|---|
| id | MapElement | The unique id of this element |
| dw__roadsegments | MapElementID[ ] | The road segment ids of which elements in this road segment are contained |
| extent__polygon | Polyline | The polygon that encompasses all entities in the junction |
| directions | JunctionDirection[ ] | The directions included in this junction |
| contention__areas | ContentionArea[ ] | The contention areas included in this junction |
| path__contention__matrix | DirectionContentionPair[ ] | A matrix that defines the contention type between all paths in all contenting directions |
| direction__contention__row__size | uint32 | The size of each row in the path__contention__matrix |

-

An example junction direction format data table is provided below.

| Name | Type | Description |
|---|---|---|
| id | MapElement | The unique id of this element |
| similar__wait__paths | Path[ ] | The paths inside of the direction |
| rules | JunctionRule[ ] | The rules that are evaluated in order to proceed through the path |
| contentions | DirectionContention[ ] | A list of other directions that this direction contends with |
| area__contentions | ContentionAreaContention[ ] | A list of area contentions |

An example junction rule format data table is provided below.

| Name | Type | Description |
|---|---|---|
| rule__application__type | Enum | The target that the rule applies to |
| rule__target__index | uint32 | The target contention if the target is a contention |
| rule | StaticB ehaviorRule OR UniformSignalRuleTableReference | The rules that are evaluated in order to proceed through the path |
| signal__group | UniformSignalGroup | A list of signal to observe |
| uniform__signal__rule__table | ElementId | A reference to the rule in table in the junctions layer payload. |

An example static behavior rule format data table is provided below.

| Name | Type | Description |
|---|---|---|
| behavior | WaitBehavior | A list of signal to observe |
| sign_feature | ElementReference[ ] | References to traffic signs involved in the static rule |

An example path format data table is provided below.

| Name | Type | Description |
|---|---|---|
| id | MapElementId | The id of the element |
| lane_ids | ElementId[ ] | References to lane ids that compose the path. |
| entry_line | WaitLine | The entry line of the path |
| exit_line | WaitLine | The exit line of the path |

An example wait line format data table is provided below.

| Name | Type | Description |
|---|---|---|
| lane_id | ElementId | The lane at which the wait line appears |
| lane_index | float | The float fractional index of the lane referenced by lane_id |
| channel_id_left | ElementId | The optional left channel that contains the channel_index_left to form a wait line. |
| channel_index_left | Float | The fractional index of the left channel that specifies the point to form a wait line. |
| channel_id_right | ElementId | The optional right channel that contains the channel_index_right to form a wait line. |
| channel_index_right | Float | The fractional index of the right channel that specifies the point to form a wait line. |

An example contention area format data table is provided below.

| Name | Type | Description |
|---|---|---|
| id | MapElementId | The id of the element |
| type | Enum | The type of the contention area |
| left_line | PoylineFeature | The left polyline of the contention area |
| center_line | PoylineFeature | The center polyline of the contention area |
| right_line | PoylineFeature | The right polyline of the contention area |

An example frame transforms layer is illustrated with the following pseudo-code:

```
/// Specifies the timestamped coordinate transformation of the “rig”
relative
/// to the segment-local ENU coordinate system.
table FrameTransform {
   timestamp: ulong (key);
   translation: Vector3f;
   quaternion: Vector4f;
}
/// Contains the frame transforms applying to a particular segment for a
/// mapping data capture session. The sequence of frame transforms
defines a
/// partial vehicle trajectory from a mapping data capture session.
table SessionFrameTransforms {
   session_id: string;
   transforms: [FrameTransform];
}
/// Contains the frame transforms applying to a particular segment for all
/// mapping data capture sessions.
table FrameTransformsV1Layer {
   transforms:[SessionFrameTransforms];
}
root_type FrameTransformsV1Layer;
```

An example ground truth layer is illustrated with the following pseudo-code:

```
/// Contains ground truth for the pose of a segment coordinate frame.
table GroundTruthSegmentPose {
   /// Describes the ground truth pose of the segment ENU coordinate
   frame.
   /// The rotation part is from the local estimated ENU to ground truth
   ENU.
   pose : GeoPose;
}
/// Contains ground truth data relevant to a particular segment.
table GroundTruthV1Layer {
   gt_segment_pose : GroundTruthSegmentPose;
}
```

An example parking spaces layer is illustrated with the following pseudo-code:

```
/// Specifies the local content of the parking spaces layer.
/// The content of this message is associated with a particular road segment.
table ParkingSpacesV1Layer {
   parking_spaces: [ParkingSpace];
}
root_type ParkingSpacesV1Layer;
/// Specifies properties of a parking space boundary segment.
table ParkingSpaceBoundarySegment {
   /// Indicates if the parking space boundary segment is traversable.
   traversable: bool;
   /// Specifies the reason for the indicated boundary segment traversability.
   reason: Traversability Reason;
   /// Indicates confidence of the specified boundary segment properties.
   confidence: Confidence1f;
}
/// Enumerates parking direction relative to the reference polyline.
/// Forward is defined as the local direction of the reference polyline.
enum ParkingDirection : uint8 {
   Unknown   = 0,
   Forward   = 1,
```

-continued

```
    Backward   = 2,
    Both     = 3,
    PerpendicularLeft = 4,
    PerpendicularRight = 5,
    PerpendicularBoth = 6,
}
/// Describes the geometry and properties of a parking space.
table ParkingSpace {
    /// Unique identifier for the parking space.
    id: string (key);
    /// Boundary geometry polyline.
    /// Closure of the boundary is guaranteed by an implied segment from point[N−1]
to point [0],
    boundaryPoints: Polyline3f;
    /// Boundary description as a list of segment properties.
    /// Each segment follows the corresponding point in the boundary polyline.
    /// NOTE: The number of points and segments must be identical!
    boundarySegments: [ParkingSpaceBoundarySegment];
    /// Parking direction relative to reference line geometry.
    parkingDirection: ParkingDirection;
    /// Reference line geometry defines the relative sense of parking direction.
    /// The reference line geometry should be strictly inside the boundary when
    /// projected to the XY (flat ground) plane.
    referenceLine: Polyline3f;
    /// Optional lane defining the preferred entry maneuver.
    entryLane: string;
    /// Optional lane defining the preferred exit maneuver.
    exitLane: string;
}
```

An example static obstacles layer is illustrated with the following pseudo-code:

```
    /// Specifies the local content of the static obstacles layer.
    /// The content of this message is associated with a particular road
    segment.
    table StaticObstaclesV1Layer {
        speed_bumps: [SpeedBump];
        undriveable_areas: [UndriveableArea];
    }
    root_type StaticObstaclesV1Layer;
    /// Defines the geometry and properties of a speed bump.
    table SpeedBump {
        /// Unique identifier for the speed bump.
        id: string (key);
        /// Outline geometry of the speed bump.
        /// Closure of the outline is implied from point[N−1] to point[0].
        outline: Polyline3f;
        /// Recommended traversal speed (m/s) of the speed bump.
        traversal_speed_mps: float;
    }
    /// Defines the boundary of an undriveable area.
    table UndriveableArea {
    /// Unique identifier for the undriveable area.
    id: string (key);
    /// Boundary geometry of the undriveable area.
    /// Closure of the boundary is implied from point[N−1] to point[0].
    boundary: Polyline3f;
    }
```

The systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, autonomous or semi-autonomous machine applications, deep learning, environment simulation, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

Figure 46:
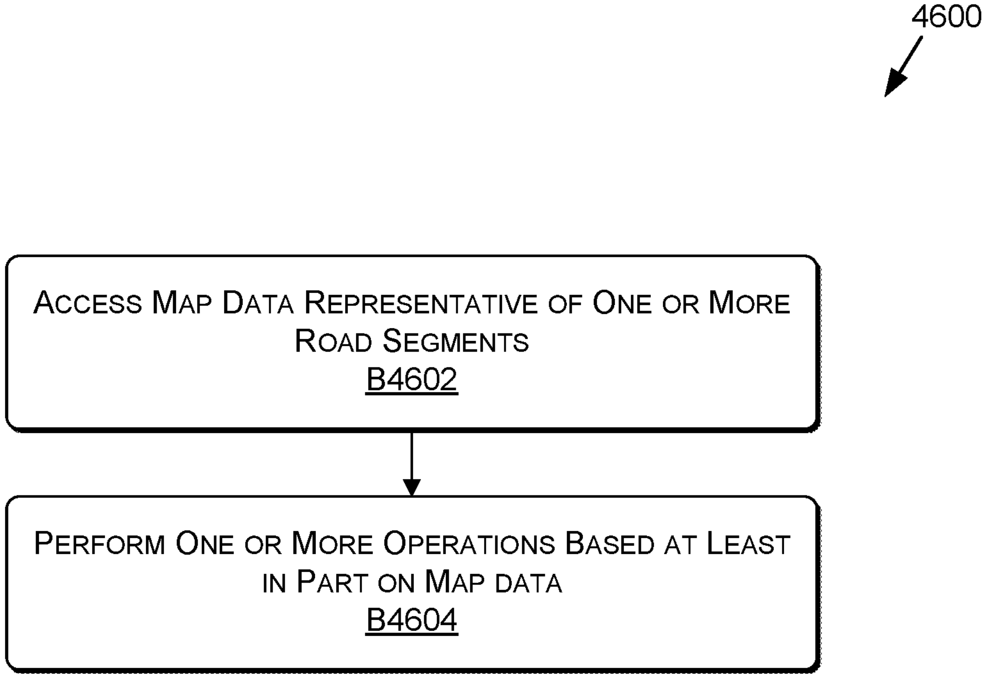
FIG. 46 is a flow diagram showing a method for preforming one or more operations based at least in part on map data, in accordance with some embodiments of the present disclosure.
Figure 47:
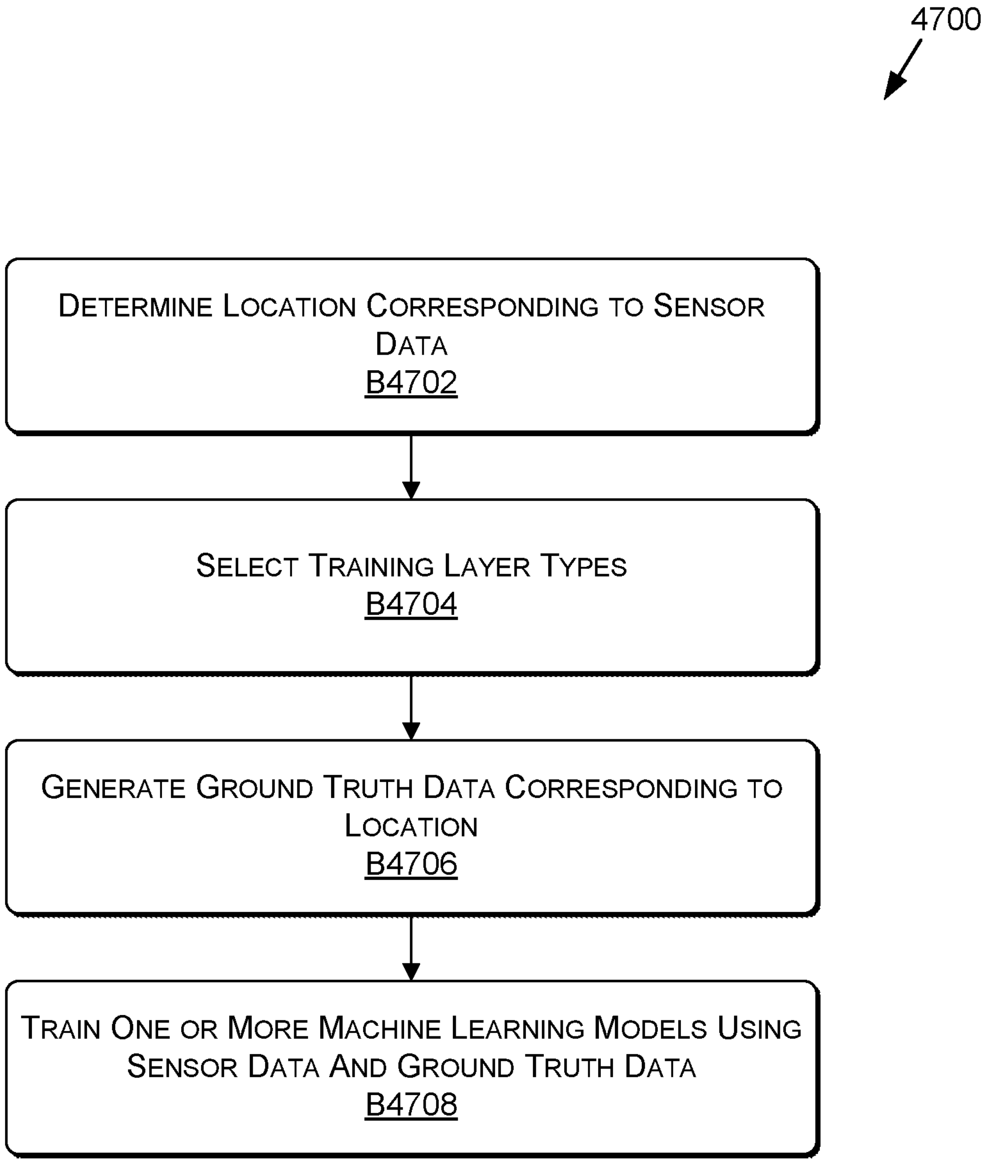
FIG. 47 is a flow diagram showing a method for training one or more machine learning models using sensor data and ground truth data, in accordance with some embodiments of the present disclosure.

Now referring to FIGS. 46 and 47, each block of methods 4600 and 4700, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, methods 4600 and 4700 are described, by way of example, with respect to the example autonomous vehicle 4800 of FIGS. 48A-48D. However, these methods may additionally or alternatively be executed by any one system, or any combination of systems, including, but not limited to, those described herein.

FIG. 46 is a flow diagram showing a method 4600 for performing one or more operations based at least in part on map data, in accordance with some embodiments of the present disclosure. The method 4600, at block B4602, includes accessing map data. In various embodiment, the map data includes an HD map as described above. For example, the map data may include one or more road segments representative of one or more road segments representing a portion of a roadway (e.g., 50 meters). In addition, in some embodiments, the map data includes at least a first layer type and a second layer type corresponding to road segments of the one or more road segments. For example, for a road segment, the map data can include a camera localization layer, a RADAR localization layer, a lane graph layer, a lane channel layer, a junctions layer, and other layers that can contain map data.

At block B4604, the system performing the method 4600, performs one or more operations based at least in part on the map data. For example, the operations may include planning, control, localization, training of one or more machine learning models, navigation, or other operation that requires map data . . . .

FIG. 47 is a flow diagram showing a method 4700 for training one or more machine learning models using sensor data and ground truth data, in accordance with some embodiments of the present disclosure. The method 4700, at block B4702, includes determining a location corresponding to sensor data. For example, the sensor data may indicate a location relative to the local coordinate system of the road segments, and the local coordinate system may have a relative location in a global coordinate system. The sensor data, in various embodiments, includes data obtained from one or more sensors of the example autonomous vehicle 4800 of FIGS. 48A-48D.

At block B4704, the system performing the method 4700, selects one or more training layer types. In an example, a training layer includes a map data layer used for training a deep neural network (DNN) model or other model. In various embodiments, training layers may be used to generate ground truth data for a model that processes images to compute locations of lane lines and/or road boundary lines.

At block B4706, the system performing the method 4700, generates ground truth data corresponding to the location. For example, lane marking and/or road boundary layers may be used as training layers, where lane markings and/or road boundaries are used to generate ground truth data for an image-based DNN that processes images to compute locations of lane lines and/or road boundary lines.

At block B4708, the system performing the method 4700, trains one or more machine learning models using the sensor data and the ground truth data. For example, sensor data (e.g., images captured by one or more sensors of the example autonomous vehicle 4800 of FIGS. 48A-48D) and the ground truth data generated, based at least in part on the training layer, are used to train underlying perception of an ego-machine. In such embodiments, the training layers may be automatically generated, and/or may be human labeled. For example, a human labeler may label information in the training layers that may be used to generate training data for any type of sensor modality.

Example Autonomous Vehicle

Figure 48A:
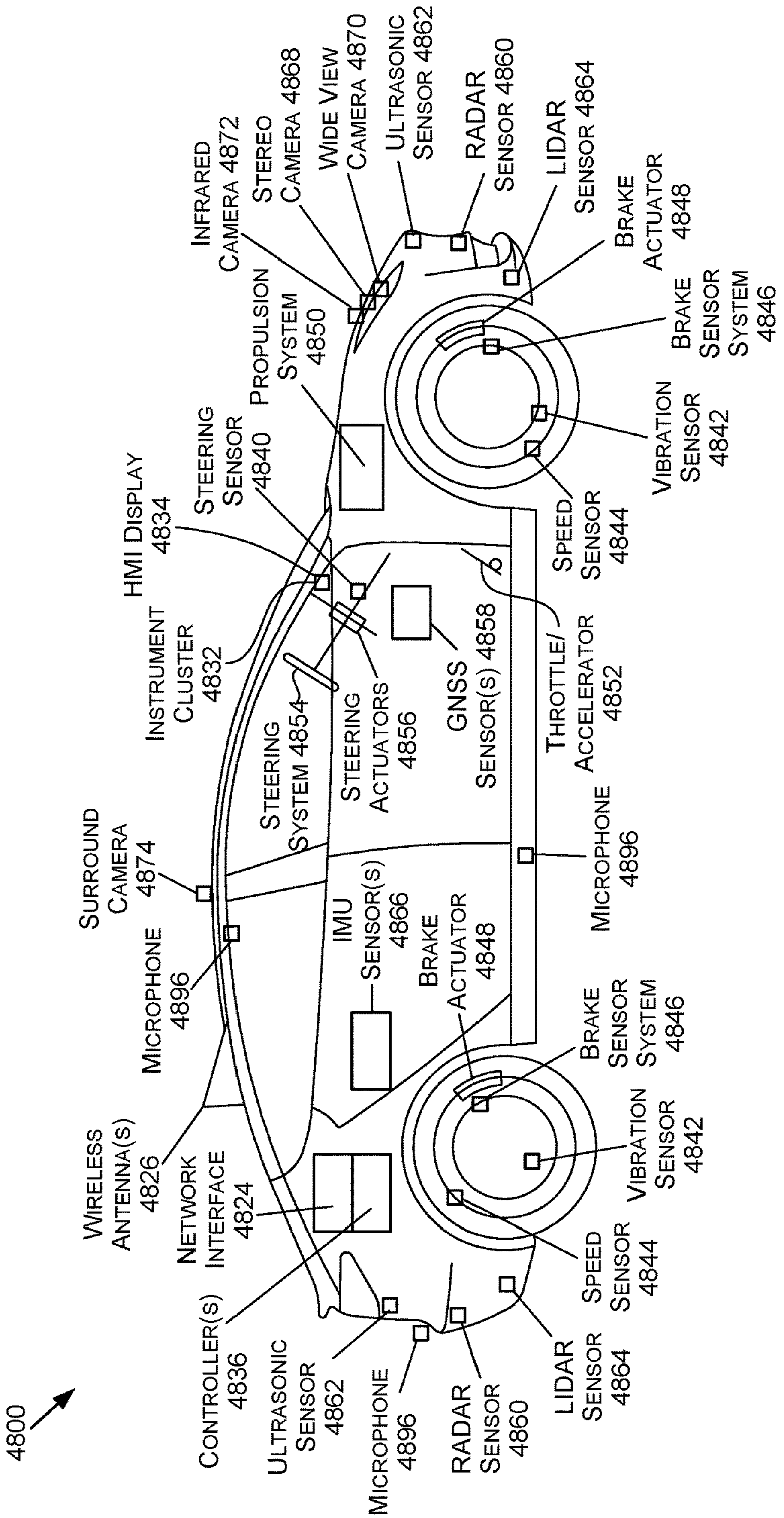
FIG. 48A is an illustration of an example autonomous vehicle, in accordance with some embodiments of the present disclosure.

FIG. 48A is an illustration of an example autonomous vehicle 4800, in accordance with some embodiments of the present disclosure. The autonomous vehicle 4800 (alternatively referred to herein as the "vehicle 4800") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, a vehicle coupled to a trailer, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 4800 may be capable of functionality in accordance with one or more of Level 3-Level 5 of the autonomous driving levels. The vehicle 4800 may be capable of functionality in accordance with one or more of Level 1-Level 5 of the autonomous driving levels. For example, the vehicle 4800 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 4800 or other machine, such as being fully autonomous, being highly autonomous, being conditionally autonomous, being partially autonomous, providing assistive autonomy, being semi-autonomous, being primarily autonomous, or other designation.

The vehicle 4800 may include components such as a chassis, a vehicle body, wheels (e.g., 2, 4, 6, 8, 18, etc.), tires, axles, and other components of a vehicle. The vehicle 4800 may include a propulsion system 4850, such as an internal combustion engine, hybrid electric power plant, an all-electric engine, and/or another propulsion system type. The propulsion system 4850 may be connected to a drive train of the vehicle 4800, which may include a transmission, to enable the propulsion of the vehicle 4800. The propulsion system 4850 may be controlled in response to receiving signals from the throttle/accelerator 4852.

A steering system 4854, which may include a steering wheel, may be used to steer the vehicle 4800 (e.g., along a desired path or route) when the propulsion system 4850 is operating (e.g., when the vehicle is in motion). The steering system 4854 may receive signals from a steering actuator 4856. The steering wheel may be optional for full automation (Level 5) functionality.

The brake sensor system 4846 may be used to operate the vehicle brakes in response to receiving signals from the brake actuators 4848 and/or brake sensors.

Controller(s) 4836, which may include one or more system on chips (SoCs) 4804 (FIG. 48C) and/or GPU(s), may provide signals (e.g., representative of commands) to one or more components and/or systems of the vehicle 4800. For example, the controller(s) may send signals to operate the vehicle brakes via one or more brake actuators 4848, to operate the steering system 4854 via one or more steering actuators 4856, to operate the propulsion system 4850 via one or more throttle/accelerators 4852. The controller(s) 4836 may include one or more onboard (e.g., integrated) computing devices (e.g., supercomputers) that process sensor signals, and output operation commands (e.g., signals representing commands) to enable autonomous driving and/ or to assist a human driver in driving the vehicle 4800. The controller(s) 4836 may include a first controller 4836 for autonomous driving functions, a second controller 4836 for functional safety functions, a third controller 4836 for artificial intelligence functionality (e.g., computer vision), a fourth controller 4836 for infotainment functionality, a fifth controller 4836 for redundancy in emergency conditions, and/or other controllers. In some examples, a single controller 4836 may handle two or more of the above functionalities, two or more controllers 4836 may handle a single functionality, and/or any combination thereof.

The controller(s) 4836 may provide the signals for controlling one or more components and/or systems of the vehicle 4800 in response to sensor data received from one or more sensors (e.g., sensor inputs). The sensor data may be received from, for example and without limitation, global navigation satellite systems sensor(s) 4858 (e.g., Global Positioning System sensor(s)), RADAR sensor(s) 4860, ultrasonic sensor(s) 4862, LIDAR sensor(s) 4864, inertial measurement unit (IMU) sensor(s) 4866 (e.g., accelerometer(s), gyroscope(s), magnetic compass(es), magnetometer(s), etc.), microphone(s) 4896, stereo camera(s) 4868, wide-view camera(s) 4870 (e.g., fisheye cameras), infrared camera(s) 4872, surround camera(s) 4874 (e.g., 360 degree cameras), long-range and/or mid-range camera(s) 4898, speed sensor(s) 4844 (e.g., for measuring the speed of the vehicle 4800), vibration sensor(s) 4842, steering sensor(s) 4840, brake sensor(s) (e.g., as part of the brake sensor system 4846), and/or other sensor types.

One or more of the controller(s) 4836 may receive inputs (e.g., represented by input data) from an instrument cluster 4832 of the vehicle 4800 and provide outputs (e.g., represented by output data, display data, etc.) via a human-machine interface (HMI) display 4834, an audible annunciator, a loudspeaker, and/or via other components of the vehicle 4800. The outputs may include information such as vehicle velocity, speed, time, map data (e.g., the HD map 4822 of FIG. 48C), location data (e.g., the vehicle's 4800 location, such as on a map), direction, location of other vehicles (e.g., an occupancy grid), information about objects and status of objects as perceived by the controller(s) 4836, etc. For example, the HMI display 4834 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 4800 further includes a network interface 4824 which may use one or more wireless antenna(s) 4826 and/or modem(s) to communicate over one or more networks. For example, the network interface 4824 may be capable of communication over LTE, WCDMA, UMTS, GSM, CDMA2000, etc. The wireless antenna(s) 4826 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 48B:
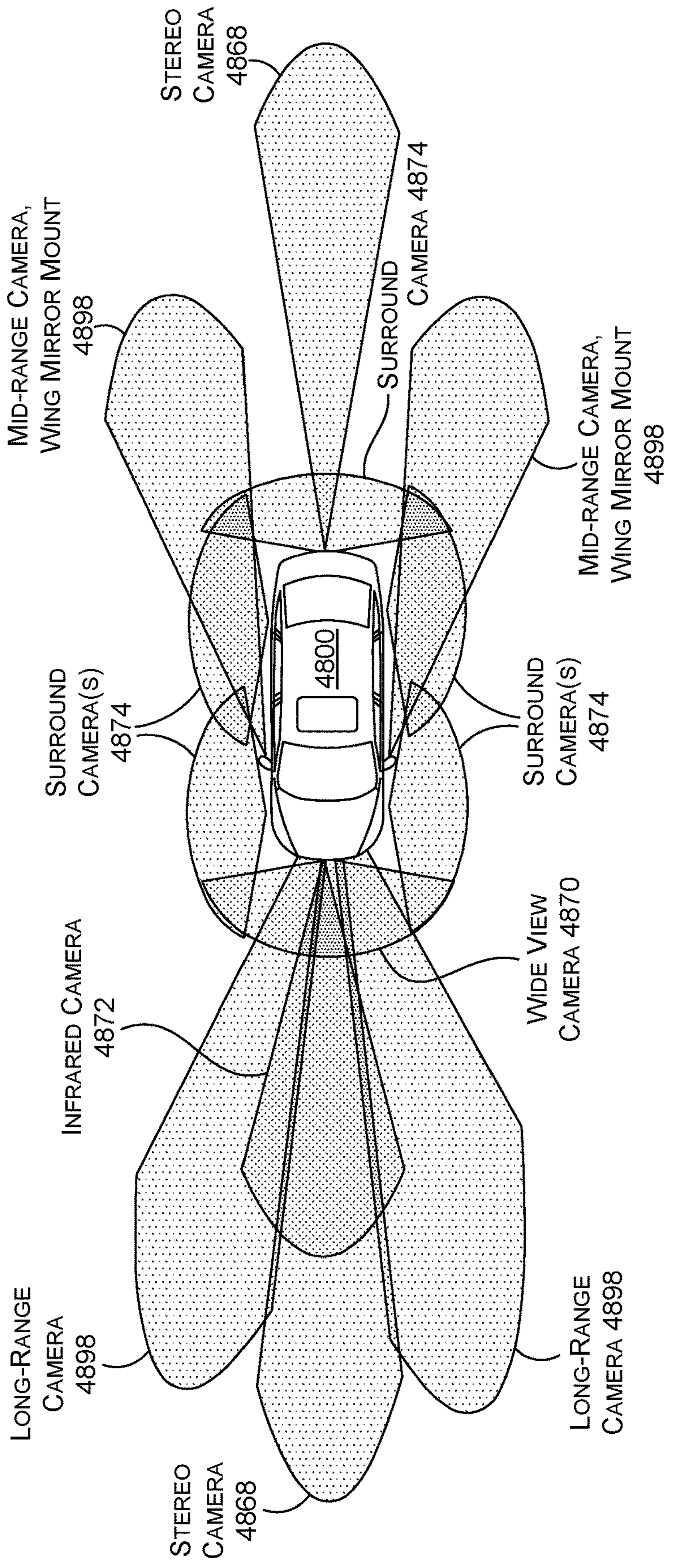
FIG. 48B is an example of camera locations and fields of view for the example autonomous vehicle of FIG. 48A, in accordance with some embodiments of the present disclosure.

FIG. 48B is an example of camera locations and fields of view for the example autonomous vehicle 4800 of FIG. 48A, in accordance with some embodiments of the present disclosure. The cameras and respective fields of view are one example embodiment and are not intended to be limiting. For example, additional and/or alternative cameras may be included and/or the cameras may be located at different locations on the vehicle 4800.

The camera types for the cameras may include, but are not limited to, digital cameras that may be adapted for use with the components and/or systems of the vehicle 4800. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 4800 (e.g., front-facing cameras) may be used for surround view, to help identify forward facing paths and obstacles, as well aid in, with the help of one or more controllers 4836 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings (LDW), Autonomous Cruise Control (ACC), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 4870 that may be used to perceive objects coming into view from the periphery (e.g., pedestrians, crossing traffic or bicycles). Although only one wide-view camera is illustrated in FIG. 48B, there may any number of wide-view cameras 4870 on the vehicle 4800. In addition, long-range camera(s) 4898 (e.g., a long-view stereo camera pair) may be used for depth-based object detection, especially for objects for which a neural network has not yet been trained. The long-range camera(s) 4898 may also be used for object detection and classification, as well as basic object tracking.

One or more stereo cameras 4868 may also be included in a front-facing configuration. The stereo camera(s) 4868 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 4868 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 4868 may be used in addition to, or alternatively from, those described herein.

Cameras with a field of view that include portions of the environment to the side of the vehicle 4800 (e.g., side-view cameras) may be used for surround view, providing information used to create and update the occupancy grid, as well as to generate side impact collision warnings. For example, surround camera(s) 4874 (e.g., four surround cameras 4874 as illustrated in FIG. 48B) may be positioned to on the vehicle 4800. The surround camera(s) 4874 may include wide-view camera(s) 4870, fisheye camera(s), 360 degree camera(s), and/or the like. Four example, four fisheye cameras may be positioned on the vehicle's front, rear, and sides. In an alternative arrangement, the vehicle may use three surround camera(s) 4874 (e.g., left, right, and rear), and may leverage one or more other camera(s) (e.g., a forward-facing camera) as a fourth surround view camera.

Cameras with a field of view that include portions of the environment to the rear of the vehicle 4800 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 4898, stereo camera(s) 4868), infrared camera(s) 4872, etc.), as described herein.

Figure 48C:
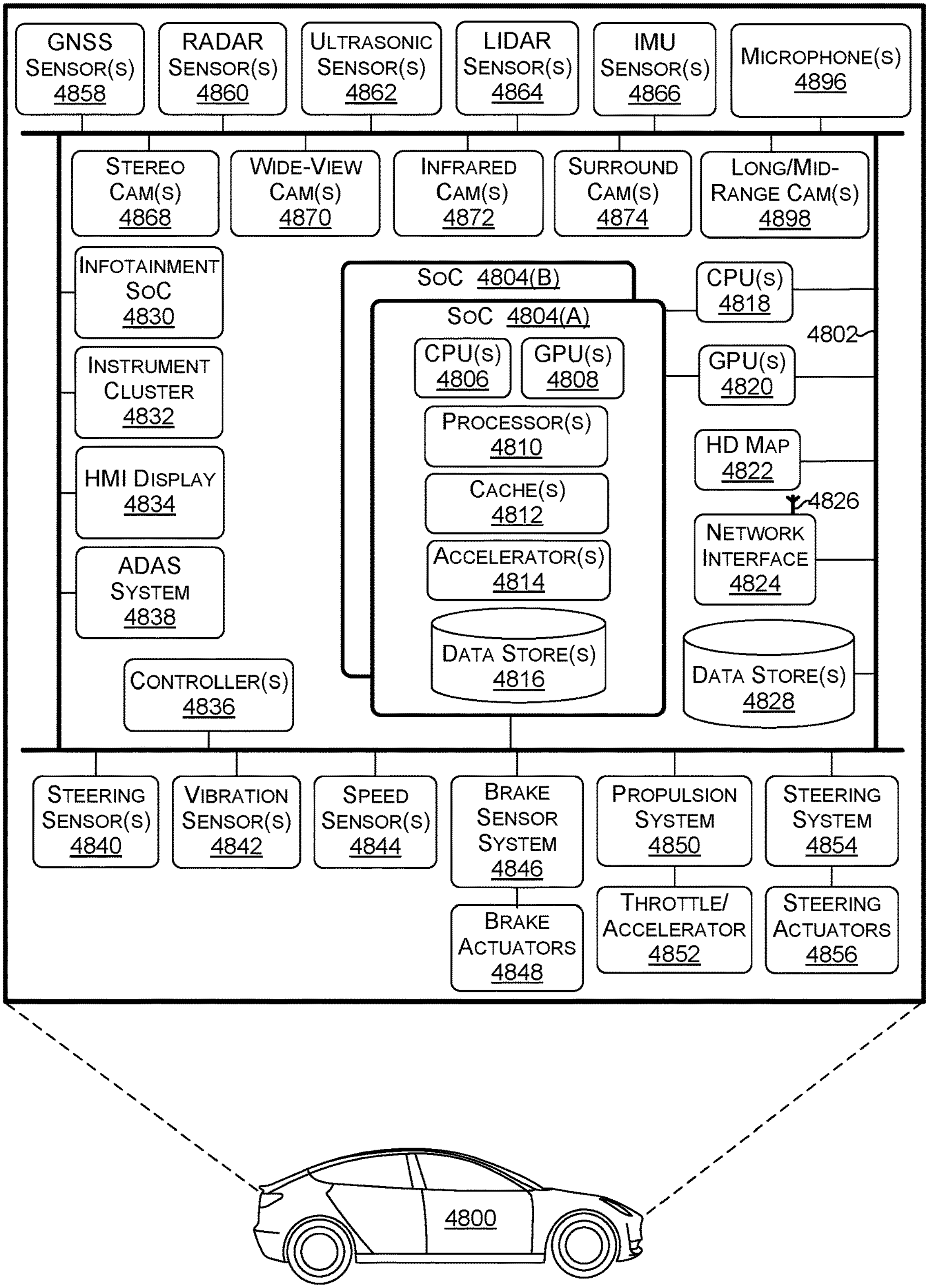
FIG. 48C is a block diagram of an example system architecture for the example autonomous vehicle of FIG. 48A, in accordance with some embodiments of the present disclosure.

FIG. 48C is a block diagram of an example system architecture for the example autonomous vehicle 4800 of FIG. 48A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 4800 in FIG. 48C are illustrated as being connected via bus 4802. The bus 4802 may include a Controller Area Network (CAN) data interface (alternatively referred to herein as a "CAN bus"). A CAN may be a network inside the vehicle 4800 used to aid in control of various features and functionality of the vehicle 4800, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 4802 is described herein as being a CAN bus, this is not intended to be limiting. For example, in addition to, or alternatively from, the CAN bus, FlexRay and/or Ethernet may be used. Additionally, although a single line is used to represent the bus 4802, this is not intended to be limiting. For example, there may be any number of busses 4802, which may include one or more CAN busses, one or more FlexRay busses, one or more Ethernet busses, and/or one or more other types of busses using a different protocol. In some examples, two or more busses 4802 may be used to perform different functions, and/or may be used for redundancy. For example, a first bus 4802 may be used for collision avoidance functionality and a second bus 4802 may be used for actuation control. In any example, each bus 4802 may communicate with any of the components of the vehicle 4800, and two or more busses 4802 may communicate with the same components. In some examples, each SoC 4804, each controller 4836, and/or each computer within the vehicle may have access to the same input data (e.g., inputs from sensors of the vehicle 4800), and may be connected to a common bus, such the CAN bus.

The vehicle 4800 may include one or more controller(s) 4836, such as those described herein with respect to FIG. 48A. The controller(s) 4836 may be used for a variety of functions. The controller(s) 4836 may be coupled to any of the various other components and systems of the vehicle 4800, and may be used for control of the vehicle 4800, artificial intelligence of the vehicle 4800, infotainment for the vehicle 4800, and/or the like.

The vehicle 4800 may include a system(s) on a chip (SoC) 4804. The SoC 4804 may include CPU(s) 4806, GPU(s) 4808, processor(s) 4810, cache(s) 4812, accelerator(s) 4814, data store(s) 4816, and/or other components and features not illustrated. The SoC(s) 4804 may be used to control the vehicle 4800 in a variety of platforms and systems. For example, the SoC(s) 4804 may be combined in a system (e.g., the system of the vehicle 4800) with an HD map 4822 which may obtain map refreshes and/or updates via a network interface 4824 from one or more servers (e.g., server(s) 4878 of FIG. 48D).

The CPU(s) 4806 may include a CPU cluster or CPU complex (alternatively referred to herein as a "CCPLEX"). The CPU(s) 4806 may include multiple cores and/or L2 caches. For example, in some embodiments, the CPU(s) 4806 may include eight cores in a coherent multi-processor configuration. In some embodiments, the CPU(s) 4806 may include four dual-core clusters where each cluster has a dedicated L2 cache (e.g., a 2 MB L2 cache). The CPU(s) 4806 (e.g., the CCPLEX) may be configured to support simultaneous cluster operation enabling any combination of the clusters of the CPU(s) 4806 to be active at any given time.

The CPU(s) 4806 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 4806 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 4808 may include an integrated GPU (alternatively referred to herein as an "iGPU"). The GPU(s) 4808 may be programmable and may be efficient for parallel workloads. The GPU(s) 4808, in some examples, may use an enhanced tensor instruction set. The GPU(s) 4808 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 4808 may include at least eight streaming microprocessors. The GPU(s) 4808 may use compute application programming interface(s) (API(s)). In addition, the GPU(s) 4808 may use one or more parallel computing platforms and/or programming models (e.g., NVIDIA's CUDA).

The GPU(s) 4808 may be power-optimized for best performance in automotive and embedded use cases. For example, the GPU(s) 4808 may be fabricated on a Fin field-effect transistor (FinFET). However, this is not intended to be limiting and the GPU(s) 4808 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 4808 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 4808 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 4808 to access the CPU(s) 4806 page tables directly. In such examples, when the GPU(s) 4808 memory management unit (MMU) experiences a miss, an address translation request may be transmitted to the CPU(s) 4806. In response, the CPU(s) 4806 may look in its page tables for the virtual-to-physical mapping for the address and transmits the translation back to the GPU(s) 4808. As such, unified memory technology may allow a single unified virtual address space for memory of both the CPU(s) 4806 and the GPU(s) 4808, thereby simplifying the GPU(s) 4808 programming and porting of applications to the GPU(s) 4808.

In addition, the GPU(s) 4808 may include an access counter that may keep track of the frequency of access of the GPU(s) 4808 to memory of other processors. The access counter may help ensure that memory pages are moved to the physical memory of the processor that is accessing the pages most frequently.

The SoC(s) 4804 may include any number of cache(s) 4812, including those described herein. For example, the cache(s) 4812 may include an L3 cache that is available to both the CPU(s) 4806 and the GPU(s) 4808 (e.g., that is connected both the CPU(s) 4806 and the GPU(s) 4808). The cache(s) 4812 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 4804 may include an arithmetic logic unit(s) (ALU(s)) which may be leveraged in performing processing with respect to any of the variety of tasks or operations of the vehicle 4800—such as processing DNNs. In addition, the SoC(s) 4804 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 4806 and/or GPU(s) 4808.

The SoC(s) 4804 may include one or more accelerators 4814 (e.g., hardware accelerators, software accelerators, or a combination thereof). For example, the SoC(s) 4804 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 4808 and to off-load some of the tasks of the GPU(s) 4808 (e.g., to free up more cycles of the GPU(s) 4808 for performing other tasks). As an example, the accelerator(s) 4814 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 4814 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 4808, and by using an inference accelerator, for example, a designer may target either the DLA(s) or the GPU(s) 4808 for any function. For example, the designer may focus processing of CNNs and floating point operations on the DLA(s) and leave other functions to the GPU(s) 4808 and/or other accelerator(s) 4814.

The accelerator(s) 4814 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 4806. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMM), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 4814 (e.g., the hardware acceleration cluster) may include a computer vision network on-chip and SRAM, for providing a high-bandwidth, low latency SRAM for the accelerator(s) 4814. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 4804 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 4814 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 4866 output that correlates with the vehicle 4800 orientation, distance, 3D location estimates of the object obtained from the neural network and/or other sensors (e.g., LIDAR sensor(s) 4864 or RADAR sensor(s) 4860), among others.

The SoC(s) 4804 may include data store(s) 4816 (e.g., memory). The data store(s) 4816 may be on-chip memory of the SoC(s) 4804, which may store neural networks to be executed on the GPU and/or the DLA. In some examples, the data store(s) 4816 may be large enough in capacity to store multiple instances of neural networks for redundancy and safety. The data store(s) 4812 may comprise L2 or L3 cache(s) 4812. Reference to the data store(s) 4816 may include reference to the memory associated with the PVA, DLA, and/or other accelerator(s) 4814, as described herein.

The SoC(s) 4804 may include one or more processor(s) 4810 (e.g., embedded processors). The processor(s) 4810 may include a boot and power management processor that may be a dedicated processor and subsystem to handle boot power and management functions and related security enforcement. The boot and power management processor may be a part of the SoC(s) 4804 boot sequence and may provide runtime power management services. The boot power and management processor may provide clock and voltage programming, assistance in system low power state transitions, management of SoC(s) 4804 thermals and temperature sensors, and/or management of the SoC(s) 4804 power states. Each temperature sensor may be implemented as a ring-oscillator whose output frequency is proportional to temperature, and the SoC(s) 4804 may use the ring-oscillators to detect temperatures of the CPU(s) 4806, GPU(s) 4808, and/or accelerator(s) 4814. If temperatures are determined to exceed a threshold, the boot and power management processor may enter a temperature fault routine and put the SoC(s) 4804 into a lower power state and/or put the vehicle 4800 into a chauffeur to safe stop mode (e.g., bring the vehicle 4800 to a safe stop).

The processor(s) 4810 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 4810 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 4810 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 4810 may further include a real-time camera engine that may include a dedicated processor subsystem for handling real-time camera management.

The processor(s) 4810 may further include a high-dynamic range signal processor that may include an image signal processor that is a hardware engine that is part of the camera processing pipeline.

The processor(s) 4810 may include a video image compositor that may be a processing block (e.g., implemented on a microprocessor) that implements video post-processing functions needed by a video playback application to produce the final image for the player window. The video image compositor may perform lens distortion correction on wide-view camera(s) 4870, surround camera(s) 4874, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 4808 is not required to continuously render new surfaces. Even when the GPU(s) 4808 is powered on and active doing 3D rendering, the video image compositor may be used to offload the GPU(s) 4808 to improve performance and responsiveness.

The SoC(s) 4804 may further include a mobile industry processor interface (MIPI) camera serial interface for receiving video and input from cameras, a high-speed interface, and/or a video input block that may be used for camera and related pixel input functions. The SoC(s) 4804 may further include an input/output controller(s) that may be controlled by software and may be used for receiving I/O signals that are uncommitted to a specific role.

The SoC(s) 4804 may further include a broad range of peripheral interfaces to enable communication with peripherals, audio codecs, power management, and/or other devices. The SoC(s) 4804 may be used to process data from cameras (e.g., connected over Gigabit Multimedia Serial Link and Ethernet), sensors (e.g., LIDAR sensor(s) 4864, RADAR sensor(s) 4860, etc. that may be connected over Ethernet), data from bus 4802 (e.g., speed of vehicle 4800, steering wheel position, etc.), data from GNSS sensor(s) 4858 (e.g., connected over Ethernet or CAN bus). The SoC(s) 4804 may further include dedicated high-performance mass storage controllers that may include their own DMA engines, and that may be used to free the CPU(s) 4806 from routine data management tasks.

The SoC(s) 4804 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 4804 may be faster, more reliable, and even more energy-efficient and space-efficient than conventional systems. For example, the accelerator(s) 4814, when combined with the CPU(s) 4806, the GPU(s) 4808, and the data store(s) 4816, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 4820) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 4808.

In some examples, a CNN for facial recognition and vehicle owner identification may use data from camera sensors to identify the presence of an authorized driver and/or owner of the vehicle 4800. The always on sensor processing engine may be used to unlock the vehicle when the owner approaches the driver door and turn on the lights, and, in security mode, to disable the vehicle when the owner leaves the vehicle. In this way, the SoC(s) 4804 provide for security against theft and/or carjacking.

In another example, a CNN for emergency vehicle detection and identification may use data from microphones 4896 to detect and identify emergency vehicle sirens. In contrast to conventional systems, that use general classifiers to detect sirens and manually extract features, the SoC(s) 4804 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 4858. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 4862, until the emergency vehicle(s) passes.

The vehicle may include a CPU(s) 4818 (e.g., discrete CPU(s), or dCPU(s)), that may be coupled to the SoC(s) 4804 via a high-speed interconnect (e.g., PCIe). The CPU(s) 4818 may include an X86 processor, for example. The CPU(s) 4818 may be used to perform any of a variety of functions, including arbitrating potentially inconsistent results between ADAS sensors and the SoC(s) 4804, and/or monitoring the status and health of the controller(s) 4836 and/or infotainment SoC 4830, for example.

The vehicle 4800 may include a GPU(s) 4820 (e.g., discrete GPU(s), or dGPU(s)), that may be coupled to the SoC(s) 4804 via a high-speed interconnect (e.g., NVIDIA's NVLINK). The GPU(s) 4820 may provide additional artificial intelligence functionality, such as by executing redundant and/or different neural networks, and may be used to train and/or update neural networks based on input (e.g., sensor data) from sensors of the vehicle 4800.

The vehicle 4800 may further include the network interface 4824 which may include one or more wireless antennas 4826 (e.g., one or more wireless antennas for different communication protocols, such as a cellular antenna, a Bluetooth antenna, etc.). The network interface 4824 may be used to enable wireless connectivity over the Internet with the cloud (e.g., with the server(s) 4878 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 4800 information about vehicles in proximity to the vehicle 4800 (e.g., vehicles in front of, on the side of, and/or behind the vehicle 4800). This functionality may be part of a cooperative adaptive cruise control functionality of the vehicle 4800.

The network interface 4824 may include a SoC that provides modulation and demodulation functionality and enables the controller(s) 4836 to communicate over wireless networks. The network interface 4824 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 4800 may further include data store(s) 4828 which may include off-chip (e.g., off the SoC(s) 4804) storage. The data store(s) 4828 may include one or more storage elements including RAM, SRAM, DRAM, VRAM, Flash, hard disks, and/or other components and/or devices that may store at least one bit of data.

The vehicle 4800 may further include GNSS sensor(s) 4858. The GNSS sensor(s) 4858 (e.g., GPS, assisted GPS sensors, differential GPS (DGPS) sensors, etc.), to assist in mapping, perception, occupancy grid generation, and/or path planning functions. Any number of GNSS sensor(s) 4858 may be used, including, for example and without limitation, a GPS using a USB connector with an Ethernet to Serial (RS-232) bridge.

The vehicle 4800 may further include RADAR sensor(s) 4860. The RADAR sensor(s) 4860 may be used by the vehicle 4800 for long-range vehicle detection, even in darkness and/or severe weather conditions. RADAR functional safety levels may be ASIL B. The RADAR sensor(s) 4860 may use the CAN and/or the bus 4802 (e.g., to transmit data generated by the RADAR sensor(s) 4860) for control and to access object tracking data, with access to Ethernet to access raw data in some examples. A wide variety of RADAR sensor types may be used. For example, and without limitation, the RADAR sensor(s) 4860 may be suitable for front, rear, and side RADAR use. In some example, Pulse Doppler RADAR sensor(s) are used.

The RADAR sensor(s) 4860 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 4860 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 4800 surroundings at higher speeds with minimal interference from traffic in adjacent lanes. The other two antennae may expand the field of view, making it possible to quickly detect vehicles entering or leaving the vehicle's 4800 lane.

Mid-range RADAR systems may include, as an example, a range of up to 4660 m (front) or 80 m (rear), and a field of view of up to 42 degrees (front) or 4850 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 4800 may further include ultrasonic sensor(s) 4862. The ultrasonic sensor(s) 4862, which may be positioned at the front, back, and/or the sides of the vehicle 4800, may be used for park assist and/or to create and update an occupancy grid. A wide variety of ultrasonic sensor(s) 4862 may be used, and different ultrasonic sensor(s) 4862 may be used for different ranges of detection (e.g., 2.5 m, 4 m). The ultrasonic sensor(s) 4862 may operate at functional safety levels of ASIL B.

The vehicle 4800 may include LIDAR sensor(s) 4864. The LIDAR sensor(s) 4864 may be used for object and pedestrian detection, emergency braking, collision avoidance, and/or other functions. The LIDAR sensor(s) 4864 may be functional safety level ASIL B. In some examples, the vehicle 4800 may include multiple LIDAR sensors 4864 (e.g., two, four, six, etc.) that may use Ethernet (e.g., to provide data to a Gigabit Ethernet switch).

In some examples, the LIDAR sensor(s) 4864 may be capable of providing a list of objects and their distances for a 360-degree field of view. Commercially available LIDAR sensor(s) 4864 may have an advertised range of approximately 4800 m, with an accuracy of 2 cm-3 cm, and with support for a 4600 Mbps Ethernet connection, for example. In some examples, one or more non-protruding LIDAR sensors 4864 may be used. In such examples, the LIDAR sensor(s) 4864 may be implemented as a small device that may be embedded into the front, rear, sides, and/or corners of the vehicle 4800. The LIDAR sensor(s) 4864, in such examples, may provide up to a 120-degree horizontal and 35-degree vertical field-of-view, with a 200 m range even for low-reflectivity objects. Front-mounted LIDAR sensor(s) 4864 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 4800. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 4864 may be less susceptible to motion blur, vibration, and/or shock.

The vehicle may further include IMU sensor(s) 4866. The IMU sensor(s) 4866 may be located at a center of the rear axle of the vehicle 4800, in some examples. The IMU sensor(s) 4866 may include, for example and without limitation, an accelerometer(s), a magnetometer(s), a gyroscope(s), a magnetic compass(es), and/or other sensor types. In some examples, such as in six-axis applications, the IMU sensor(s) 4866 may include accelerometers and gyroscopes, while in nine-axis applications, the IMU sensor(s) 4866 may include accelerometers, gyroscopes, and magnetometers.

In some embodiments, the IMU sensor(s) 4866 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 4866 may enable the vehicle 4800 to estimate heading without requiring input from a magnetic sensor by directly observing and correlating the changes in velocity from GPS to the IMU sensor(s) 4866. In some examples, the IMU sensor(s) 4866 and the GNSS sensor(s) 4858 may be combined in a single integrated unit.

The vehicle may include microphone(s) 4896 placed in and/or around the vehicle 4800. The microphone(s) 4896 may be used for emergency vehicle detection and identification, among other things.

The vehicle may further include any number of camera types, including stereo camera(s) 4868, wide-view camera(s) 4870, infrared camera(s) 4872, surround camera(s) 4874, long-range and/or mid-range camera(s) 4898, and/or other camera types. The cameras may be used to capture image data around an entire periphery of the vehicle 4800. The types of cameras used depends on the embodiments and requirements for the vehicle 4800, and any combination of camera types may be used to provide the necessary coverage around the vehicle 4800. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 48A and FIG. 48B.

The vehicle 4800 may further include vibration sensor(s) 4842. The vibration sensor(s) 4842 may measure vibrations of components of the vehicle, such as the axle(s). For example, changes in vibrations may indicate a change in road surfaces. In another example, when two or more vibration sensors 4842 are used, the differences between the vibrations may be used to determine friction or slippage of the road surface (e.g., when the difference in vibration is between a power-driven axle and a freely rotating axle).

The vehicle 4800 may include an ADAS system 4838. The ADAS system 4838 may include a SoC, in some examples. The ADAS system 4838 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 4860, LIDAR sensor(s) 4864, and/or a camera(s). The ACC systems may include longitudinal ACC and/or lateral ACC. Longitudinal ACC monitors and controls the distance to the vehicle immediately ahead of the vehicle 4800 and automatically adjust the vehicle speed to maintain a safe distance from vehicles ahead. Lateral ACC performs distance keeping, and advises the vehicle 4800 to change lanes when necessary. Lateral ACC is related to other ADAS applications such as LCA and CWS.

CACC uses information from other vehicles that may be received via the network interface 4824 and/or the wireless antenna(s) 4826 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 4800), while the I2V communication concept provides information about traffic further ahead. CACC systems may include either or both I2V and V2V information sources. Given the information of the vehicles ahead of the vehicle 4800, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 4860, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 4860, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 4800 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 4800 if the vehicle 4800 starts to exit the lane. BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 4860, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 4800 is backing up. Some RCTW systems include AEB to ensure that the vehicle brakes are applied to avoid a crash. RCTW systems may use one or more rear-facing RADAR sensor(s) 4860, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 4800, the vehicle 4800 itself must, in the case of conflicting results, decide whether to heed the result from a primary computer or a secondary computer (e.g., a first controller 4836 or a second controller 4836). For example, in some embodiments, the ADAS system 4838 may be a backup and/or secondary computer for providing perception information to a backup computer rationality module. The backup computer rationality monitor may run a redundant diverse software on hardware components to detect faults in perception and dynamic driving tasks. Outputs from the ADAS system 4838 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 4804.

In other examples, ADAS system 4838 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 4838 may be fed into the primary computer's perception block and/or the primary computer's dynamic driving task block. For example, if the ADAS system 4838 indicates a forward crash warning due to an object immediately ahead, the perception block may use this information when identifying objects. In other examples, the secondary computer may have its own neural network which is trained and thus reduces the risk of false positives, as described herein.

The vehicle 4800 may further include the infotainment SoC 4830 (e.g., an in-vehicle infotainment system (IVI)). Although illustrated and described as a SoC, the infotainment system may not be a SoC, and may include two or more discrete components. The infotainment SoC 4830 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 4800. For example, the infotainment SoC 4830 may radios, disk players, navigation systems, video players, USB and Bluetooth connectivity, carputers, in-car entertainment, Wi-Fi, steering wheel audio controls, hands free voice control, a heads-up display (HUD), an HMI display 4834, a telematics device, a control panel (e.g., for controlling and/or interacting with various components, features, and/or systems), and/or other components. The infotainment SoC 4830 may further be used to provide information (e.g., visual and/or audible) to a user(s) of the vehicle, such as information from the ADAS system 4838, autonomous driving information such as planned vehicle maneuvers, trajectories, surrounding environment information (e.g., intersection information, vehicle information, road information, etc.), and/or other information.

The infotainment SoC 4830 may include GPU functionality. The infotainment SoC 4830 may communicate over the bus 4802 (e.g., CAN bus, Ethernet, etc.) with other devices, systems, and/or components of the vehicle 4800. In some examples, the infotainment SoC 4830 may be coupled to a supervisory MCU such that the GPU of the infotainment system may perform some self-driving functions in the event that the primary controller(s) 4836 (e.g., the primary and/or backup computers of the vehicle 4800) fail. In such an example, the infotainment SoC 4830 may put the vehicle 4800 into a chauffeur to safe stop mode, as described herein.

The vehicle 4800 may further include an instrument cluster 4832 (e.g., a digital dash, an electronic instrument cluster, a digital instrument panel, etc.). The instrument cluster 4832 may include a controller and/or supercomputer (e.g., a discrete controller or supercomputer). The instrument cluster 4832 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 4830 and the instrument cluster 4832. In other words, the instrument cluster 4832 may be included as part of the infotainment SoC 4830, or vice versa.

Figure 48D:
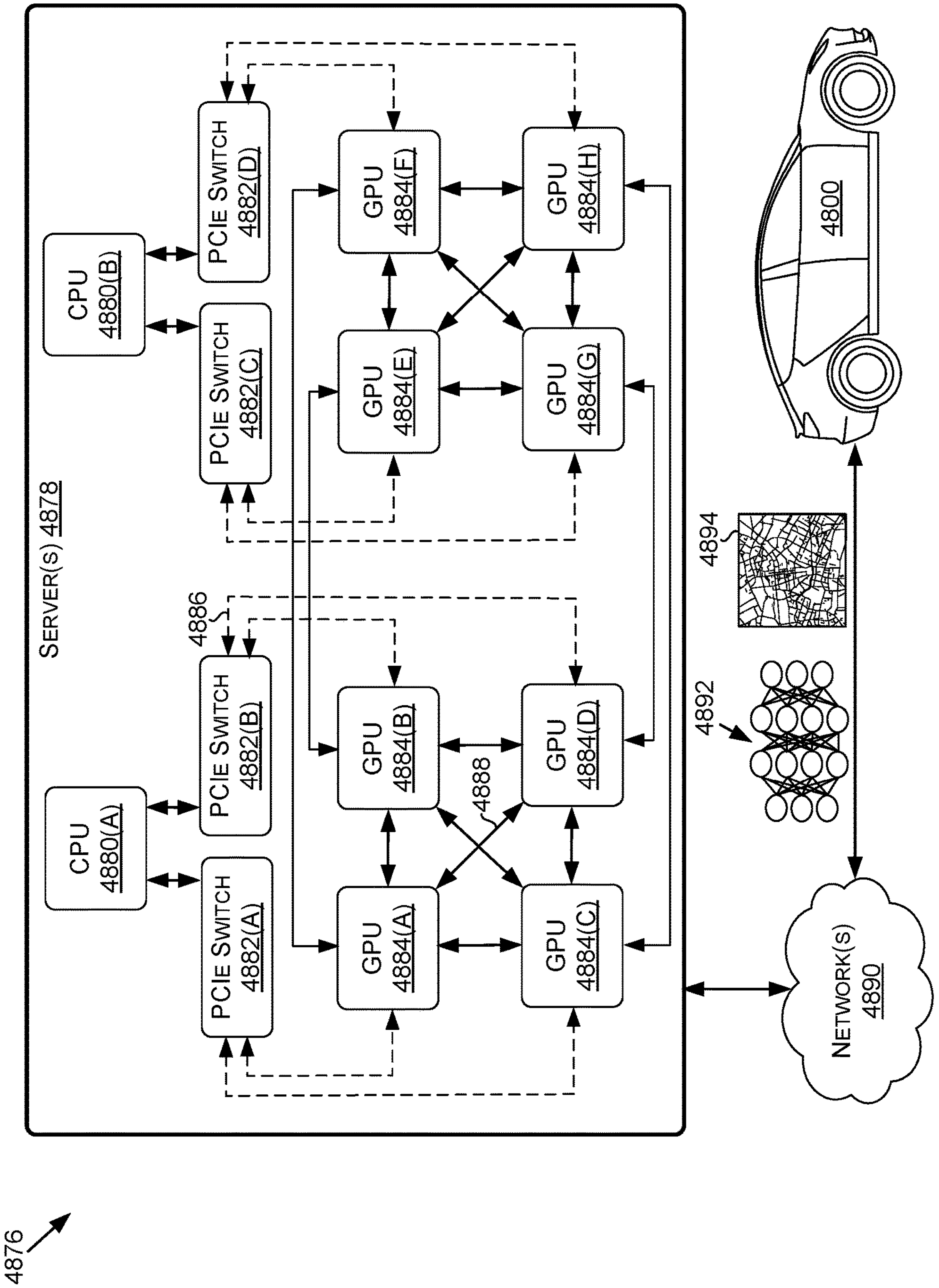
FIG. 48D is a system diagram for communication between cloud-based server(s) and the example autonomous vehicle of FIG. 48A, in accordance with some embodiments of the present disclosure.

FIG. 48D is a system diagram for communication between cloud-based server(s) and the example autonomous vehicle 4800 of FIG. 48A, in accordance with some embodiments of the present disclosure. The system 4876 may include server(s) 4878, network(s) 4890, and vehicles, including the vehicle 4800. The server(s) 4878 may include a plurality of GPUs 4884(A)-4884(H) (collectively referred to herein as GPUs 4884), PCIe switches 4882(A)-4882(H) (collectively referred to herein as PCIe switches 4882), and/or CPUs 4880(A)-4880(B) (collectively referred to herein as CPUs 4880). The GPUs 4884, the CPUs 4880, and the PCIe switches may be interconnected with high-speed interconnects such as, for example and without limitation, NVLink interfaces 4888 developed by NVIDIA and/or PCIe connections 4886. In some examples, the GPUs 4884 are connected via NVLink and/or NVSwitch SoC and the GPUs 4884 and the PCIe switches 4882 are connected via PCIe interconnects. Although eight GPUs 4884, two CPUs 4880, and two PCIe switches are illustrated, this is not intended to be limiting. Depending on the embodiment, each of the server(s) 4878 may include any number of GPUs 4884, CPUs 4880, and/or PCIe switches. For example, the server(s) 4878 may each include eight, sixteen, thirty-two, and/or more GPUs 4884.

The server(s) 4878 may receive, over the network(s) 4890 and from the vehicles, image data representative of images showing unexpected or changed road conditions, such as recently commenced road-work. The server(s) 4878 may transmit, over the network(s) 4890 and to the vehicles, neural networks 4892, updated neural networks 4892, and/or map information 4894, including information regarding traffic and road conditions. The updates to the map information 4894 may include updates for the HD map 4822, such as information regarding construction sites, potholes, detours, flooding, and/or other obstructions. In some examples, the neural networks 4892, the updated neural networks 4892, and/or the map information 4894 may have resulted from new training and/or experiences represented in data received from any number of vehicles in the environment, and/or based on training performed at a datacenter (e.g., using the server(s) 4878 and/or other servers).

The server(s) 4878 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 4890, and/or the machine learning models may be used by the server(s) 4878 to remotely monitor the vehicles.

In some examples, the server(s) 4878 may receive data from the vehicles and apply the data to up-to-date real-time neural networks for real-time intelligent inferencing. The server(s) 4878 may include deep-learning supercomputers and/or dedicated AI computers powered by GPU(s) 4884, such as a DGX and DGX Station machines developed by NVIDIA. However, in some examples, the server(s) 4878 may include deep learning infrastructure that use only CPU-powered datacenters.

The deep-learning infrastructure of the server(s) 4878 may be capable of fast, real-time inferencing, and may use that capability to evaluate and verify the health of the processors, software, and/or associated hardware in the vehicle 4800. For example, the deep-learning infrastructure may receive periodic updates from the vehicle 4800, such as a sequence of images and/or objects that the vehicle 4800 has located in that sequence of images (e.g., via computer vision and/or other machine learning object classification techniques). The deep-learning infrastructure may run its own neural network to identify the objects and compare them with the objects identified by the vehicle 4800 and, if the results do not match and the infrastructure concludes that the AI in the vehicle 4800 is malfunctioning, the server(s) 4878 may transmit a signal to the vehicle 4800 instructing a fail-safe computer of the vehicle 4800 to assume control, notify the passengers, and complete a safe parking maneuver.

For inferencing, the server(s) 4878 may include the GPU(s) 4884 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 49:
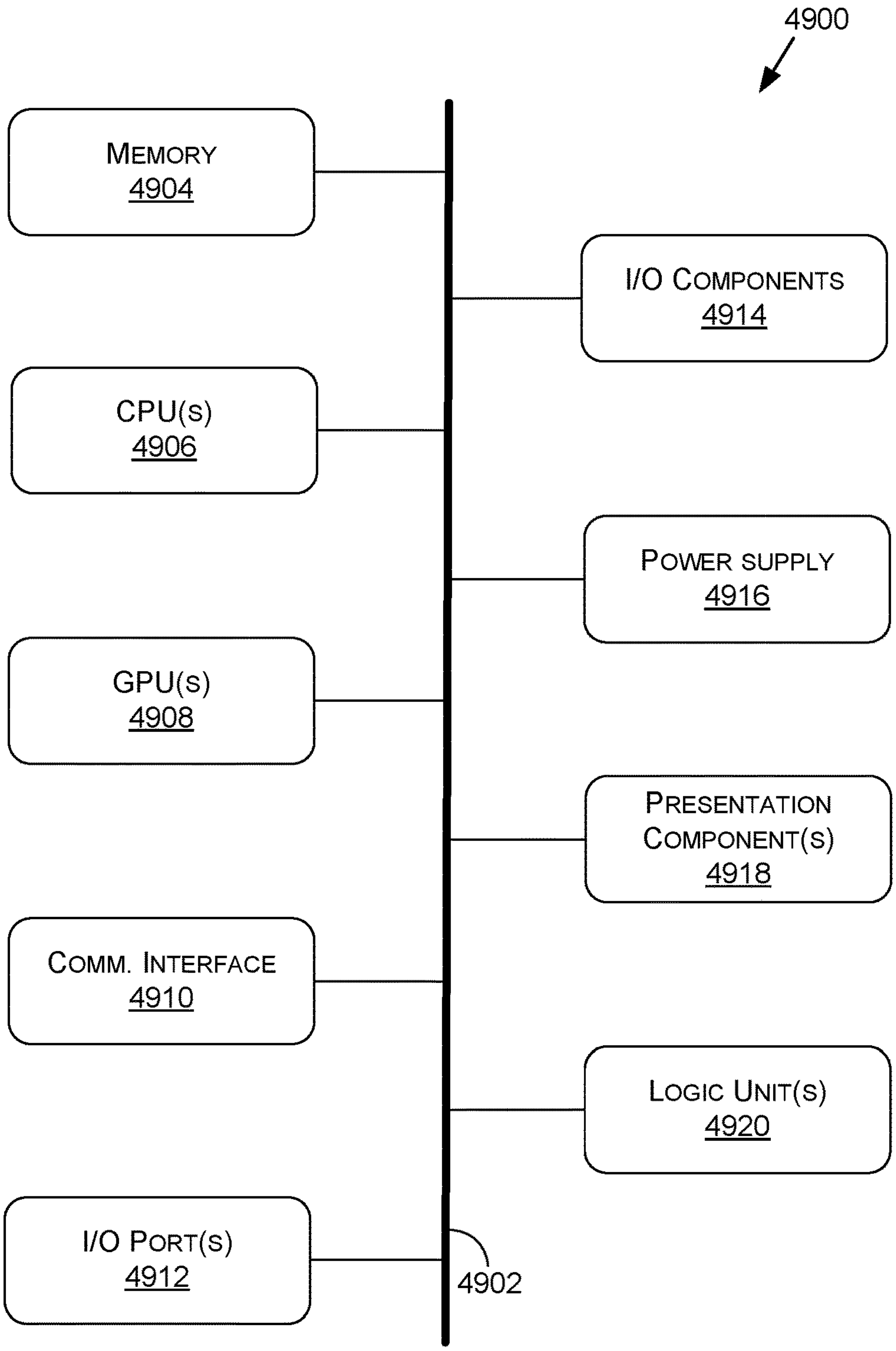
FIG. 49 is a block diagram of an example computing device suitable for use in implementing some embodiments of the present disclosure.

FIG. 49 is a block diagram of an example computing device(s) 4900 suitable for use in implementing some embodiments of the present disclosure. Computing device 4900 may include an interconnect system 4902 that directly or indirectly couples the following devices: memory 4904, one or more central processing units (CPUs) 4906, one or more graphics processing units (GPUs) 4908, a communication interface 4910, input/output (I/O) ports 4912, input/output components 4914, a power supply 4916, one or more presentation components 4918 (e.g., display(s)), and one or more logic units 4920. In at least one embodiment, the computing device(s) 4900 may comprise one or more virtual machines (VMs), and/or any of the components thereof may comprise virtual components (e.g., virtual hardware components). For non-limiting examples, one or more of the GPUs 4908 may comprise one or more vGPUs, one or more of the CPUs 4906 may comprise one or more vCPUs, and/or one or more of the logic units 4920 may comprise one or more virtual logic units. As such, a computing device(s) 4900 may include discrete components (e.g., a full GPU dedicated to the computing device 4900), virtual components (e.g., a portion of a GPU dedicated to the computing device 4900), or a combination thereof.

Although the various blocks of FIG. 49 are shown as connected via the interconnect system 4902 with lines, this is not intended to be limiting and is for clarity only. For example, in some embodiments, a presentation component 4918, such as a display device, may be considered an I/O component 4914 (e.g., if the display is a touch screen). As another example, the CPUs 4906 and/or GPUs 4908 may include memory (e.g., the memory 4904 may be representative of a storage device in addition to the memory of the GPUs 4908, the CPUs 4906, and/or other components). In other words, the computing device of FIG. 49 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 49.

The interconnect system 4902 may represent one or more links or busses, such as an address bus, a data bus, a control bus, or a combination thereof. The interconnect system 4902 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 4906 may be directly connected to the memory 4904. Further, the CPU 4906 may be directly connected to the GPU 4908. Where there is direct, or point-to-point connection between components, the interconnect system 4902 may include a PCIe link to carry out the connection. In these examples, a PCI bus need not be included in the computing device 4900.

The memory 4904 may include any of a variety of computer-readable media. The computer-readable media may be any available media that may be accessed by the computing device 4900. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 4904 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 4900. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 4906 may be configured to execute at least some of the computer-readable instructions to control one or more components of the computing device 4900 to perform one or more of the methods and/or processes described herein. The CPU(s) 4906 may each include one or more cores (e.g., one, two, four, eight, twenty-eight, seventy-two, etc.) that are capable of handling a multitude of software threads simultaneously. The CPU(s) 4906 may include any type of processor, and may include different types of processors depending on the type of computing device 4900 implemented (e.g., processors with fewer cores for mobile devices and processors with more cores for servers). For example, depending on the type of computing device 4900, the processor may be an Advanced RISC Machines (ARM) processor implemented using Reduced Instruction Set Computing (RISC) or an x86 processor implemented using Complex Instruction Set Computing (CISC). The computing device 4900 may include one or more CPUs 4906 in addition to one or more microprocessors or supplementary co-processors, such as math co-processors.

In addition to or alternatively from the CPU(s) 4906, the GPU(s) 4908 may be configured to execute at least some of the computer-readable instructions to control one or more components of the computing device 4900 to perform one or more of the methods and/or processes described herein. One or more of the GPU(s) 4908 may be an integrated GPU (e.g., with one or more of the CPU(s) 4906 and/or one or more of the GPU(s) 4908 may be a discrete GPU. In embodiments, one or more of the GPU(s) 4908 may be a coprocessor of one or more of the CPU(s) 4906. The GPU(s) 4908 may be used by the computing device 4900 to render graphics (e.g., 3D graphics) or perform general purpose computations. For example, the GPU(s) 4908 may be used for General-Purpose computing on GPUs (GPGPU). The GPU(s) 4908 may include hundreds or thousands of cores that are capable of handling hundreds or thousands of software threads simultaneously. The GPU(s) 4908 may generate pixel data for output images in response to rendering commands (e.g., rendering commands from the CPU(s) 4906 received via a host interface). The GPU(s) 4908 may include graphics memory, such as display memory, for storing pixel data or any other suitable data, such as GPGPU data. The display memory may be included as part of the memory 4904. The GPU(s) 4908 may include two or more GPUs operating in parallel (e.g., via a link). The link may directly connect the GPUs (e.g., using NVLINK) or may connect the GPUs through a switch (e.g., using NVSwitch). When combined together, each GPU 4908 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 4906 and/or the GPU(s) 4908, the logic unit(s) 4920 may be configured to execute at least some of the computer-readable instructions to control one or more components of the computing device 4900 to perform one or more of the methods and/or processes described herein. In embodiments, the CPU(s) 4906, the GPU(s) 4908, and/or the logic unit(s) 4920 may discretely or jointly perform any combination of the methods, processes and/or portions thereof. One or more of the logic units 4920 may be part of and/or integrated in one or more of the CPU(s) 4906 and/or the GPU(s) 4908 and/or one or more of the logic units 4920 may be discrete components or otherwise external to the CPU(s) 4906 and/or the GPU(s) 4908. In embodiments, one or more of the logic units 4920 may be a coprocessor of one or more of the CPU(s) 4906 and/or one or more of the GPU(s) 4908.

Examples of the logic unit(s) 4920 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 4910 may include one or more receivers, transmitters, and/or transceivers that enable the computing device 4900 to communicate with other computing devices via an electronic communication network, included wired and/or wireless communications. The communication interface 4910 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 4920 and/or communication interface 4910 may include one or more data processing units (DPUs) to transmit data received over a network and/or through interconnect system 4902 directly to (e.g., a memory of) one or more GPU(s) 4908.

The I/O ports 4912 may enable the computing device 4900 to be logically coupled to other devices including the I/O components 4914, the presentation component(s) 4918, and/or other components, some of which may be built in to (e.g., integrated in) the computing device 4900. Illustrative I/O components 4914 include a microphone, mouse, keyboard, joystick, game pad, game controller, satellite dish, scanner, printer, wireless device, etc. The I/O components 4914 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 4900. The computing device 4900 may be include depth cameras, such as stereoscopic camera systems, infrared camera systems, RGB camera systems, touchscreen technology, and combinations of these, for gesture detection and recognition. Additionally, the computing device 4900 may include accelerometers or gyroscopes (e.g., as part of an inertia measurement unit (IMU)) that enable detection of motion. In some examples, the output of the accelerometers or gyroscopes may be used by the computing device 4900 to render immersive augmented reality or virtual reality.

The power supply 4916 may include a hard-wired power supply, a battery power supply, or a combination thereof. The power supply 4916 may provide power to the computing device 4900 to enable the components of the computing device 4900 to operate.

The presentation component(s) 4918 may include a display (e.g., a monitor, a touch screen, a television screen, a heads-up-display (HUD), other display types, or a combination thereof), speakers, and/or other presentation components. The presentation component(s) 4918 may receive data from other components (e.g., the GPU(s) 4908, the CPU(s) 4906, DPUs, etc.), and output the data (e.g., as an image, video, sound, etc.).

Example Data Center

Figure 50:
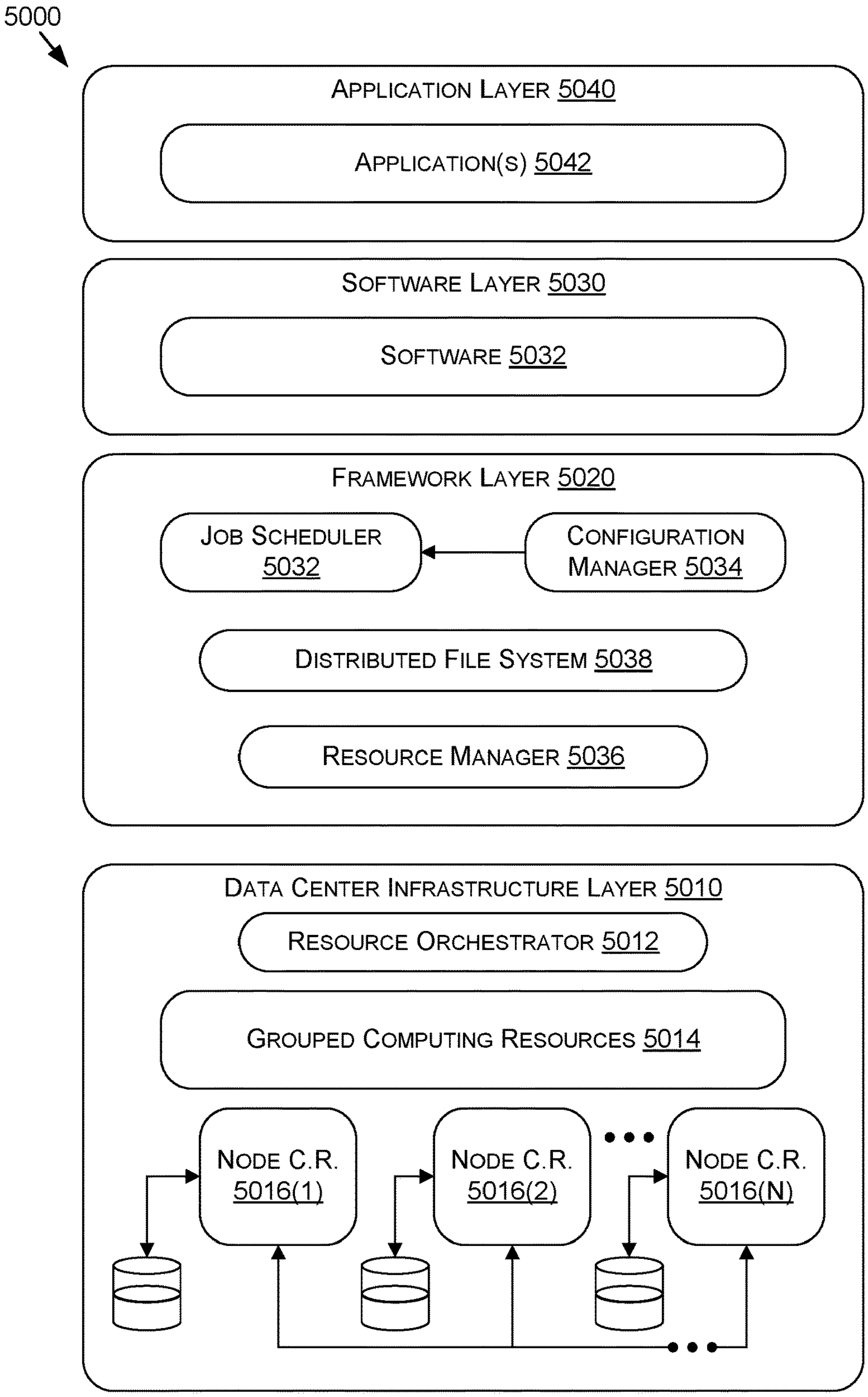
FIG. 50 is a block diagram of an example data center suitable for use in implementing some embodiments of the present disclosure.

FIG. 50 illustrates an example data center 5000 that may be used in at least one embodiments of the present disclosure. The data center 5000 may include a data center infrastructure layer 5010, a framework layer 5020, a software layer 5030, and/or an application layer 5040.

As shown in FIG. 50, the data center infrastructure layer 5010 may include a resource orchestrator 5012, grouped computing resources 5014, and node computing resources ("node C.R.s") 5016(1)-5016(N), where "N" represents any whole, positive integer. In at least one embodiment, node C.R.s 5016(1)-5016(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 5016(1)-5016(N) may correspond to a server having one or more of the above-mentioned computing resources. In addition, in some embodiments, the node C.R.s 5016(1)-50161 (N) may include one or more virtual components, such as vGPUs, vCPUs, and/or the like, and/or one or more of the node C.R.s 5016(1)-5016(N) may correspond to a virtual machine (VM).

In at least one embodiment, grouped computing resources 5014 may include separate groupings of node C.R.s 5016 housed within one or more racks (not shown), or many racks housed in data centers at various geographical locations (also not shown). Separate groupings of node C.R.s 5016 within grouped computing resources 5014 may include grouped compute, network, memory or storage resources that may be configured or allocated to support one or more workloads. In at least one embodiment, several node C.R.s 5016 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 5012 may configure or otherwise control one or more node C.R.s 5016(1)-5016(N) and/or grouped computing resources 5014. In at least one embodiment, resource orchestrator 5012 may include a software design infrastructure (SDI) management entity for the data center 5000. The resource orchestrator 5012 may include hardware, software, or some combination thereof.

In at least one embodiment, as shown in FIG. 50, framework layer 5020 may include a job scheduler 5033, a configuration manager 5034, a resource manager 5036, and/or a distributed file system 5038. The framework layer 5020 may include a framework to support software 5032 of software layer 5030 and/or one or more application(s) 5042 of application layer 5040. The software 5032 or application(s) 5042 may respectively include web-based service software or applications, such as those provided by Amazon Web Services, Google Cloud and Microsoft Azure. The framework layer 5020 may be, but is not limited to, a type of free and open-source software web application framework such as Apache Spark™ (hereinafter "Spark") that may utilize distributed file system 5038 for large-scale data processing (e.g., "big data"). In at least one embodiment, job scheduler 5033 may include a Spark driver to facilitate scheduling of workloads supported by various layers of data center 5000. The configuration manager 5034 may be capable of configuring different layers such as software layer 5030 and framework layer 5020 including Spark and distributed file system 5038 for supporting large-scale data processing. The resource manager 5036 may be capable of managing clustered or grouped computing resources mapped to or allocated for support of distributed file system 5038 and job scheduler 5033. In at least one embodiment, clustered or grouped computing resources may include grouped computing resource 5014 at data center infrastructure layer 5010. The resource manager 5036 may coordinate with resource orchestrator 5012 to manage these mapped or allocated computing resources.

In at least one embodiment, software 5032 included in software layer 5030 may include software used by at least portions of node C.R.s 5016(1)-5016(N), grouped computing resources 5014, and/or distributed file system 5038 of framework layer 5020. One or more types of software may include, but are not limited to, Internet web page search software, e-mail virus scan software, database software, and streaming video content software.

In at least one embodiment, application(s) 5042 included in application layer 5040 may include one or more types of applications used by at least portions of node C.R.s 5016 (1)-5016(N), grouped computing resources 5014, and/or distributed file system 5038 of framework layer 5020. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 5034, resource manager 5036, and resource orchestrator 5012 may implement any number and type of self-modifying actions based on any amount and type of data acquired in any technically feasible fashion. Self-modifying actions may relieve a data center operator of data center 5000 from making possibly bad configuration decisions and possibly avoiding underutilized and/or poor performing portions of a data center.

The data center 5000 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 5000. In at least one embodiment, trained or deployed machine learning models corresponding to one or more neural networks may be used to infer or predict information using resources described above with respect to the data center 5000 by using weight parameters calculated through one or more training techniques, such as but not limited to those described herein.

In at least one embodiment, the data center 5000 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 4900 of FIG. 49—e.g., each device may include similar components, features, and/or functionality of the computing device(s) 4900. In addition, where backend devices (e.g., servers, NAS, etc.) are implemented, the backend devices may be included as part of a data center 5000, an example of which is described in more detail herein with respect to FIG. 50.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 4900 described herein with respect to FIG. 49. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. At least one processor comprising:

one or more circuits to:

access, based at least on a current location of an ego-machine, first localization data from a first road segment of road segments representing respective map regions aligned to one or more roads of a high definition (HD) map, the HD map including a graph having nodes representing the road segments, wherein the first road segment stores the first localization data corresponding to a first region of the respective map regions and a second road segment of the road segments stores second localization data corresponding to a second region of the respective map regions;

perform one or more localization operations using the first localization data from the first road segment to determine first localization results of the first road segment, the first localization results including a location of the ego-machine within a first local coordinate system of the first road segment;

identify an edge in the graph based at least on the edge representing a road-level connection between the first road segment and the second road segment;

identify, using the edge, a spatial transformation between the first local coordinate system of the first road segment and a second local coordinate system of the second road segment;

translate, when the ego-machine traverses into the second road segment from the first road segment and using the spatial transformation, the first localization results from the first local coordinate system to second localization results of the second road segment in the second local coordinate system, the second localization results including a translated location of the ego-machine; and perform one or more of autonomously controlling at least one of steering or speed of the ego-machine using the second localization data and the translated location in the second local coordinate system.

2. The at least one processor of claim 1, wherein the one or more circuits are further to:

determine, based at least on the current location, a tile from a tile listing, the tile corresponding to the current location of the ego-machine and including the first road segment and the second road segment.

3. The at least one processor of claim 1, wherein the first road segment includes a first layer of a first sensor modality localization layer type and a second layer of a second sensor modality localization layer type, and the second road segment includes a third layer of the first sensor modality localization layer type and a fourth layer of the second sensor modality localization layer type.

4. The at least one processor of claim 3, wherein the first sensor modality localization layer type comprises camera data and the second sensor modality localization layer type comprises LiDAR data.

5. The at least one processor of claim 1, wherein the first localization data encodes poles representing environmental objects as respective three-dimensional straight lines in the first local coordinate system, and the one or more localization operations include determining the translated location of the ego-machine using the respective three-dimensional straight lines.

6. The at least one processor of claim 1, wherein the spatial transformation comprises a coordinate transformation encoded by a quaternion corresponding to a three-dimensional orientation of the ego-machine and a three-dimensional translation vector corresponding to the location.

7. The at least one processor of claim 1, wherein the HD map includes the graph having the nodes corresponding to the road segments and edges corresponding to road-level connections between the road segments, and the respective map regions are respective circular regions that are partially overlapping with one another.

8. The at least one processor of claim 1, wherein each road segment of the road segments includes a first universally unique identifier (UUID) and each layer type corresponding to each road segment includes a second UUID, and the access is facilitated using the first UUID and the second UUID.

9. The at least one processor of claim 1, wherein the first region partially overlaps with the second region.

10. The at least one processor of claim 1, wherein respective origins of the road segments are distributed along and within the one or more roads.

11. The at least one processor of claim 1, wherein the first road segment includes one or more of:

a junctions layer that encodes jurisdictional rules or regulations;

a lane channel layer that encodes contiguous boundaries corresponding to one or more lanes on a driving surface;

a road boundary layer that encodes a height channel corresponding to a height of a road boundary; or a divider layer that encodes a height channel corresponding to a height of a divider.

12. The at least one processor of claim 1, wherein the first road segment includes driving layers and a learning layer including data used to generate ground truth data for training one or more deep neural networks (DNNs).

13. The at least one processor of claim 1, wherein the first localization data includes a first sensor modality localization layer type and a second sensor modality localization layer type that are selectively accessed to perform the one or more localization operations based at least on the ego-machine having one or more corresponding sensor types.

14. The at least one processor of claim 13, wherein the second sensor modality localization layer type is accessed based at least on a dependency of the first sensor modality localization layer type on the second sensor modality localization layer type.

15. The at least one processor of claim 1, wherein the at least one processor is comprised in at least one of:

a control system for an autonomous or semi-autonomous machine;

a perception system for an autonomous or semi-autonomous machine;

a system for performing simulation operations;

a system for collaborative content creation;

a system for performing deep learning operations;

a system implemented using an edge device;

a system implemented using a robot;

a system for generating synthetic data;

a system incorporating one or more virtual machines (VMs);

a system implemented at least partially in a data center; or a system implemented at least partially using cloud computing resources.

16. A method comprising:

accessing, based at least on a current location of an ego-machine, first localization data from a first road segment of road segments representing respective map regions aligned to one or more roads of a high definition (HD) map, the HD map including a graph having nodes representing the road segments, wherein the first road segment stores the first localization data corresponding to a first region of the respective map regions and a second road segment of the road segments stores second localization data corresponding to a second region of the respective map regions;

performing one or more localization operations using the first localization data from the first road segment to determine first localization results of the first road segment, the first localization results including a location of the ego-machine within a first local coordinate system of the first road segment;

identifying an edge in the graph based at least on the edge representing a road-level connection between the first road segment and the second road segment;

identifying, using the edge, a spatial transformation between the first local coordinate system of the first road segment and a second local coordinate system of the second road segment;

translating, when the ego-machine traverses into the second road segment from the first road segment and using the spatial transformation, the first localization results from the first local coordinate system to second localization results of the second road segment in the second local coordinate system, the second localization results including a translated location of the ego-machine; and performing one or more of autonomously controlling at least one of steering or speed of the ego-machine using the second localization data and the translated location in the second local coordinate system.

17. The method of claim 16, wherein the method further includes:

determining, based at least on the current location, a tile from a tile listing, the tile corresponding to the current location of the ego-machine and including the first road segment and the second road segment.

18. The method of claim 16, wherein the first road segment includes a first layer of a first sensor modality localization layer type and a second layer of a second sensor modality localization layer type, and the second road segment includes a third layer of the first sensor modality localization layer type and a fourth layer of the second sensor modality localization layer type.

19. The method of claim 18, wherein the first sensor modality localization layer type comprises camera data and the second sensor modality localization layer type comprises LiDAR data.

20. The method of claim 16, wherein the first road segment includes at least one of a lane channel layer, a lane marking layer, a junctions layer, a lane planning layer, a path planning layer, a localization layer, a RADAR localization layer, a LiDAR localization layer, a camera localization layer, or a road boundary or divider height layer.

21. The method of claim 16, wherein the method further includes performing at least one of one or more planning or actuation operations using the road segments of the HD map and the ego-machine.

22. The method of claim 16, wherein the road segments are distributed across a plurality of tiles of the HD map.

23. The method of claim 16, wherein each road segment of the road segments includes a first universally unique identifier (UUID) and each layer type corresponding to each road segment includes a second UUID, and the access to the first localization data is facilitated using the first UUID and the second UUID.

24. A system comprising:

one or more processors to perform operations including:

accessing, based at least on a current location of an ego-machine, first localization data from a first road segment of road segments representing respective map regions aligned to one or more roads of a high definition (HD) map, the HD map including a graph having nodes representing the road segments, wherein the first road segment stores the first localization data corresponding to a first region of the respective map regions and a second road segment of the road segments stores second localization data corresponding to a second region of the respective map regions;

performing one or more localization operations using the first localization data from the first road segment to determine first localization results of the first road segment, the first localization results including a location of the ego-machine within a first local coordinate system of the first road segment;

identifying an edge in the graph based at least on the edge representing a road-level connection between the first road segment and the second road segment;

identifying, using the edge, a spatial transformation between the first local coordinate system of the first road segment and a second local coordinate system of the second road segment;

translating, when the ego-machine traverses into the second road segment from the first road segment and using the spatial transformation, the first localization results from the first local coordinate system to second localization results of the second road segment in the second local coordinate system, the second localization results including a translated location of the ego-machine; and performing one or more of autonomously controlling at least one of steering or speed of the ego-machine using the second localization data and the translated location in the second local coordinate system.

25. The system of claim 24, wherein the operations further include:

determining, based at least on the current location, a tile from a tile listing, the tile corresponding to the current location of the ego-machine and including the first road segment and the second road segment.

26. The system of claim 24, wherein the first road segment includes a first layer of a first sensor modality localization layer type and a second layer of a second sensor modality localization layer type, and the second road segment includes a third layer of the first sensor modality localization layer type and a fourth layer of the second sensor modality localization layer type.

27. The system of claim 26, wherein the first sensor modality localization layer type comprises camera data and the second sensor modality localization layer type comprises LiDAR data.

28. The system of claim 24, wherein the first road segment includes at least one of a lane channel layer, a lane marking layer, a junctions layer, a lane planning layer, a path planning layer, a localization layer, a RADAR localization layer, a LiDAR localization layer, a camera localization layer, or a road boundary or divider height layer.

29. The system of claim 24, wherein the operations further include performing at least one of one or more planning or actuation operations using the road segments of the HD map and the ego-machine.

30. The system of claim 24, wherein the system is comprised in at least one of:

a control system for an autonomous or semi-autonomous machine;

a perception system for an autonomous or semi-autonomous machine;

a system for performing simulation operations;

a system for collaborative content creation;

a system for performing deep learning operations;

a system implemented using an edge device;

a system implemented using a robot;

a system for generating synthetic data;

a system incorporating one or more virtual machines (VMs);

a system implemented at least partially in a data center; or a system implemented at least partially using cloud computing resources.

* * * * *